United States Patent [19]
Murakami et al.

[11] Patent Number: 5,504,916
[45] Date of Patent: Apr. 2, 1996

[54] DIGITAL SIGNAL PROCESSOR WITH DIRECT DATA TRANSFER FROM EXTERNAL MEMORY

[75] Inventors: Tokumichi Murakami; Koh Kamizawa; Hideo Ohira, all of Kanagawa, Japan

[73] Assignee: Mitsubishi Denki Kabushiki Kaisha, Tokyo, Japan

[21] Appl. No.: 128,257

[22] Filed: Sep. 28, 1993

Related U.S. Application Data

[60] Continuation of Ser. No. 907,246, Jul. 1, 1992, abandoned, which is a division of Ser. No. 379,274, Jul. 13, 1989, Pat. No. 5,161,247.

[30] Foreign Application Priority Data

| Dec. 16, 1988 | [JP] | Japan | 63-318941 |
| Dec. 16, 1988 | [JP] | Japan | 63-318942 |
| Jan. 9, 1989 | [JP] | Japan | 1-1258 |
| Jan. 13, 1989 | [JP] | Japan | 1-6805 |
| Jan. 13, 1989 | [JP] | Japan | 1-6806 |
| Jan. 18, 1989 | [JP] | Japan | 1-9003 |

[51] Int. Cl.[6] .................................................. G06F 13/32
[52] U.S. Cl. ................ 395/800; 395/425; 364/DIG. 1
[58] Field of Search ................................ 395/425, 800

[56] References Cited

U.S. PATENT DOCUMENTS

| 4,467,454 | 8/1984 | Kurosu et al. | 365/189.04 |
| 4,481,578 | 11/1984 | Hughes et al. | 364/200 |
| 4,786,847 | 11/1988 | Daggett et al. | 318/568 |
| 4,891,752 | 1/1990 | Fairman et al. | 395/425 |
| 4,920,480 | 4/1990 | Murakami et al. | 395/800 |
| 4,949,391 | 8/1990 | Faulkerson et al. | 382/56 |
| 4,989,113 | 1/1991 | Hull, Jr. et al. | 395/425 |
| 5,042,000 | 8/1991 | Baldwin | 364/726 |
| 5,045,993 | 9/1991 | Murakami et al. | 395/375 |

Primary Examiner—William M. Treat
Attorney, Agent, or Firm—Rothwell, Figg, Ernst & Kurz

[57] ABSTRACT

A digital signal processor having a DMA controller adapted for image processing while transmitting data between an internal memory and an external memory. The DMA controller includes a frame horizontal size register for representing a horizontal size of a two dimensional address space and block horizontal size register for representing a horizontal size of a rectangular portion in the two dimensional address space with a block address register for indicating a head address of source area, an internal memory start address register for representing a head address of destination area, and a word register. An address calculation unit in the DMA controller generates addresses based on two horizontal size register. An external data memory connecting unit in DSP for connecting the internal memory and the external memory has two modes. One is a mode of outputting an address in two machine cycles, and the other is a mode of outputting an address in one machine cycle.

6 Claims, 33 Drawing Sheets

FIG.2 (a) (PRIOR ART)

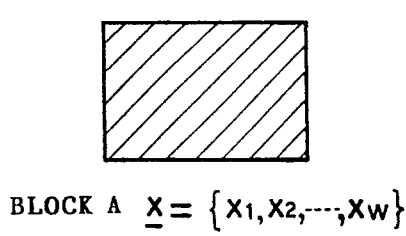

BLOCK A $\underline{X} = \{X_1, X_2, \cdots, X_W\}$

FIG.2 (b) (PRIOR ART)

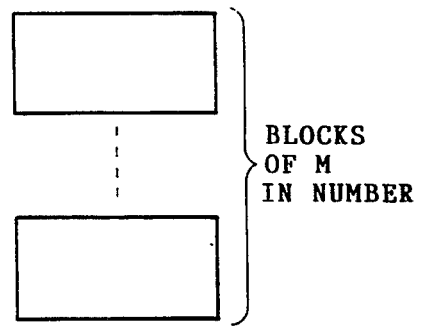

BLOCKS OF M IN NUMBER

SEARCH BLOCK $\underline{y_i} = \{y_{i1}, \cdots, y_{iW}\}$
$i = 1 \cdots M$

FIG.3 (PRIOR ART)

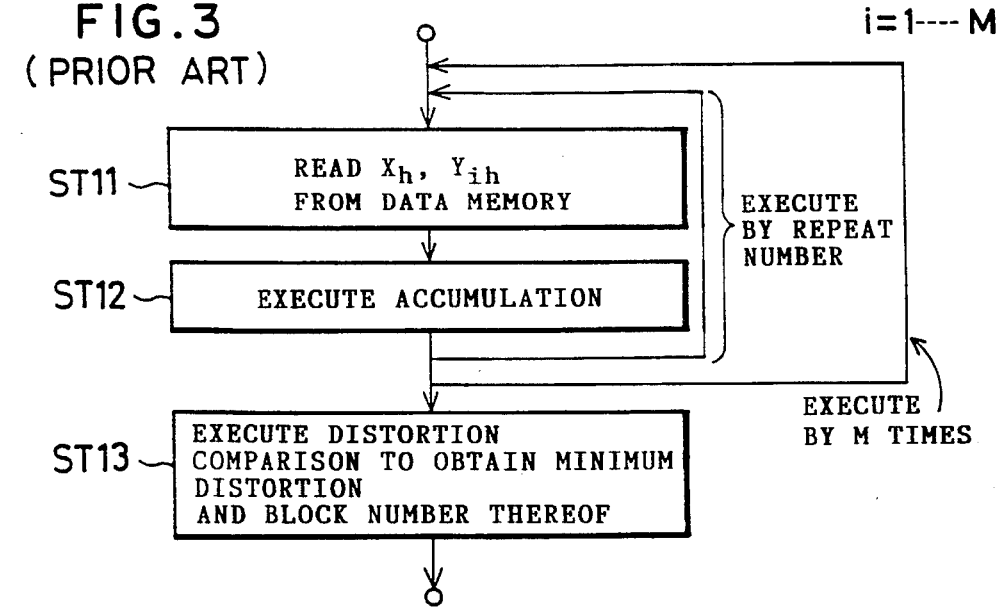

ST11 — READ $X_h$, $Y_{ih}$ FROM DATA MEMORY

ST12 — EXECUTE ACCUMULATION

EXECUTE BY REPEAT NUMBER

ST13 — EXECUTE DISTORTION COMPARISON TO OBTAIN MINIMUM DISTORTION AND BLOCK NUMBER THEREOF

EXECUTE BY M TIMES

FIG.4 (PRIOR ART)

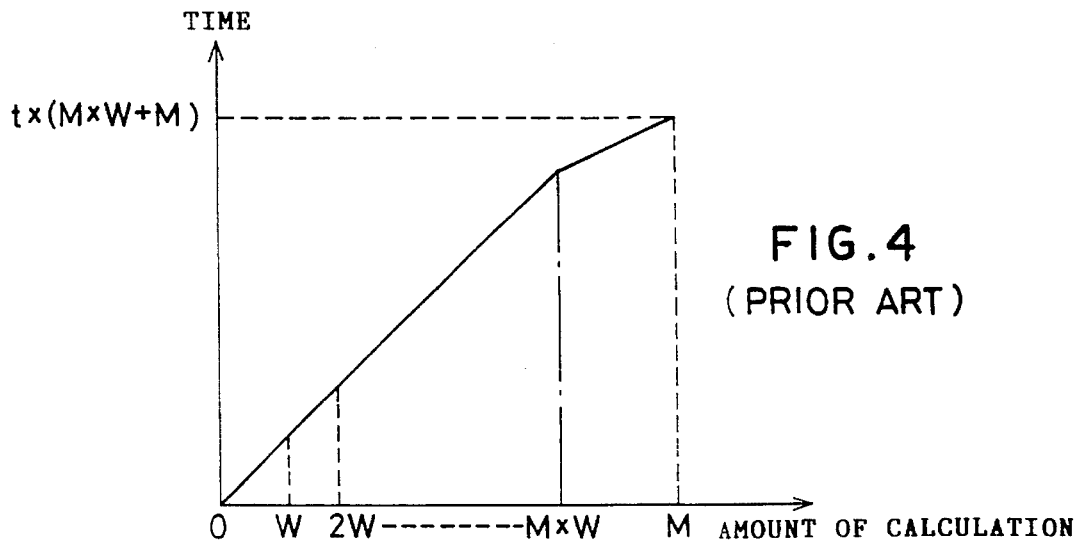

TIME $t \times (M \times W + M)$

0   W  2W -------- M×W   M   AMOUNT OF CALCULATION

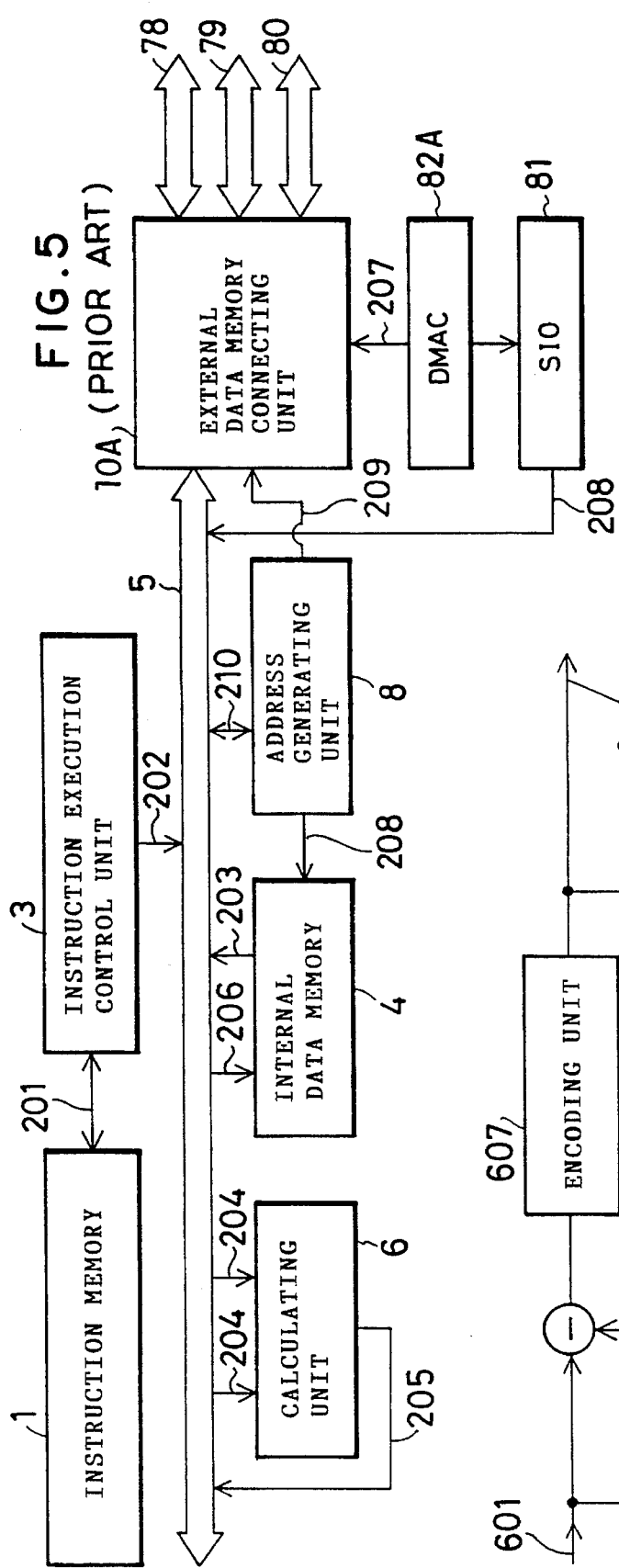

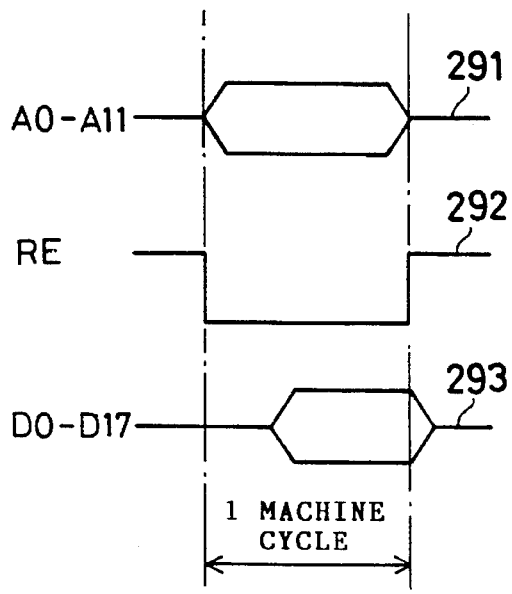
FIG.6 (a) (PRIOR ART)
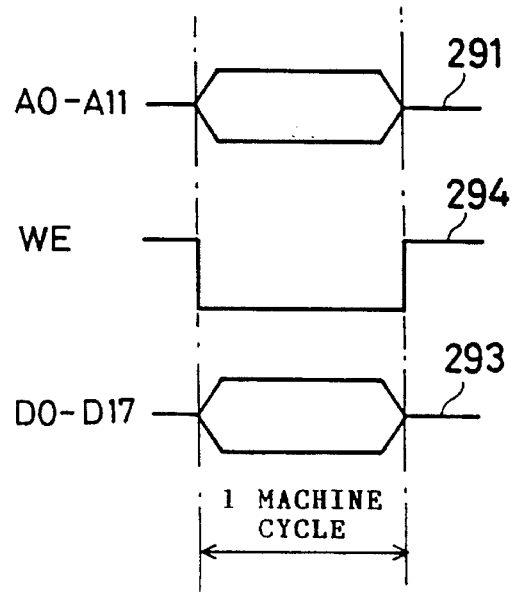
FIG.6 (b) (PRIOR ART)
FIG.15 (PRIOR ART)
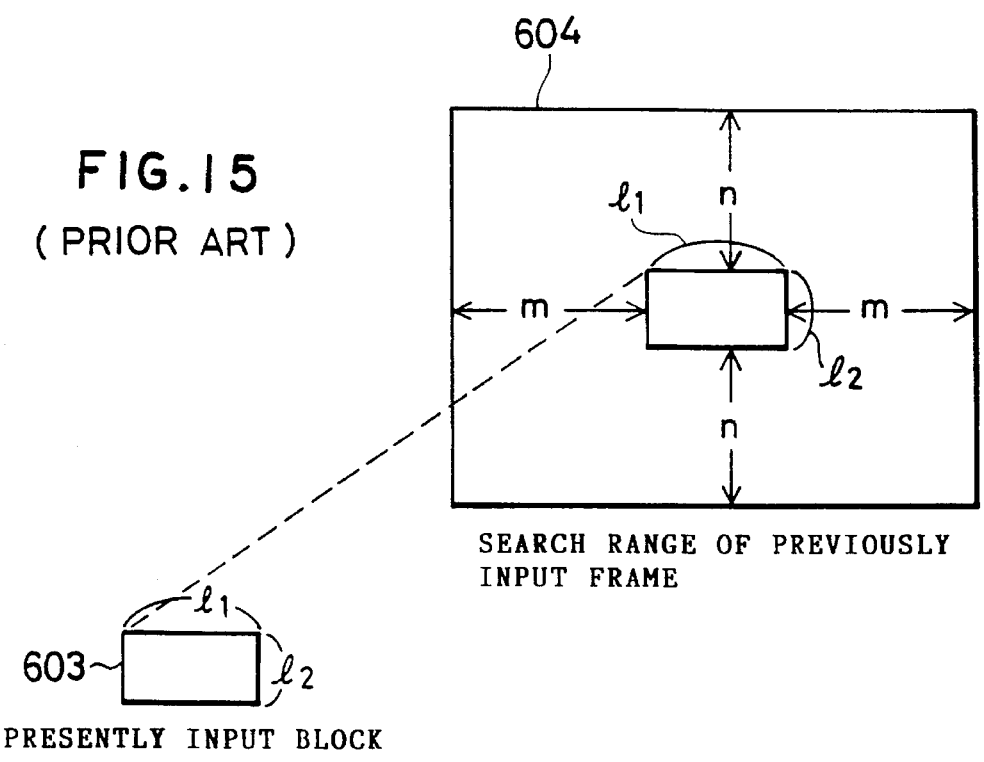
SEARCH RANGE OF PREVIOUSLY INPUT FRAME
PRESENTLY INPUT BLOCK

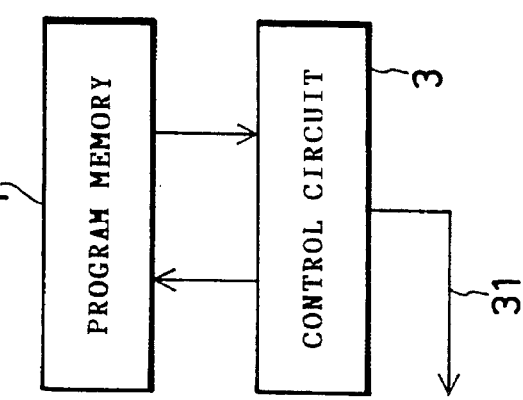
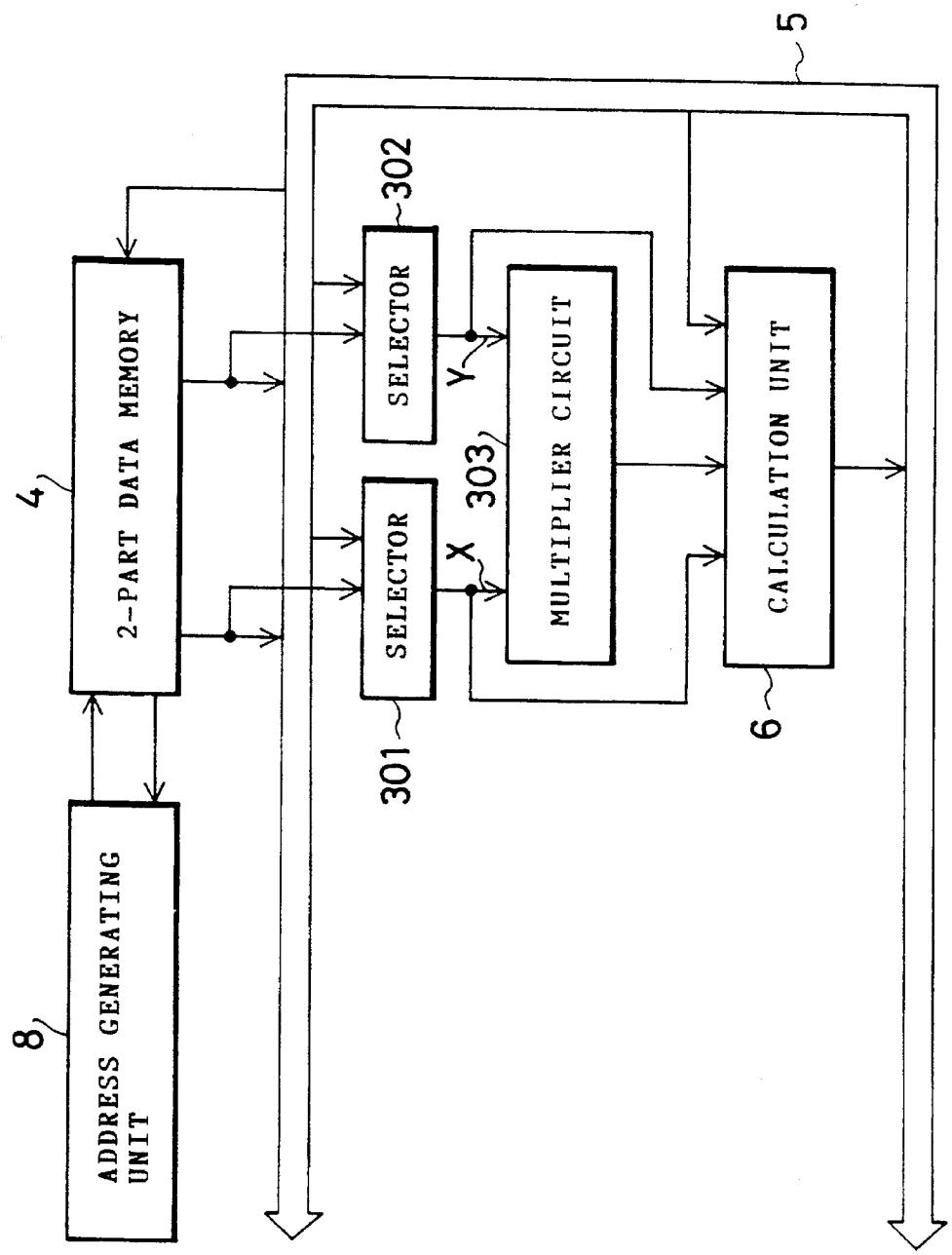

TOTAL : (2K + 5) MACHINE CYCLES PER ONE STAGE

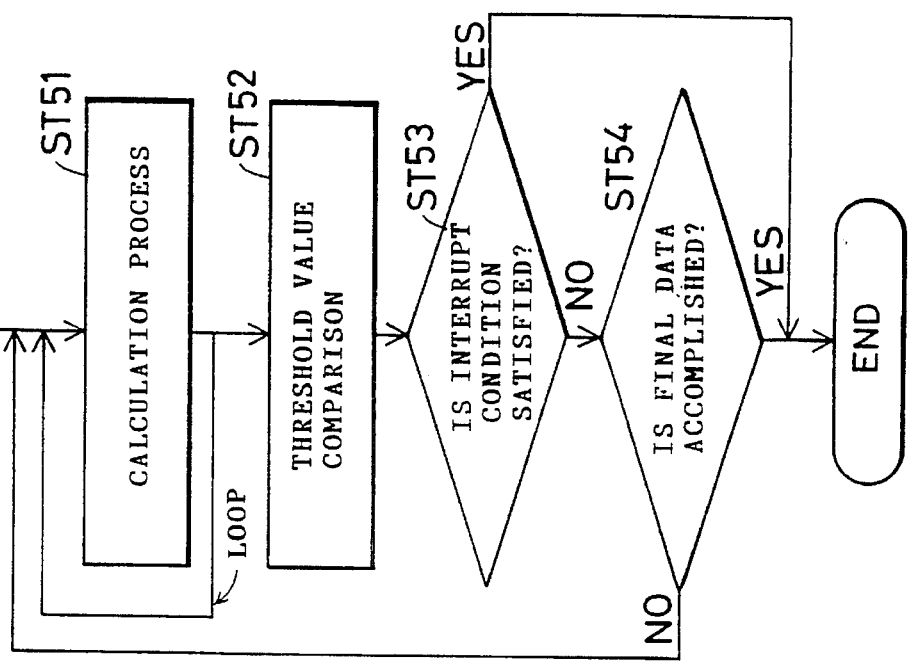

FIG.17 (a) (PRIOR ART)
PRESENTLY INPUT FRAME
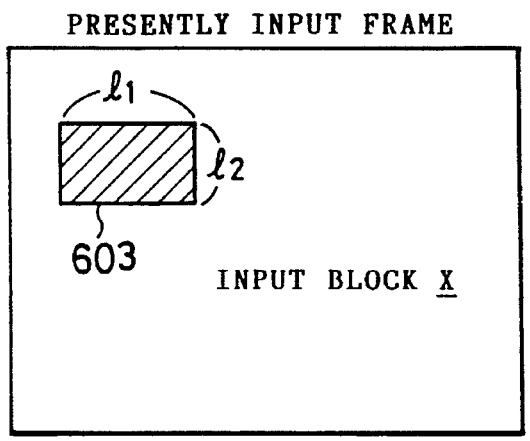
FIG.17 (b) (PRIOR ART)
PREVIOUSLY INPUT FRAME
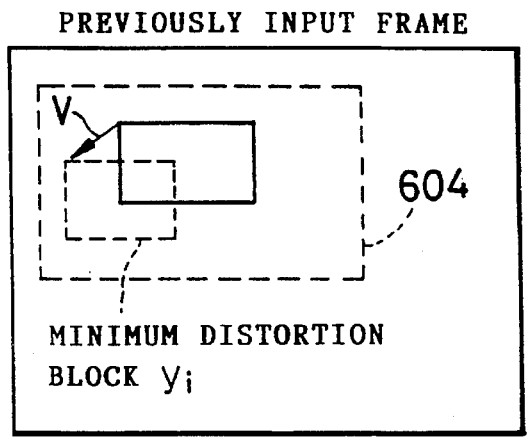
FIG.18 (PRIOR ART)
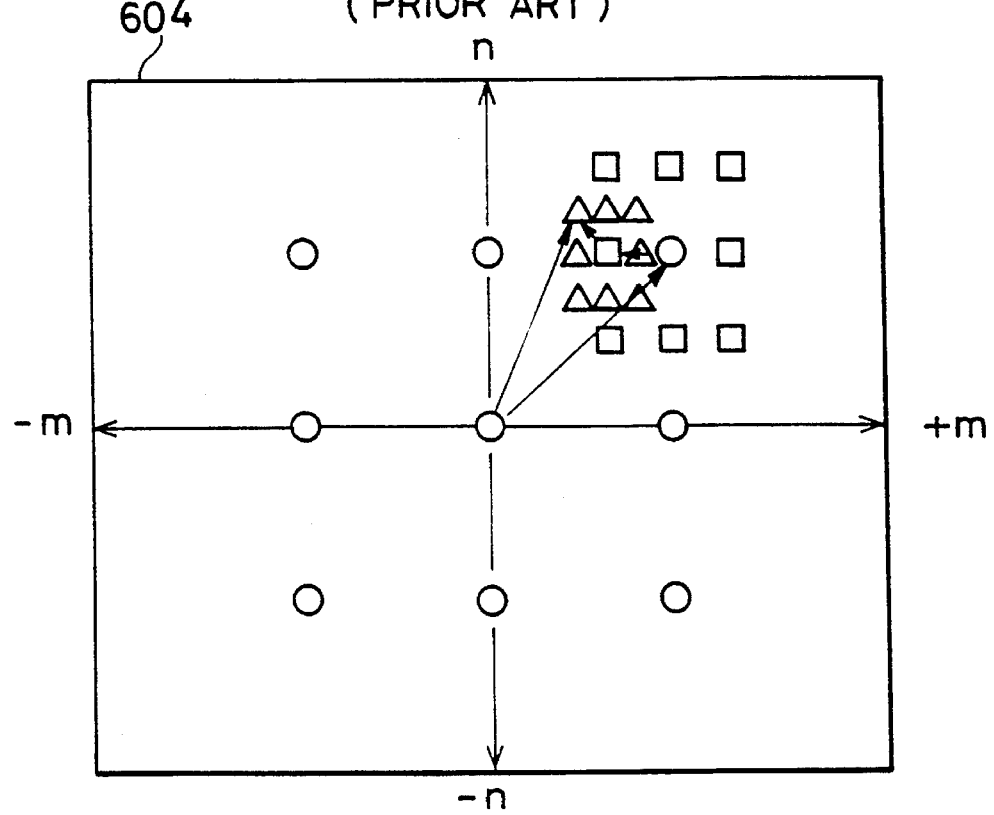

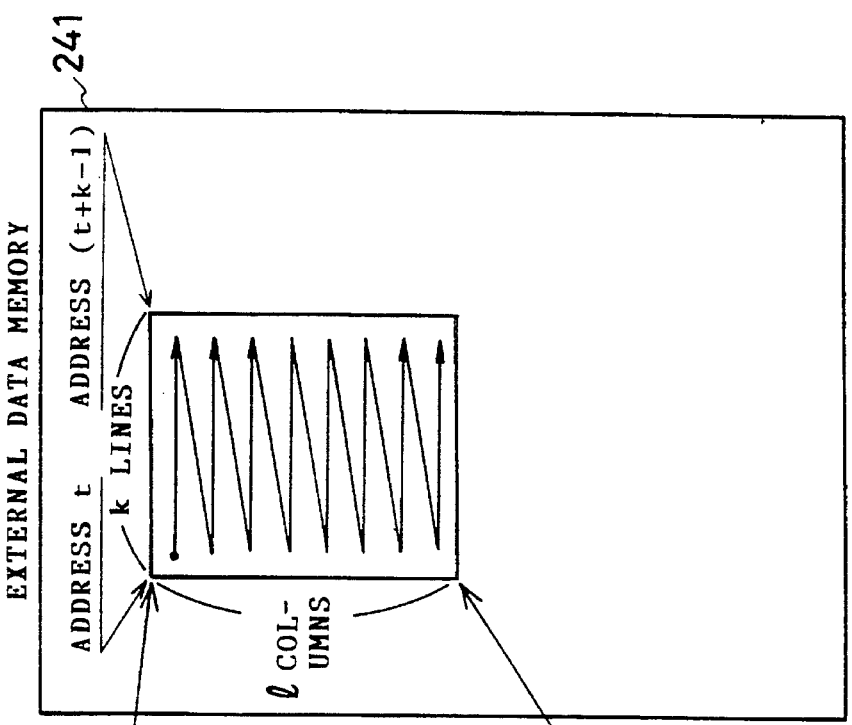
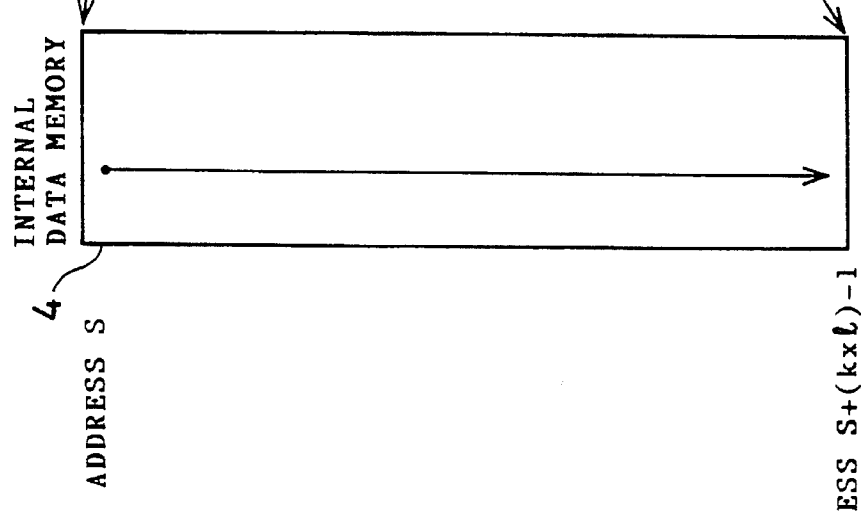
FIG.24 (a) FIG.24 (b)

| REGION | OUTPUT 1 FROM COMPARATOR | OUTPUT 2 | OUTPUT 3 | OUTPUT 4 | OUTPUT FROM REGION DECISION DEVICE |
|---|---|---|---|---|---|
| 0 | 0 | 0 | 0 | 0 | 1 |
| 1 | 1 | 0 | 0 | 0 | 2 |
| 2 | 1 | 1 | 0 | 0 | 4 |
| 3 | 1 | 1 | 1 | 0 | 8 |
| 4 | 1 | 1 | 1 | 1 | 16 |

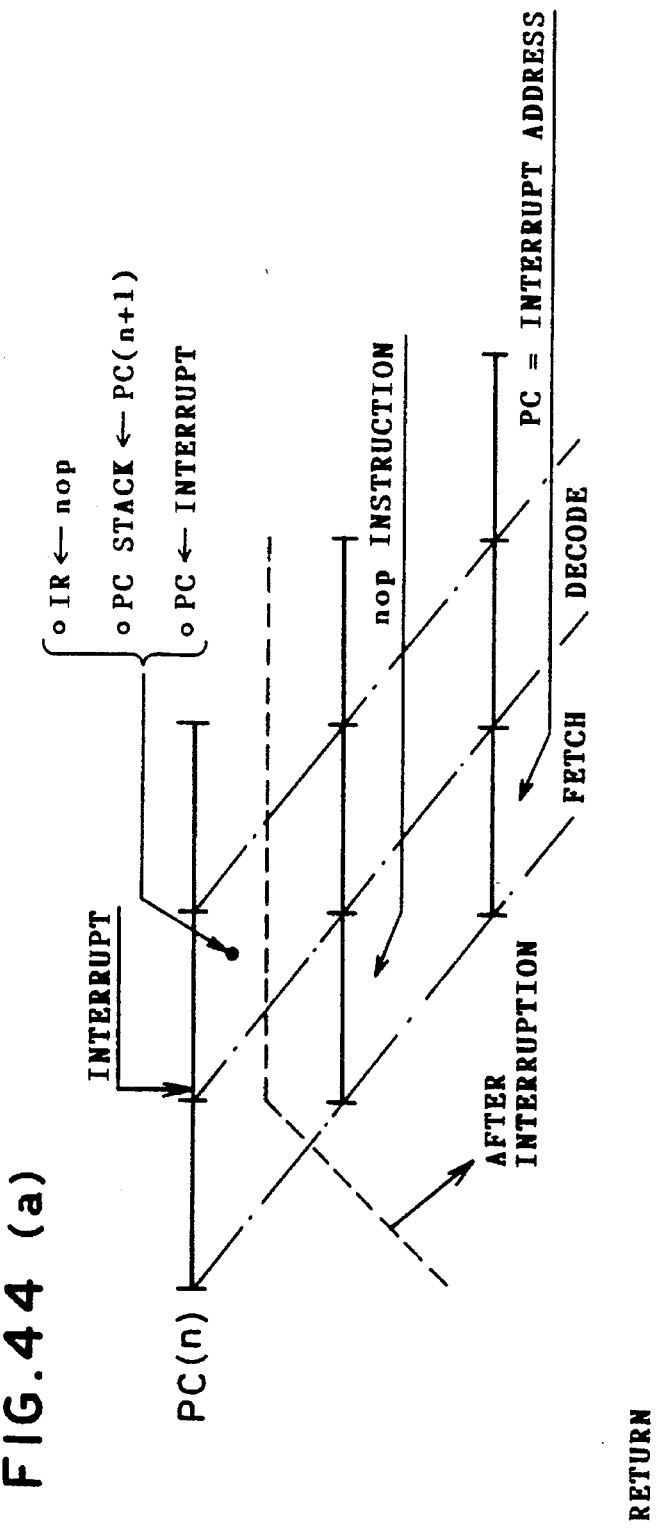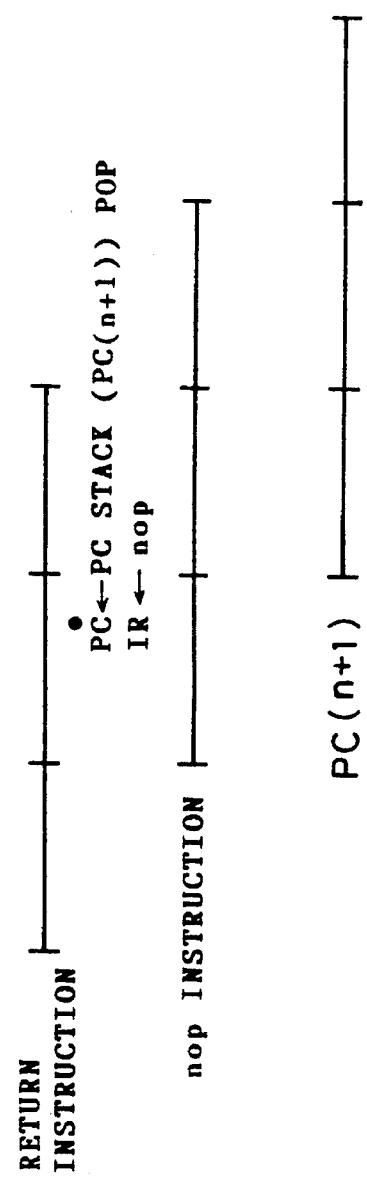
FIG.44 (a)
FIG.44 (b)

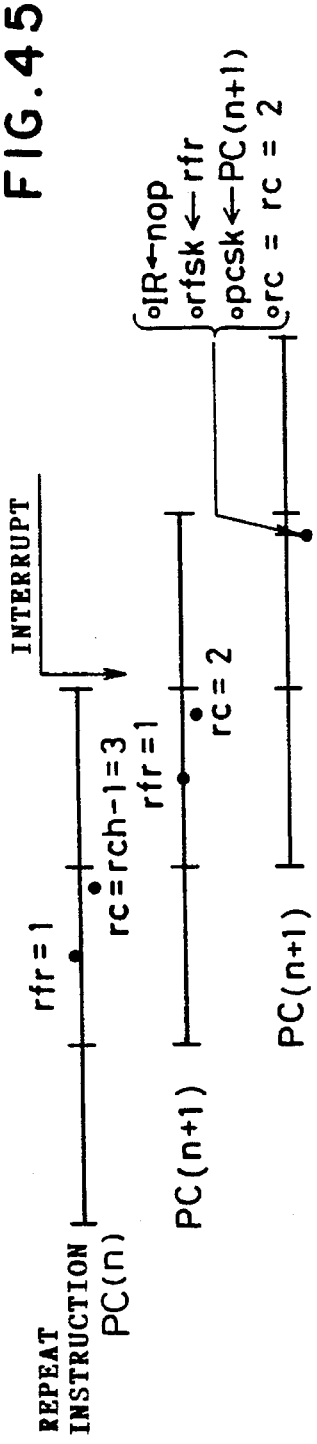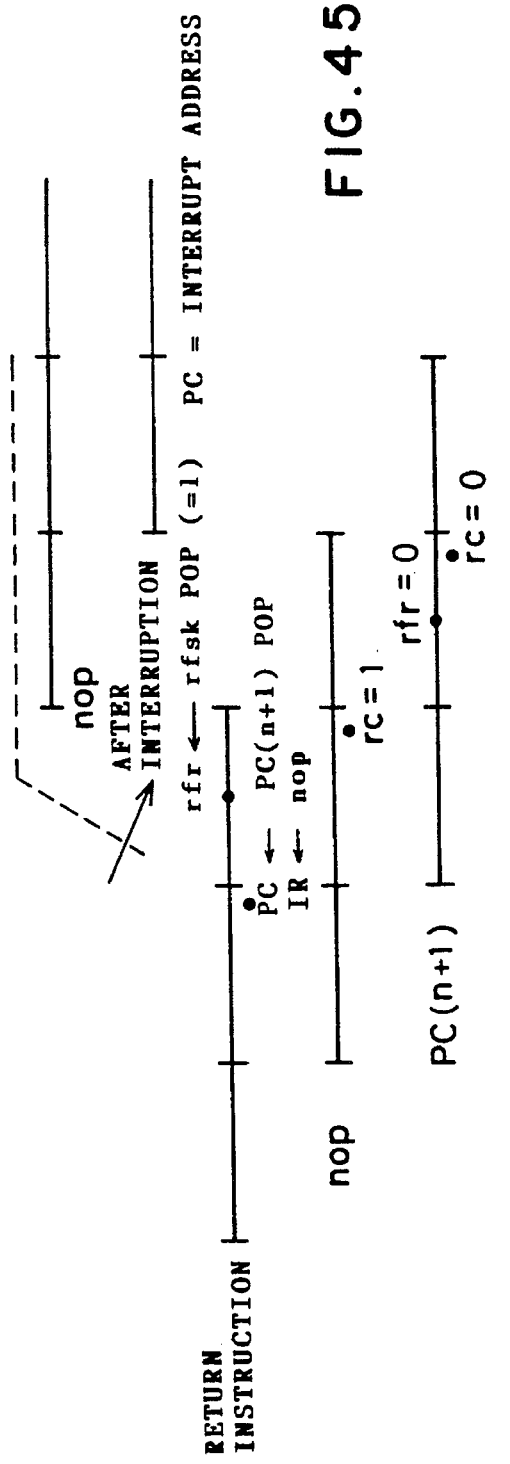
FIG.45 (a)
FIG.45 (b)

FIG.46 (a) REGION DECISION STEP
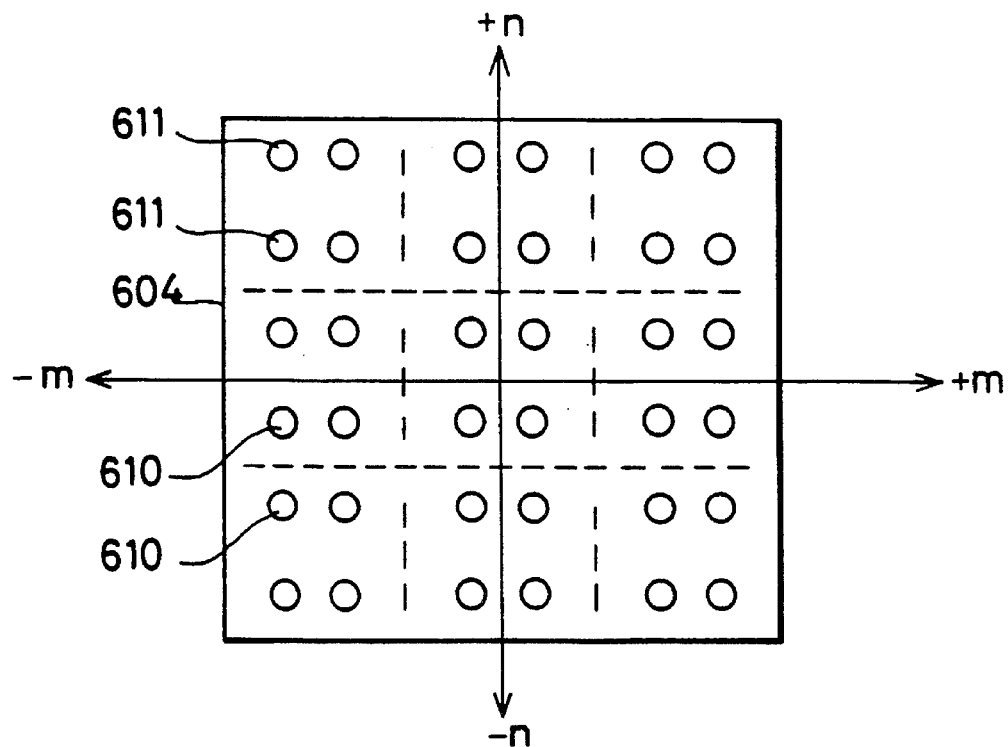
FIG.46 (b) MOTION VECTOR DETECTING STEP
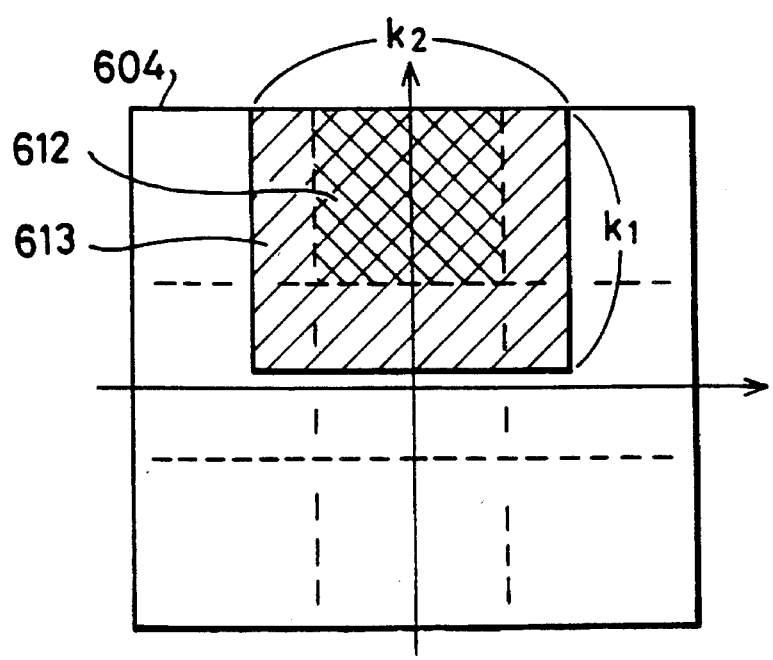

DIGITAL SIGNAL PROCESSOR WITH DIRECT DATA TRANSFER FROM EXTERNAL MEMORY

This is a continuation of application Ser. No. 07/907,246, filed Jul. 1, 1992, now abandoned, which is a division of application Ser. No. 07/379,274, filed Jul. 13, 1989 now U.S. Pat. No. 5,161,247.

BACKGROUND OF THE INVENTION

1. Field of the Invention

The present invention relates to a digital signal processor capable of performing an arithmetic processing of mainly a signal series.

2. Description of the Prior Art

FIG. 1 is a schematic block diagram of an arrangement of a first conventional digital signal processor which has been described in "A 50 nS FLOATING-POINT SIGNAL PROCESSOR VLSI", P. 401, ICASSP 86, 1986. It should be noted that for the sake of simplicity, only required blocks are illustrated in FIG. 1.

In FIG. 1, reference numeral 1 indicates an instruction memory for storing an instruction word; 2 denotes a program counter for outputting an address of the instruction memory 1 to an output path 51; 3 represents an instruction execution control unit for decoding the instruction word supplied from the instruction memory 1 via an output path 52, and for outputting a control signal via an output path 53 to the program counter 2, a calculation unit or the like; 4 is an internal data memory for storing calculation data; 5 represents a data bus for transferring data read out from the internal data memory 4 via the output path 54; 6a denotes a multiplier unit for performing multiplication on input data supplied from the data bus 5 via an output path 55; 7 indicates an accumulator for performing an accumulating operation; 8 represents an accumulating register for holding an accumulation result; and reference numeral 9 indicates a repeat counter for repeating the same instruction at plural times.

Furthermore, reference numeral 63 indicates an input/output path for connecting the repeat counter 9 and the data bus 5; 64 represents a selector for inputting the data which has been supplied via the output path 56 from the multiplier unit 6a, and the data which has been supplied from the data bus 5 via the output path 57 thereinto and for supplying output data via the output pth 58 to the accumulator 7; 65 denotes a selector for inputting the output data which has been supplied from the data bus 5 and the output data which has been supplied from the accumulating register 8 therein, and for supplying the output data via the output path 61 to the accumulator; and reference numeral 66 is an output path for transmitting a control signal of the repeat counter 9.

An operation of the above-described digital signal processor will now be described. In response to the address output from the program counter 2 via the output path 51, the instruction word read from the instruction memory 1 is inputted via the output path 52 to the instruction execution control unit 3. Based upon the decoded instruction, the instruction execution control unit 3 controls the operations by sending the control signal via the output path 53 to various sections.

The internal data memory 4 reads at most two pieces of data to the data bus 5 via the output path 54, and the multiplier 6a outputs the multiplication results with respect to two pieces of input data which has been supplied from the data bus 5 via the output path 55. The selector 64 selects either the output data which has been supplied from the multiplier 6a via the output path 56, or the output data which has been supplied from the data bus 5 via the output path 57. The selector 65 selects either the output data which has been supplied from the data bus 5 via the output path 59, or the output data which has been supplied from the accumulating register 8 via the output path 60.

The accumulator 7 adds the output data which has been supplied from the above-described selector 64 via the output path 58, to the output data which has been supplied from the selector 65 via the output path 61. The calculation result of the accumulator 7 is written via the output path 62 into the accumulating register 8.

It should be noted that the same instruction such as the above-described accumulation is carried out in such a manner that in accordance with the output data which has been supplied from the data bus 5 via the input/output path 63, the number preset in the repeat counter 9 can be repeated.

In accordance with the above-described arrangements, FIG. 3 shows a flowchart for explaining an operation in which a block which has a minimum distortion with respect to a block "A" of a certain data series, is detected among search blocks of m in number as shown in a data relationship diagram of FIG. 2.

An amount of distortion is calculated by equation 1:

$$dk = \sum_{h=1}^{W} (y_{kh} - x_h)^2 \qquad (1)$$

where,
the block A is: $x=(x_1, x_2, \ldots, x_w)$
the search blocks are: $y_k=(y_{k1}, y_{k2}, \ldots, y_{kw})$ k=1~M
"M" and "W" are fixed integers.

That is to say, with respect to the output data of $x_h$, $y_{1h}$ which have been read from the data memory 4 of the respective blocks, the accumulating calculations are performed by the number of the data (steps ST 11, ST 12), the distortion comparison is performed after M numbers of the respective block's distortions are obtained, and thereafter a minimum distortion and a block number thereof are obtained (step ST 13).

In this case, the digital signal processor having the arrangement shown in FIG. 1 requires both the comparison and update process by "M" times in order to perform a sum-of-product calculation within one machine cycle, where an amount of calculation becomes (W×M) times for the sum-of-product process, and furthermore M times for both the minimum distortion and the block number thereof are needed. As a result, a processing time required for the calculations becomes t×(M×W+ M), where t is one machine cycle.

Since the conventional digital signal processor has been arranged with the above-described constructions, when, for instance, a block having a minimum distortion is detected among blocks having a certain data series and "M" pieces of search blocks, distortions for all of "M" pieces of blocks are calculated, these distortions are compared with each other, and then a block number (position) of a minimum distortion is detected. As a result, there are drawbacks that the number of calculations becomes very large and the required processing time is considerably long.

FIG. 5 is a schematic block diagram of the digital signal processing processor disclosed in "A 50 nS FLOATING-POINT SIGNAL PROCESSOR VLSI", P. 401, Proceedings of ICASSP 86, 1986. It should be noted that for the sake of simplicity, only necessary blocks are shown in FIG. 5.

In the block diagram of FIG. 5, reference numeral 1 denotes an instruction memory for storing an instruction word; 3 indicates an instruction execution control unit for controlling various operations of decoding the instruction word and calculations; 5 is a data bus for mutually connecting the following sections with each other and for mainly performing a data transmission; 4 is an internal data memory for storing the calculation data; 6 represents a calculating unit for performing various calculations with respect to two pieces of data which have been transferred from the data bus 5; 8 denotes an address generating unit capable of generating at most 3 addresses at the same time; 10A represents an external data memory connecting unit for controlling the read/write operations to an external data memory (not shown); 78 is an external address bus; 79 denotes an external data bus; 80 indicates an external device control signal bus; 81 is a serial port (referred to as an "SIO" hereinafter) for performing a serial data transmission between external devices (not shown in detail); and, reference numeral 82A denotes a direct data memory transfer control unit (referred to as a "DMAC" hereinafter) for controlling a direct data memory transfer (referred to as a "DMA" hereinafter) between SIO 81 and external data memory connecting unit 10A.

FIG. 6 illustrates a timing chart of external data memory accessing operations of the digital signal processor shown in FIG. 5. FIG. 6a is a read timing chart and FIG. 6b is a write timing chart. In FIGS. 6a and 6b, reference numeral 291 is an external address terminal; 292 represents a strobe signal for controlling the read timing supplied from the external data memory; 293 is an external data terminal; and, 294 represents a strobe signal for controlling write timing to the external data memory.

An operation of the digital signal processor will now be described. In FIG. 5, the instruction word of the designated address is read out from the instruction memory 1, and input via an input/output path 201 to the instruction execution control unit 3. The control signal and data which have been decoded by the instruction execution control unit 3 are transferred via an output path 202 to the data bus 5.

In response to this control signal, calculation data from the internal data memory 4 to the data bus 5 is read via an output path 203, the data from the data bus 5 is input via an output path 204 to the calculation unit 6, the calculating process and calculation result at the calculation unit 6 is output via an output path 205 to the data bus 5, the data sent from the data bus 5 to the internal data memory 4 is written via an output path 206, and various operations such as the external data memory access are controlled.

Both the address of the input data from the internal data memory 4 to the calculation unit 6 and the writing address of the output data from the calculation unit 6 to the internal data memory 4 are controlled by the address generating unit 8 having three systems of address generators. This address generating unit 8 generates the address with the readable/ writable data input from the data bus 5 via an input/output path 210, controls the internal data memory 4 and the external data memory connection unit 10A in response to the data which has been outputted via output paths 208 and 209, and determines the input data and output data write destination to the calculation unit 6.

When, on the other hand, data is set to a specific register of DMAC 82A via the data bus 5 and a path (not shown), DMA is initialized.

Once DMA is initialized, all of operations other than the DMA transfer are interrupted, and the data transfer is carried out from SIO 81 to the external data memory connection unit 10A via the output path 208 and data bus 5. The transfer word number is set into the specific register of DMAC 82A in response to the instruction which has been previously outputted via the output path 201. As the settable transfer word numbers, a selection is made to only 64, 128, 256 and 512 words.

A description will now be made to FIG. 6. When the readout operation of the external data memory is carried out as shown in FIG. 6a, an RE terminal of the external device control signal bus 80 becomes active for 1 machine cycle, the strobe signal 292 informs the external device of the data readout, and the address data is output from the external address bus 78 for 1 machine cycle. Furthermore, the data read from the external device is fetched at the trailing edge of the same cycle.

When the writing operation of the external data memory as shown in FIG. 6b is carried out, a WE terminal of the external device control signal bus 80 becomes active for 1 machine cycle, the data writing operation is announced to the external device, the address data is output from the external address bus 78 and the write data is output from the external data bus 79 for one machine cycle.

Since the second conventional digital signal processor is arranged as described above, the following problems exist:
a). Since no direct data transfer is carried out between the internal data memory and external data memory, the processing efficiency of the internal calculation is lowered.
b). When the external data memory is accessed by way of the direct data transfer, the address of the external data memory is simple increasing sequence and the transfer word number cannot be arbitarily designated, so that it is difficult to directly transfer the two-dimensional block data.
c). Since the internal calculation of the processor is interrupted when the direct data transfer is carried out, the processing efficiency of the internal calculation is extremely lowered.
d). Since the external address output is fixed at 12 bits, the accessing region of the external data memory is narrow.

FIG. 7 is a schematic block diagram of the conventional digital signal processor (referred to as a "DSP" hereinafter) chip employed in the digital signal processor disclosed in IEEE, ICASSP 86, publications on page 401 "A 50 nS FLOATING-POINT SIGNAL PROCESSOR VLSI". It should be noted that for the sake of simplicity, only necessary blocks are illustrated in FIG. 7. In FIG. 7, reference numeral 1 indicates a program memory for storing a microprogram by which all of processes of DSP are performed; 3 indicates a control circuit for controlling the executions of various processes such as fetching and decoding of the microprogram of the program memory 1, reading of data, calculation, and writing of calculation results; 4 represents 2-port data memory capable of storing 2n bits (n is a positive integer) data as the data size, also of simultaneously reading two pieces of data, and also of writing one piece of data; 8 indicates an address generating unit for generating an address for the data memory 4; reference numerals 301 and 302 represent selectors; reference numeral 303 a multiplier circuit for performing a multiplication process and adding/ subtracting process with respect to two pieces of data X and Y which are simultaneously read from the data memory 4 and supplied via the respective selectors 301 and 302; reference numeral 6 is a calculation unit for performing an arithmetic operation and accumulation with respect to the above-described two pieces of data or resultant data by the multiplier circuit 303, and, reference numeral 5 indicates a data bus for transferring both the above-described two pieces of data X and Y, and the resultant data by the calculation unit 6 between the calculation unit 6 and data memory 4.

An operation of the digital signal processor will now be described. First of all, an overall operation of the DSP shown in FIG. 7 will be described. That is, the address generating unit 8 generates the address with respect to the data memory 4 so as to supply to this data memory 4. Thereafter when the data is read out, two pieces of data are simultaneously read out from the data memory 4, and then supplied via the respective selectors 301 and 302 to the multiplier circuit 303 or calculation unit 6 as the data X and Y. At this time, the multiplier circuit 303 performs the multiplication process on these data X and Y, and also sum-of-product processes on the multiplication result, and finally supplies the resultant data to the calculation unit 6. Then, the calculation unit 6 perform such an arithmetic calculating process that summation, subtraction, and bit manipulation are executed to this resultant data or the above-described two pieces of data X and Y, and also supplies the resultant data to the data memory 4 via the data bus 5 for writing. The above-described series of processing operations are performed by a pipeline process in which the control circuit 3 reads the microprogram which has been stored in the program memory 1, the instruction is decoded by the control circuit 3, and the control signal 31 is output to the respective circuits.

Then, for the case where a sum-of-product calculation, a complex number calculation, and a binary three search vector quantizing calculation are executed in the DSP, descriptions of a required machine cycle number will now be made.

(1) A sum-of-product calculation.

FIG. 8 shows a calculation flow of a sum-of-product calculation. That is, at first, in a step ST 21, an initialization is executed. Namely, an address for the data memory 4 is set, and a loop number is set in the multiplier circuit 303 and calculation unit 6. Then, in a step ST 22, the sum-of-product calculation is performed in one machine cycle. In a next step ST 23, a decision process is made whether or not a count value of the repeat counter is equal to zero. In other words, a decision process whether or not the repeat calculations are executed M times which have been set in the previous initialization step, has been performed.

In this case, if the calculation result of the sum-of-product calculation output from the calculation unit 6 is assumed to be "Z", this "Z" will be expressed as follows:

$$Z = \sum_{i=1}^{M} (x_i \times y_i) \quad (2)$$

It should be noted that input data series X and Y are defined by:
X=($x_1$, ..., $x_n$), and
Y=($y_1$, ..., $y_n$).

Since two pieces of data read from the data memory 4, multiplication, and accumulation of the multiplied results are pipeline-processed, an amount of required calculations becomes M machine cycles per one output data when the loop numbers "M" are sufficiently great. Thus, this is the same in the case that the data size is equal to "n" bits.

(2). Complex number calculation.

FIG. 9 illustrates a calculation flow of a complex number calculation. That is to say, in a step ST 31, an initialization is carried out similar to the above-described step ST 21. In a subsequent step ST 32, and next step ST 33, a calculation on a real number part and a calculation on an imaginary number part are separately executed in two machine cycles respectively. In a next step ST 34, a decision is made whether or not the count value of the loop counter is equal to zero other words, a decision is made whether or not the calculations have been performed M times which have been set in the initialization.

In this case, if the input data X and Y are set to X=$a_1$+j$a_2$, Y=$b_1$+j$b_2$, respectively, a multiplication between these complex numbers X and Y is as follows:

$$X \times Y = (a_1 \times b_1 - a_2 \times b_2) + j(a_1 \times b_2 + a_2 \times b_1) \quad (3)$$

As a result, the calculations on the real number part and imaginary number part are executed in the two steps of ST 32 and ST 33. Accordingly, an amount of required calculation becomes five machine cycles per one output data.

(3). Binary tree search vector quantizing calculation.

FIG. 10 represents a calculation flow for explaining a binary tree search vector quantizing calculation. The function of this binary tree search is to perform a matching calculation between an input vector "x" and two output vectors "$y_0$" and "$y_1$" at a certain search stage so as to detect an output vector containing a smaller matching distortion, and is to repeat such a matching calculation operation on two output vectors located at a stage below the detected vectors.

As in the above-described matching calculation, a vector inner product is utilized. Assuming that an element number of a vector is "k", a matching distortion quantity is defined as follows:

$$d_0 = x \cdot y_0 = \sum_{i=1}^{k} (x_1 \times y_{01}) \quad (4)$$

$$d_1 = x \cdot y_1 = \sum_{i=1}^{k} (x_1 \times y_{11}) \quad (5)$$

where
x=$x_1$, ..., x,
$y_0$=$y_{01}$, ..., $y_0$,
$y_1$=$y_{11}$, ..., $y_1$,

As a consequence, at steps ST 42 and 43, "$d_0$" and "$d_1$" are calculated In the subsequent step ST 44, a comparison is made between "$d_0$" and "$d_1$". Then the process is advanced to the subsequent process. Accordingly, an amount of required calculation per one stage is equal to (2k+5) machine cycles.

Since the third conventional digital signal processor is arranged as described above, even in case that the required data precision is enough of a half of a data size at its maximum, an amount of various calculations required is equal to that of the data precision with respect to the data size at its maximum. As a result, the calculation capabilities of the digital signal processor per se cannot be sufficiently utilized.

FIG. 11 is a schematic block diagram of the conventional digital signal processor (referred to as a "DSP" hereinafter) disclosed in, for instancee, "A 50nS FLOATING POINT SIGNAL PROCESSOR VLSI", on page 401, IEEE, ICASSP86. It should be noted that for the sake of simplicity, only necessary blocks are represented in FIG. 11.

In DSP shown in FIG. 11, reference numeral 1 indicates a program memory; 3 is a control circuit for controlling data transfer, calculation, branching and so on; 31 represents an output path for outputting a control signal from the control circuit 3; 404 indicates an output path from the control circuit 3 to the program memory 1; 405 is an output path from the program memory 1 to the control circuit 3; 4 denotes a data memory; 6 indicates a calculation unit including a multiplier, an arithmetic calculator, a shifter, an accumulator and so on; 5 is a data bus; 409 represents output paths from the data memory 4 to the data bus 5, and from the data bus 5 to the calculation unit 6; and, reference numeral 410 denotes output paths from the calculation unit 6 to the data bus 5 and from the data bus 5 to the data memory 4.

The operations of the DSP will now be described. The basic operations of DSP is controlled based upon the program read from the program memory 1, by the control circuit 3. Furthermore, the data read from the data memory 4 is subjected to a series of processing operations such as the instruction fetch, the decoding, data reading, calculation, and calculation result writing on inputting the data into the calculation unit 6.

When the same instruction is consecutively performed by way of the pipeline processing, one instruction may be approximately performed within one machine cycle. As a consequence, in case that a single instruction is repeatedly executed, the process speed may be increased more if the process is more consecutively executed.

However, if a specific condition is satisfied with the calculation results, the following branching process is required in the branching program. That is, in such a branching program, an intermediate check point is introduced in a routine, and the consecutive execution is once interrupted so as to judge a condition before the consecutive execution process is completed, and further a comparison is made between the calculation result data and the specific data. Thus, based upon the comparison result, the branching process is executed.

FIG. 12 is a process flow for performing an intermediate check while a series of consecutive execution is processed. The results of the calculation process is compared with a threshold value (steps ST 51 and 52). Thereafter, a decision is made whether or not an interrupt condition is satisfied (step ST 53). If YES, then this process is completed. If NO, another decision is made whether or not the final data is accomplished (step ST 54). If NO, then the process is returned to the previous step ST 51 in which the above-described operation is repeated. To the contrary, if YES, then this process is ended.

In a motion compensating process of an image encoding method, a difference absolute value accumulation is employed for a pattern matching so as to detect a minimum pattern. When, for instance, a value which is now accumulated exceeds a minimum value, the remaining accumulation is waste of time. In such a case, the process is advanced to the next routine for the sake of efficiency.

To this end, it is useful to perform the intermediate check to some extent. However, the various processes of comparisons and decisions, and also interruptions of the process accompany a loss of time. Further, according to the conventional DSP, it is possible to only judge the conditions on the positive or negative decision of the data. When a comparison of size is needed between the data and the specific threshold value, a subtraction is once carried out between the data in question and the threshold value, and thereafter, a decision can be performed based upon this subtraction result, resulting in a lower processing efficiency of DSP.

If there are a plurality of comparison threshold values, the processing efficiency is further lowered. For instance, in case that the process sorts are subdivided into plural numbers (n in number), the comparisons between the data in question and (n−1) threshold values, and the branching instructions based upon the comparison results are required. At least a loss of (n−1)×2 machine cycles occurs.

Since the fourth conventional digital signal processor is so constructed, the processing efficiency is lowered because of the following reasons. That is, in case where the branching process is carried out depending upon the calculation results or intermediate calculation results, the process is interrupted during the consecutive processing steps, and subtractions and also comparison processes are executed.

FIG. 13 is a simplified schematic block diagram of a audio signal processor (DSSP1) which has been represented in Japanese Telecommunication Institute, symposium publication No. S10-1 in 1986. In the audio signal processor shown in FIG. 13, reference numeral 1 denotes an instruction memory into which instruction words have been stored; 3 represents an instruction execution control unit for controlling various operations such as decoding of the instruction word and calculations; and 2 indicates a program counter for holding an instruction address; 504 is a PC stack for preserving a return address used in the subroutine process and interruption process. This PC stack 504 preserves an instruction address 531 output from the program counter 2 just before the interruption process, until the process is accomplished. Reference numeral 505 indicates a sequence control unit for controlling the entire operation of the processor; 506 is a repeat control unit for performing a counting operation between the sequence control unit 505 and itself during the loop/repeat operation; 9 is a repeat counter for counting a repeat number during the execution of the repeat instruction; 508 is a program bus for transferring the decoded control data; 5 represents a data bus for transferring main data; 510 is a bus interface register for connecting the program bus and data bus 5; 4 represents a data memory for storing calculation data; 6 indicates a calculation processing circuit for performing arithmetic operations such as addition, subtraction, multiplication, and division; 513 is an interruption control unit for starting the interrupting process; 514 is an external interrupt request signal; and, reference numeral 515 denotes an external interrupt acknowledgement signal.

An operation of the DSSP1 will now be described. In general, a signal processor has a pipeline structure in order to increase a processing speed. For instance, in the signal processor as shown in FIG. 13, the structure thereof is 3-stage pipeline. Accordingly, the following description is made based upon the pipeline processing.

In a first stage of the pipeline, an instruction word 511 which is designated by an instruction address 531 output from the program counter 2 is read from the instruction memory 1 and then inputted into the instruction execution control unit 3.

In a second stage of the pipeline, both the control signal and data decoded by the instruction execution control unit 3 are transferred to the corresponding parts.

In a third stage of the pipeline, various operations are controlled. That is, the calculation data 512 are read from the data memory 4 to the data bus 5 in response to the control signal, and written from the data bus 5 into the data memory 4, and furthermore processed in the calculation unit 6.

The interruption control unit 513 has a 3-level interrupt function other than RESET. RESET not only resets the program counter 2, but also initializes control registers such as a status register (SR), a flag register (FR), an interruption, and a bus control.

An interrupt 0 (INTR0) is non-maskable, and the program counter 2 is set to an address "1" wheel an INTR0 signal is inputted.

An interrupt 1 (INTR1) is maskable, and is masked when RESET, INTR0, or INTR1 is accepted, or by being designated in the program. A release of masking is executed by the program. When this interruption is accepted, the program counter 2 is set to an address "2".

An interruption 2 (INTR2) is maskable, and corresponds to a normal interruption having an acknowledgement function.

When RESET, INTR0, INTR1, and INTR2 are accepted, or set by the program, INTR2 is masked. A release of masking is performed by the program. When an interruption request signal is accepted, an acknowledgement signal (INTR2) is outputted, and then an address "3" is set to the program counter 2.

An instruction word which will be executed after the normally executed instruction word, is stored in an address which is defined by adding 1 to the instruction address 531 where the normally executed instruction word has been stored.

In the first stage of the pipeline the instruction address 531 output from the program counter 2 is added by "+1" in the adder so as to produce an address defined by adding the instruction address 531 to "1".

In general, in the processor having a pipeline structure, a delay may be caused by this pipeline until the instruction has been executed. As shown in FIG. 14, in a machine cycle of time period Tn, the H/W interrupt request signal 514 is inputted into the interruption control unit 513.

In response to the above-described input, when the external interrupt acknowledgement signal 515 is outputted from the interrupt control unit 513, an instruction word designated by an instruction address PC(n) is read out. Since the interrupt signal has been received, the instruction word which has been stored in an "n" address of the instruction execution control unit 3 at the machine cycle of time period (Tn+1), is invalidated, and it is substituted by no operation instruction (nop).

The program counter 2 is set to an address "3" at the machine cycle of time period Tn, whereby an interruption process is performed. The process cannot be completely recovered from the interruption process because the executions of the instruction words designated by PC(n-1) and PC(n) have not yet accomplished, and operations of the program counter 2 and the various key registers are interrupted not preserved, before the interruption process is executed.

Since the conventional digital signal processor having the above-described pipeline structure is so arranged above, the correct data before the interruption cannot be guaranteed when the external interruption is executed while the normal instruction is performed. When the interruption is executed during the repeat operation, the remaining repeat instruction is not executed. This causes the process efficiency to be lowered in the image signal processing field where the external H/W interruption is executed, and a large quantity of data is processed at a high speed so as to obtain a correct calculation result.

FIG. 15 is an explanatory diagram of the conventional motion-compensation calculating method which is described in, for instance, "A METHOD OF INTERFRAME ENCODING BY EMPLOYING MOTION COMPENSATION/BACKGROUND PREDICTION", publication of Electronic Telecommunication Institute, 85/1 Vol. J68-B No. 1, pages 77 to 84 by H. KORODA: N. TAKEKAWA and H. HASHIMOTO. In particular, this diagram shows an entire search type method. In FIG. 15, reference numeral 603 indicates a presently input block having a block size of $l_1 \times l_2$ used for compensating a motion of a position in the present input frame; and 604 indicates a motion vector search range for representing a range of $(l_1+2m)$ and $(l_2+2n)$ where a block is located. This block is matching-processed with the present input block 603 in the previous input frame.

In this case, the number "M" of the search blocks is expressed by:

$$M=(2m+1)\times(2n+1) \qquad (6)$$

The search range is defined by a range of -m to +m pixels in the horizontal direction and a range of -n to +n pixels in the vertical direction.

The motion compensation is executed at a predetermined sized block unit by obtaining a prediction signal approximate to the present input frame data while utilizing an inter-frame correlation between the present input frame data and previous input frame data in the inter-frame encoding transmission method. Then, a block having a minimum inter-block-distortion quantity against a present input block 603 within a present input frame data, is searched among the motion vector search range 604 within the previous input frame data to obtain a motion vector and a prediction signal. This block corresponds to a block having the highest correlation with the present input block 603 with a calculation method such as a sum-of-absolute-difference calculation.

FIG. 16 is a schematic block diagram of an image encoding transmission apparatus where a general inter-frame encoding process is performed. Ill FIG. 16, reference numeral 601 denotes an input signal of image data constructed of a plurality of sequential frames in a time series; 602 denotes a motion compensation unit for obtaining a prediction signal by calculating approximation of a correlation between a present input block 603 of the input signal 601 and a motion vector search range 604 given as a previous input signal 601; reference numerals 605 and 606 are prediction signals outputted from the motion compensation unit 602; 607 is a encoding unit for encoding a difference signal between the input signal 601 and prediction signal 606 so as to output a motion compensated signal; 608 denotes a decoding unit for decoding the motion compensated signal which has been encoded in the encoding unit 607; and, reference numeral 609 indicates a frame memory for adding the signal from the decoding unit 607 to the prediction signal 606 from the motion compensation unit 602 so as to obtain reproduced data to De stored therein, and also for giving the motion vector search range 604 to the motion compensation unit 602.

In the image encoding transmission apparatus with the above-described arrangement, operation thereof will now be described with reference to an explanatory diagram of FIG. 17.

The configuration shown in FIG. 16 has functions as follows: each of inter-block distortions between the present input block "x" 603 with a size of $l_1 \times l_2$ at a specific position within the present input frame and the respective blocks of M in number within the motion vector search range 604 of the previous input frame, is calculated; and a minimum value of these distortions, i.e., a relative position of a minimum distortion block "y" indicated by the minimum distortion, with respect to the position of the present input block 603, is searched as a motion vector; so that a signal "ymin" of this block is output as a generated prediction signal 605. Then, in the frame inter-frame encoding transmission, the prediction signal can be produced even at the reception side by transmitting the motion vector information at the reception side.

Assuming now that the number of the motion vectors "V" to be searched within a given motion vector search range 604 is "M" (an integer not less than 2). In the case where a sum-of-absolute-differences is employed as a distortion quantity between the previous frame block at the position of the specific motion vector "V" and the presently input block, an amount of distortion is calculated by:

$$Di = \sum_{P=1}^{L} |yiP - xP| \quad (7)$$

It should be noted that the input block is $x = (x_1, x_2, \ldots, xL)$, the block to be searched is $yi = (yi1, yi2, \ldots, yiL)$, and $i=1$ to M, L is equal to $l_1 \times l_2$. Thus, the motion vector V is obtained by:

$$V = Vi(\min di\ |i=1\sim M) \quad (8)$$

Then, a calculation amount S1 of this case is obtained by the following equation when the sum-of-absolute-differences calculation needs "a" machine cycles and the comparison process needs "b" machine cycles.

$$S1 = L \times M \times a + M \times b \quad (9)$$

In case that, for instance, a=1 machine cycle, b=2 machine cycles, $l_1=8$, $l_2=8$, m=8, and n=8, then L=64, M=289, and;

$$S1\ 19,000 \quad (10)$$

machine cycles. This is very large value in view of the hardware arrangement. The high-speed calculation system such as the pipeline processing has been used in accordance with the frame cycle of the image signal.

However, it is a great problem to reduce the quantity of the hardware. In accordance with Japanese KOKAI (Laid-open) patent application No. 63-181585, for instance, entitled: "AN APPARATUS FOR MOTION COMPENSATION INTER-FRAME ENCODING OF A TV SIGNAL", it has been proposed a method for calculating a tree search type motion compensation so as to reduce an amount of calculations. FIG. 18 is an illustration for explaining a method of a motion compensation calculation. There are arranged first blocks "○" of low density at equal intervals to be searched within the motion vector search range 604. When a block "○" giving the minimum distortion is detected, second blocks "□" to be searched are positioned within a narrow region with this block "○" as a center thereof. In this narrow region, a block "□" giving the minimum distortion is detected. Furthermore, third blocks "Δ" to be searched are set within another region with this block "□" as a center thereof so as to detect a block "Δ" giving the minimum distortion. Finally, the block "Δ" giving the minimum distortion within the motion vector search range 604 is specified.

An amount of the calculations "S2" in this case is expressed by:

$$S2 = (9 \times L \times a + 9 \times b) \times 3 \quad (11)$$

As a result, under the same conditions as the above, it becomes $$S = 1,800 \quad (12)$$

machine cycles.

Although the quantity of calculation according to this tree search type motion compensation calculating method becomes small, the capability to detect the minimum distortion block is lowered as compared with that of the full search type motion compensation calculating method. That is to say, there are considerable possibilities that at the matching process of the first search operation with the low density, a selection is made of a block of which is positioned is apart from that of the correct block having the minimum distortion. As a consequence, there are many cases where the calculation result cannot reach the expected minimum distortion amount and gives a decision of no correlation, resulting in a lower efficiency.

Since the conventional motion compensation calculating method has been so arranged as above, a calculation amount becomes great if the full searching operation with high reliability in the motion compensation calculating is employed, so that a large scale arrangement of hardware is required. On the other hand, if the calculation amount is reduced by way of the tree searching method, the detectability of the minimum distortion block is lowered. As a consequence, there are problems of the erroneous detections and insufficient efficiency.

SUMMARY OF THE INVENTION

The present invention has been made for the purpose of solving the above-described problems, and therefore has as one object the provision of a digital signal processor in which the number of the distortion calculations is reduced and simultaneously the number of calculation is reduced by outputting a minimum distortion and a block number of a minimum distortion block, so that the processing time can be efficiently reduced.

To achieve the above-described object, a digital signal processor according to one embodiment of the present invention comprises:

a minimum distortion register for holding a minimum distortion;

a minimum distortion position register for holding a number of a block laving said minimum distortion;

a block counter for holding a number of a block performing a present distortion calculation;

a comparator for comparing an accumulator output with a value of said minimum distortion register at every cycle while in order to detect the minimum distortion among "M" blocks in number (M being a positive integer) of data train, the distortion calculation is performed with respect to a k-th block ($1 \leq k \leq M$, "k" being an integer) of the "M" blocks in number; and, an instruction execution controlling unit capable of holding the minimum distortion up to a k-address's block among "M" blocks in response to a predetermined instruction word from an instruction memory in such a manner that an accumulation is interrupted during the accumulating operation when the output from the accumulator exceeds the value of said minimum distortion register, the process is advanced to a subsequent instruction or an instruction of a designated address, and when the accumulation is correctly ended, the value of said accumulating register is written into the minimum distortion register.

In the digital signal processor according to the invention, during the accumulating operation, a comparison is made between the accumulated data and minimum distortion at every cycle. When the comparison result exceeds the minimum distortion, the accumulation is forcibly accomplished. The update of the minimum distortion and update of the block number are performed for the block where the accumulation has been normally accomplished. As a result, a required calculation amount is reduced and the processing time is efficiently utilized.

Also, another object of the present invention is to provide a high-speed digital signal processor having a simpler circuit arrangement and flexibilities.

To achieve the above-described object, a digital signal processor according to the present invention comprises:

an instruction execution control unit for controlling operations such as decoding and calculating of an instruction word which is read from an instruction memory in a predetermined order;

a calculation unit for performing various calculations on two input data which have been transferred from a data bus;

an internal data memory for storing a calculation result which has been transferred via a data output bus;

an external data memory connecting unit for reading data from an external data memory to said data bus and for writing the data on said data output bus into said external data memory by using values outputted from an address generating unit which generates one output address value and two input address values in parallel for said calculation unit;

a direct memory transfer bus for connecting one port of said internal data memory to said external data memory connecting unit; and, a direct data memory transfer control unit for inputting and outputting the data in units of block between said external data memory connecting unit and said internal data memory via said direct memory transfer bus, independent of the internal operation controlled by said instruction execution control unit.

In accordance with the digital signal processor of the invention, from an address terminal in the external data memory connecting unit, both an upper address and lower address can be outputted in two machine cycles, and the two-dimensional block transfer can be performed without decreasing the efficiency of the internal calculation by employing the DMA bus in the direct data memory transfer control unit. With an employment of the mode register and direct data memory control register, the external address output format and connecting memory in program and direct data memory transmission can be independently set, so that, for instance, the small region at the high-speed memory can be accessed in the program, and the large region at the low-speed memory can be accessed in DMA.

A further object of the present invention is to provide digital signal processor in which a required calculation amount can be reduced to ½ and less in a case where the data precision is a half or less of the data size at its maximum, so that the calculation capabilities can be increased and higher speed calculation can be realized.

To achieve the above object, a digital signal processor is characterized in that when the required data precision is smaller than, or equal to a half of the data size at maximum thereof, the input data is at first multiplied in parallel by the multiplier circuit, and then, the resultant data is shifted as to execute the arithmetic operation. By this arrangement of the multiplier circuit, the calculation speed can be increased. Then, in the multiplier circuit of the digital signal processor according to the invention, the data of the half upper bit side of the input data and also the half lower bit side thereof are regarded as independent data, these multiplications are parallel-processed in four channels, the shift process, or zero set process with respect to the respective resultant data is performed, and thereafter the addition or subtraction on the resultant data is executed, so that the calculation on the plural channels can be executed by the same hardware at a speed two times higher than the normal.

A still another object of the invention is to provide a digital signal processor capable of performing a comparison process without interrupting a continuous process even while a series of continuous processing operation is executed, whereby a branch processing operation can be realized at a better efficiency.

To achieve the above-described object, a digital signal processor according to the invention comprises:

a control circuit including a program counter for address-controlling a fetched instruction;

a data memory for inputting/outputting data; and, a data decision unit for selecting one of an output from an arithmetic calculator within a calculating unit, an output from a logical shifter, and an output from a multiplier in parallel with an operation of the calculating unit; for simultaneously comparing the selected output data with threshold values of "n" in number (n being an integer not less than 1); for judging in which region said output data is present among data regions that are subdivided into (n+1) regions by said threshold values of "n" in number based upon comparison results of "n" in number; for sequentially comparing said comparison result with region limiting conditions of "m" in number (m being an integer less than 1) for designating a preset data region and for outputting branch address information corresponding to a consistent region limiting condition among preset branch addresses of "m" in number corresponding to said region limiting conditions of "m" in number in case of one of said conditions is consistent, or for outputting a signal which indicates discrepancy in all of said conditions in case all of said conditions of "m" in number are discrepant.

In accordance with the data decision unit of the present invention, the parallel-comparison processing is performed between a plurality of threshold values and the outputs from the multiplier unit per machine cycle, and also a specific branch destination is selected from a plurality of branch destinations in accordance with the comparison results, so that without interupting the continuous process, the continuous comparison decision can be performed. As a result, a complex branch processing operation can be controlled at a higher efficiency.

It is another object of the invention to provide a digital signal processor in which lowering the process speed and increasing the step number of instructions are suppressed, and perfect returning from an interuption is secured by restoring the respective register values which have been preserved at the start of the interruption.

To achieve the above-described object, a digital signal processor according to the present invention comprises:

a plurality of register preserving memories for preserving each of the register data when the interruption is performed;

an interruption controlling unit for correctly transferring data to each of said registers at returning from the interrupting operation, and for controlling the complete recovery from the interrupting operation by restarting executions by remaining repeat numbers even after returning from an interruption which has occurred on the way to repeat processing; and, an interruption enable controlling unit for forming an interruption inhibiting period to inhibit a H/W interruption other than the interrupting process.

In the register preserving memories according to the invention, when the interruption is carried out, the register values of the respective registers are written after the previously executed instruction is accomplished. In the interruption controlling unit, the register values which have been written into said register preserving memories are restored to the respective registers at the end of the interrupting operation, and the repeat instruction can be executed by the remaining repeat numbers even after returning from an interruption which has occurred during the repeat instruction execution. Further, the enable control unit can improve the data processing capabilities of the digital signal processor by employing the interruption inhibiting period during which the external interruption is inhibited in the course of waiting the memory subjected to the external data memory access, and in the course of decoding and executing a branch instruction, a return instruction, and a software interrupt instruction.

It is further an object of the invention to obtain a motion compensation calculating method in which the number of calculation can be lowered without degrading the detecting performance of the minimum distortion block, and a simple and compact hard-ware can be realized.

To achieve the above-described object, the motion compensation calculating method according to the invention comprises the following steps so as to subdivide a present input frame of digital image data constructed of a plurality of frames which have sequentially inputted in the time sequence, into a plurality of blocks, and to detect a motion vector and a block for giving the minimum distortion by calculating an inter-pattern analogy between each of the blocks of the image data in the present input frames and respective blocks of a previous input frame, said steps of:

setting as a search small-region, a first motion vector search range having a predetermined size and having, as a center thereof, a position of an input data block to be encoded which is a motion vector search range in the previous frame data;

equally subdividing this first search range into a plurality of regions to obtain motion vectors to be calculated;

allocating first search motion vector groups of "n" in number (n being an integer not less than 1) to the respective regions at a low density;

calculating a distortion of each of the motion vectors, which represents a pattern similarity degree between the block data of the position indicated by this motion vector and the input data block functioning as a presently input block, and for summing results corresponding to the motion vectors of "n" in number to obtain the distortion amount within the region;

detecting a region where the distortion amount becomes minimum within the first search region;

for setting as a minimum distortion region, a region where a distortion amount within this region becomes minimum;

setting as a limited search range, a second motion vector search range having a size smaller than that of the first search range with respect to the minimum distortion range as a center thereof;

allocating second search motion vector groups at a higher density within the second search range; and detecting a block which is most similar to the input data block based upon a minimum distortion amount with respect to the second motion vector groups, whereby both the block providing this minimum block distortion and the motion vector thereof are a final prediction signal and a motion vector.

In accordance with the motion compensation calculating method of the present invention, the motion vector search range is subdivided into a plurality of search small-regions, a plurality of blocks to be searched are allocated at the low density to every region, the region where a sum of the distortion amounts between the blocks becomes minimum with respect to the motion vectors to be calculated, is detected as a minimum distortion region. Furthermore, with respect to this minimum distortion region, the limited search range is set as the high density blocks to be searched, from which the motion vector is detected. At first, a search operation of a position expected to exist a minimum distortion block can be estimated at high precision by comparing the distortion amount in units of region, and thereafter, the high-density motion vector search operation is carried out within the region so as to maintain the higher detecting precision thereby reducing the number of calculations.

BRIEF DESCRIPTION OF THE DRAWINGS

FIG. 2 illustrates a relationship of data blocks;

FIG. 3 is a flowchart for explaining a detecting operation of a minimum distortion effected in the conventional processor shown in FIG. 1;

FIG. 4 illustrates the number of distortion calculations performed in the conventional processor;

FIG. 5 is a schematic block diagram of a second conventional digital signal processor;

FIGS. 6a and 6b are an access timing chart of an external data memory employed in the second conventional digital signal processor;

FIG. 7 is a block diagram of a DSSP chip employed in a third conventional digital signal processor;

FIG. 11 is a block diagram of a fourth conventional digital signal processor;

FIG. 12 is a flowchart of the continuous calculating process containing the data decision in the fourth conventional digital signal processor;

FIGS. 15, 7a and 17b are explanatory diagrams for a conventional tree search type movement compensation calculation method;

FIG. 16 is a schematic block diagram of an image encoding transmission apparatus where a normal interframe encoding process has been performed;

FIG. 18 is a diagram for explaining a conventional tree search type motion compensation calculating method;

FIG. 24 is a diagram for showing DMA transfer regions in an internal data memory and an external data memory;

FIG. 44 is a timing chart for explaining the normal interruption operation of the present invention;

FIG. 45 is a timing chart for explaining the interruption operation during the repeat instruction execution of the invention;

FIGS. 46a and 46b diagrams for explaining a motion compensation calculating method according to a preferred embodiment of the invention; and, FIG. 47 is a flowchart for explaining the motion vector detecting process.

DETAILED DESCRIPTION OF THE PREFERRED EMBODIMENTS

A description will be made of a first preferred embodiment of the present invention with reference to drawings.

Figure 1:
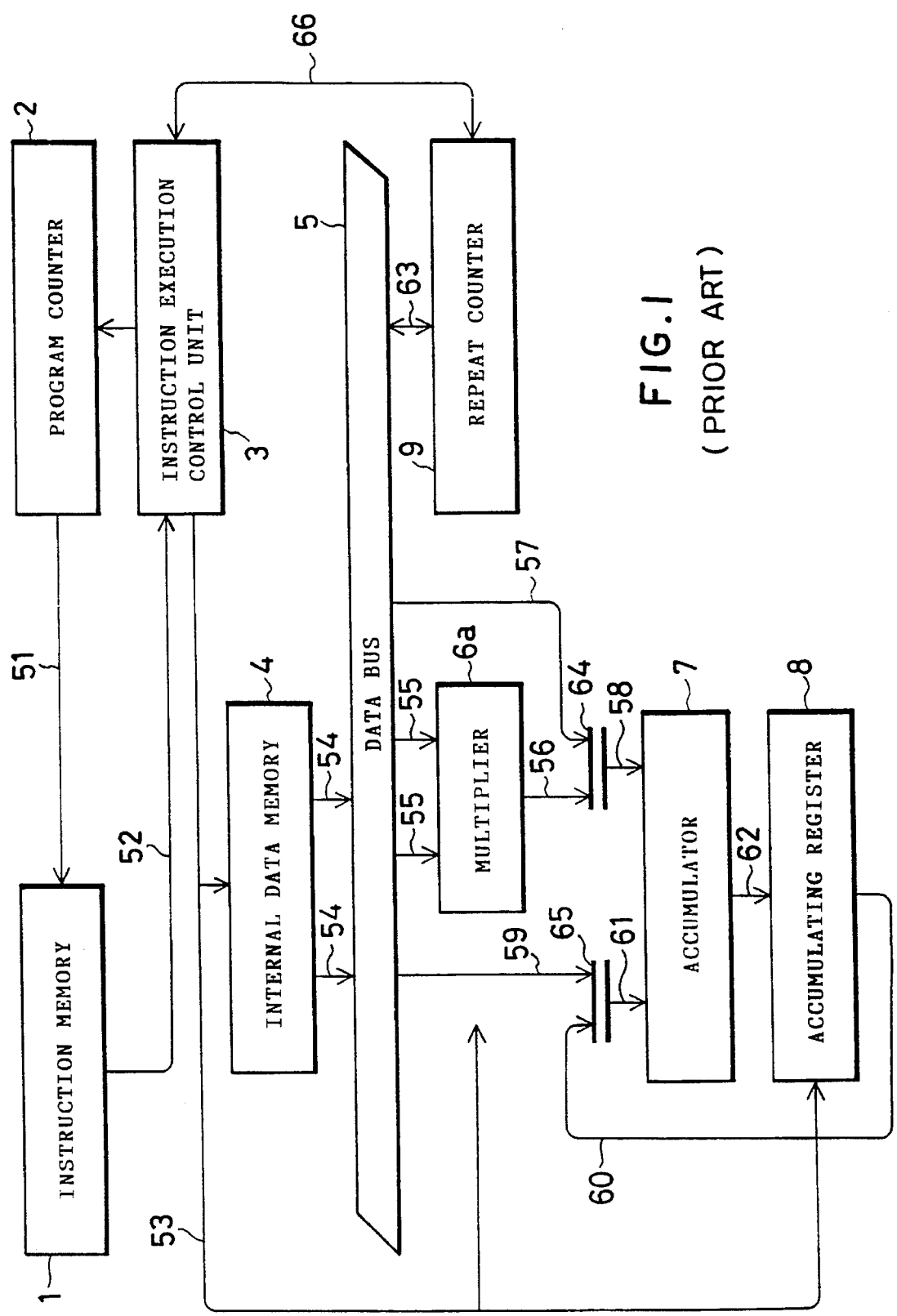
FIG. 1 is a schematic block diagram of a first conventional digital signal processor.
Figure 9:
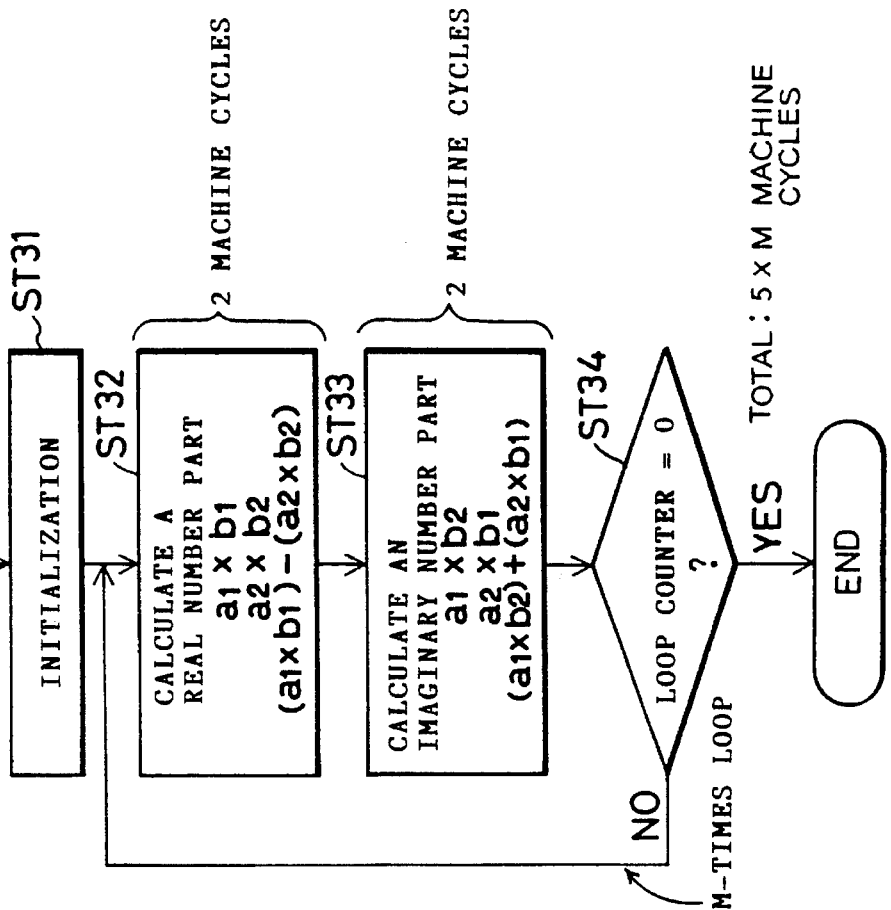
FIG. 9 is a flowchart of the conventional complex number multiplication process.
Figure 8:
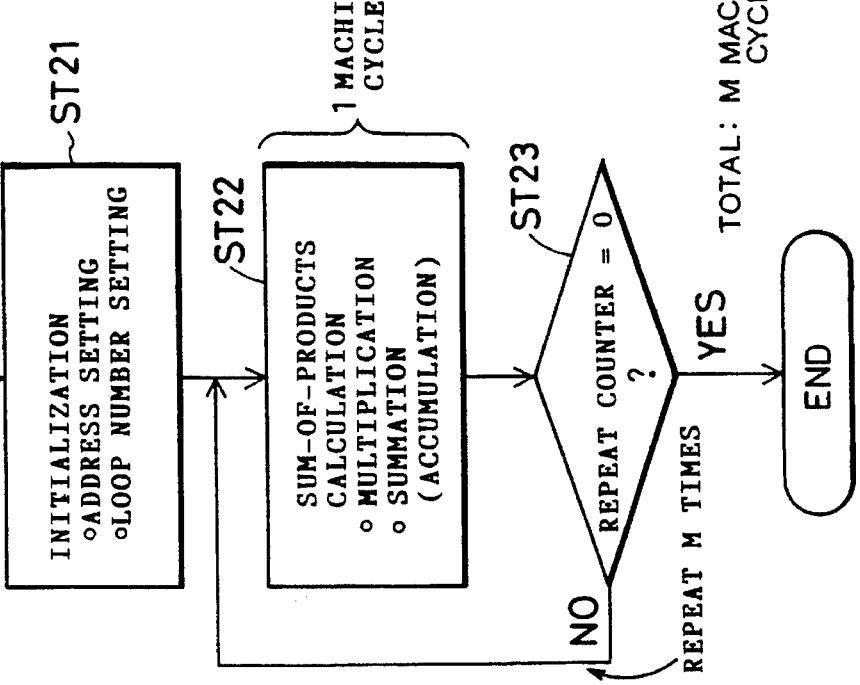
FIG. 8 is a flowchart of a conventional sum-of-product process.
Figure 10:
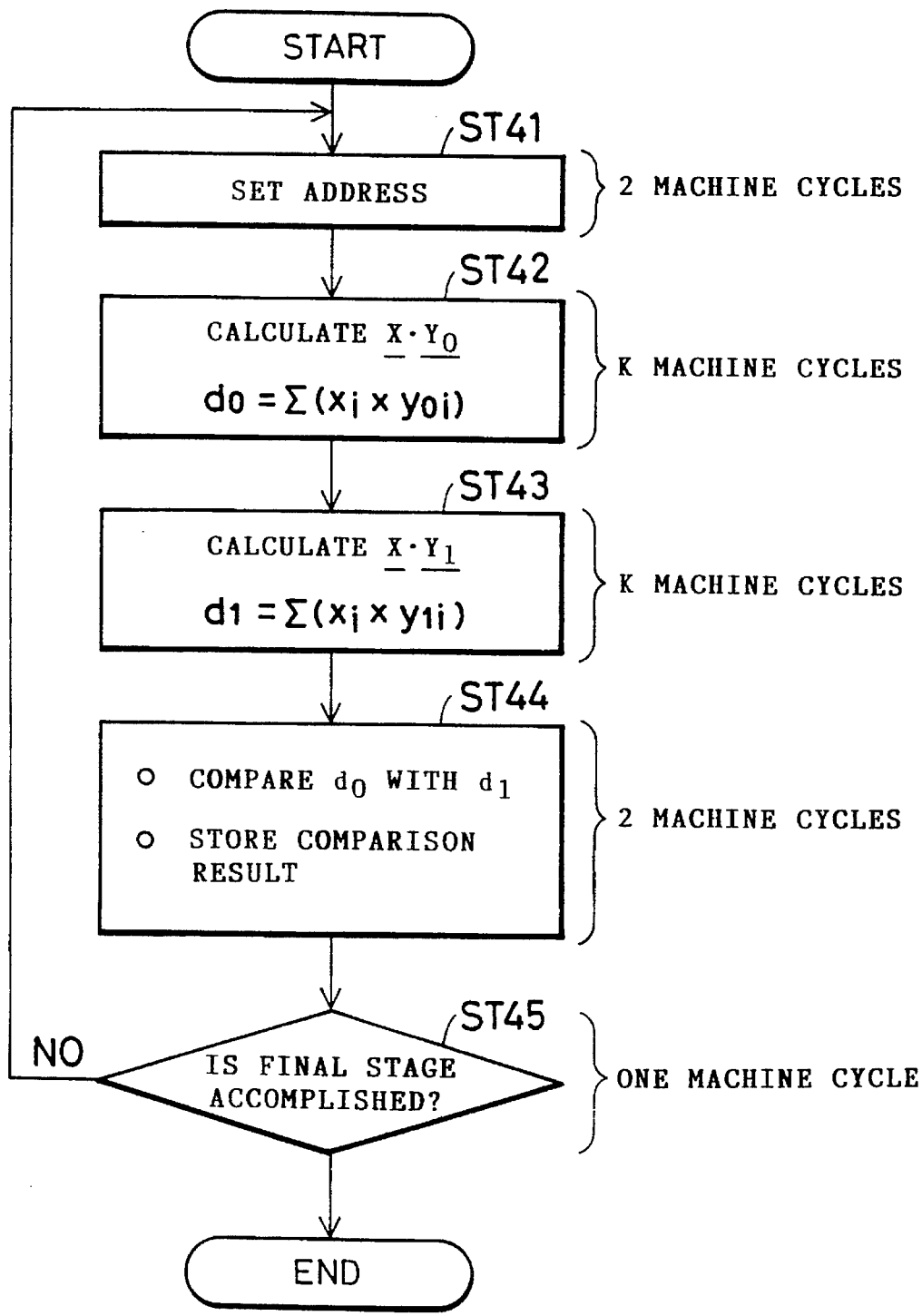
FIG. 10 is a flowchart of the conventional binary tree search vector quantizing process.
Figure 19:
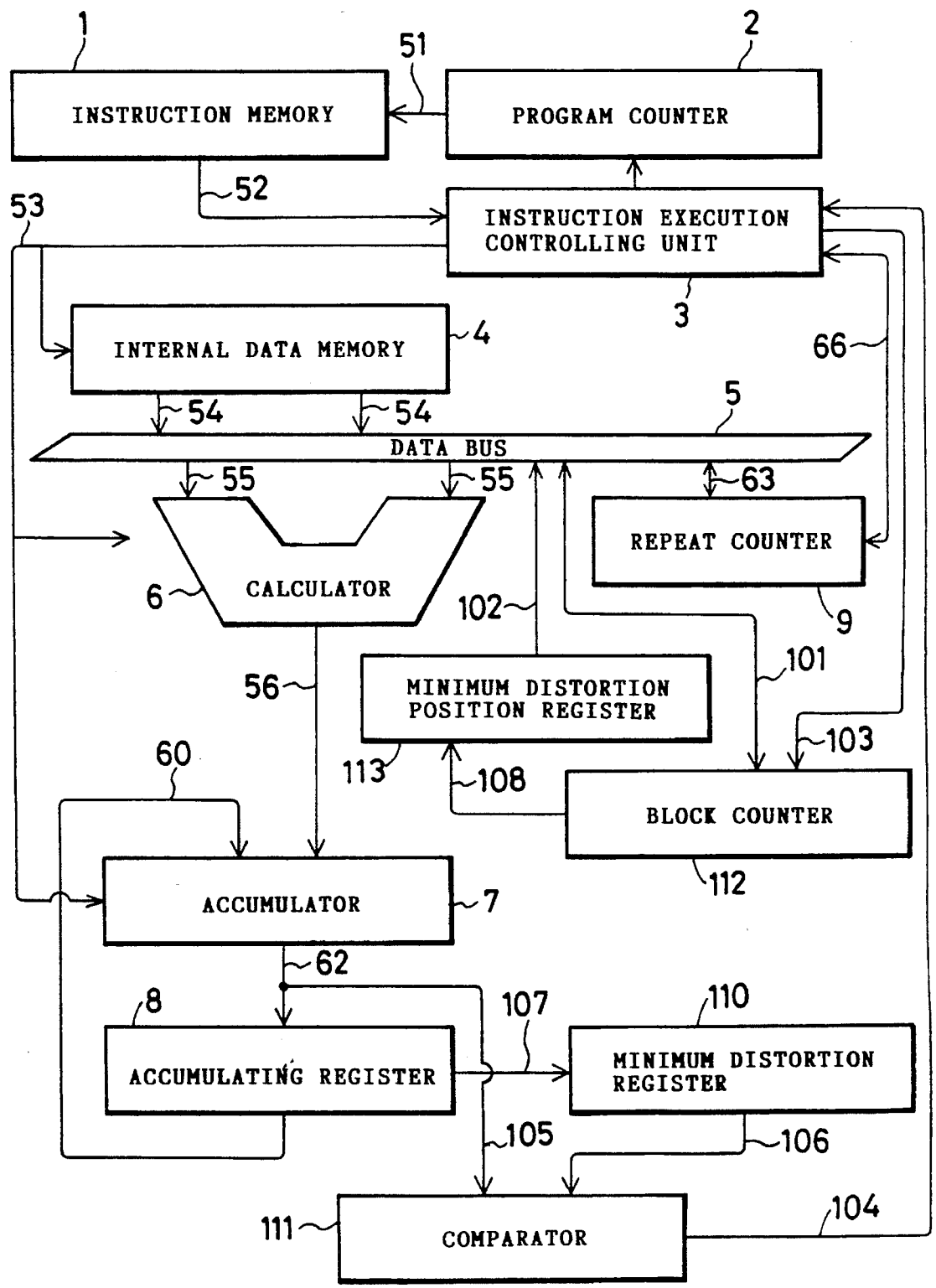
FIG. 19 is a block diagram of a digital signal processor according to a first preferred embodiment of the present invention.

FIG. 19 is a schematic block diagram of a digital signal processor according to the invention. It should be noted that same reference numerals are employed for denoting the same or similar components shown in FIG. 1 and no further explanation thereof is made.

In FIG. 19, reference numeral 110 is a minimum distortion register for holding minimum distortion data; 111 is a comparator for comparing a value of the minimum distortion data of register 110 with an output of accumulator 7 and for outputting a comparison result to an instruction execution controlling unit 3; reference numeral 112 is a block counter for representing a block number which now performs accumulation; and 113 indicates a minimum distortion position register for holding a block number having the minimum distortion.

Furthermore, reference numeral 101 indicates an input/output pass between the data bus 5 and block counter 112; 102 is an output path from the minimum distortion position register 113 to the data bus 5; 103 is an output path for supplying an increment control signal from the instruction execution controlling unit 3 to the block counter 112; 104 is an output path for announcing the comparison result of comparator 111 to the instruction execution controlling unit 3; 105 represents an output path for supplying the output data of the accumulator 7 to the comparator 111, 106 represents an output path for supplying the data of the minimum distortion register 110 to the comparator 111; 10 represents an update path from the accumulating register 8 to the minimum distortion register 110; and, 108 indicates an update path from the block counter 112 to the minimum distortion position register 113.

Figure 20:
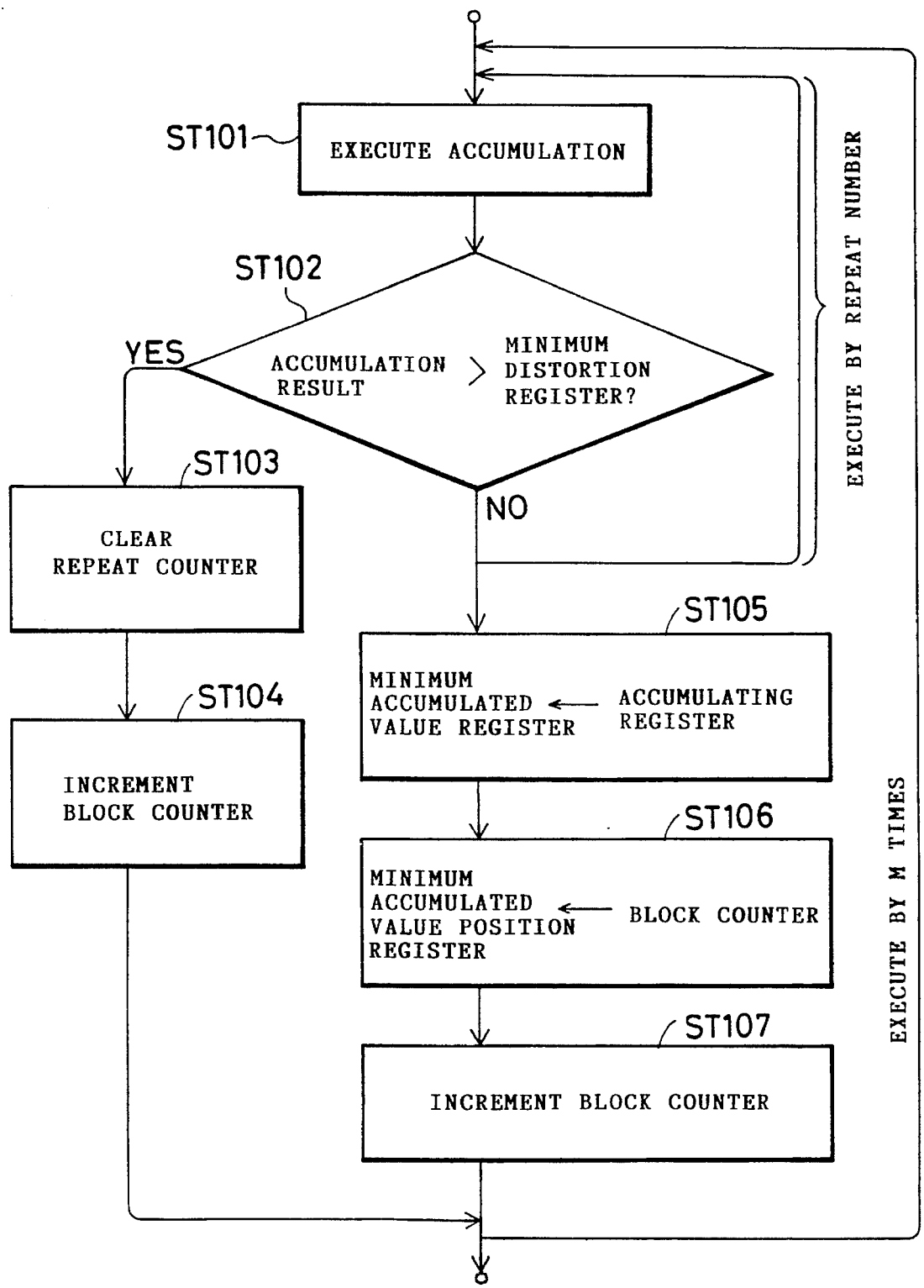
FIG. 20 is a flowchart for representing an operation of a minimum distortion detection effected in the first embodiment.

FIG. 20 is a flowchart for explaining an operation to obtain a block number and a distortion corresponding to a minimum distortion among blocks of "M" in number by employing the digital signal processor shown in FIG. 19.

In response to an address output from the program counter 2, an instruction word is read from the instruction memory 1 and input into the instruction execution controlling unit 3 via an output path 52. Based on a decoded instruction, the instruction execution controlling unit 3 sends a control signal to the various circuit portions so as to control them.

In the case where the decoded instruction corresponds to the instruction of the minimum distortion detection which is accompanied by accumulations such as the difference absolute value accumulation and sum of products, the data transfer of the read data from the data memory 4 to the data bus 5, the data transfer of at the most two pieces of output data from the data bus 5 to the calculator 6, and the data transfer of accumulation result from the accumulator 7 by using the output data of the calculator 6 and the output data of the accumulating register 8 (step ST 101).

On the other hand, the accumulation result which is supplied via the output path 105 branched from the output path 62 of the accumulator 7 is compared with the output data which is supplied from the minimum distortion register 110 via output path 106, by the comparator 111 every cycle (step ST 102).

The comparison result obtained by the comparator 111 is transferred to the instruction execution controlling unit 3 every cycle. When the accumulation result of the accumulator 7 is greater than the value of the minimum distortion register 110, namely if YES, then the accumulation is interrupted to clear the repeat counter 9 to "0" and simultaneously to increment the value of the block counter 112 in response to the increment control signal derived from the instruction execution controlling unit 3, and then, the process is advanced to the next step (steps ST 103) and 104).

When the accumulation operation is carried out by the number set in the repeat counter 9, and the accumulation is normally accomplished, the value of the accumulating register 8 is written and updated into the minimum distortion register 110 (step ST 105); the value of the block counter 112 is written and updated in the minimum distortion position register 113 (step ST 106), and the block counter 112 is incremented by the increment control signal 103 (step ST 107).

Figure 21:
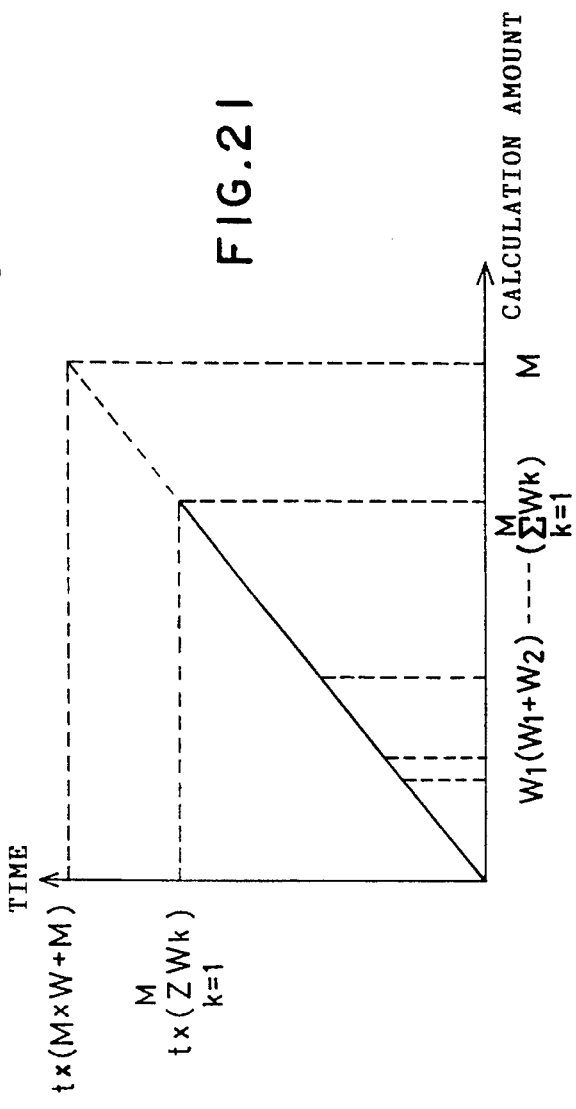
FIG. 21 is a diagram for representing a distortion calculating amount according to the invention.

When the minimum distortion block with respect to a block "A" of a certain data series is detected among "M" pieces of blocks "$y_i$" to be searched in accordance with the above-described processing operation, assuming the number of the accumulations for a K-th block is "$W_k$" ($W_k$ is an integer, $1 \leq W_k \leq w$), the sum-of-products process is performed by $$\sum_{k=1}^{M} W_k,$$

and both the minimum distortion and the block number of the minimum distortion are obtained simultaneously with the accumulation. As a result, neither comparison nor update processing is required to obtained this minimum distortion and the minimum distortion block number. As shown in FIG. 21, the calculation processing time is shortened only to $t \times (\Sigma W_k)$.

It should be noted that although the difference square summation has been employed as the distortion calculation according to the above preferred embodiment, either difference absolute values or inner products may be utilized.

Also, the above-described criterion for the comparator is "whether or not the accumulated output from the accumulator exceeds the value of the minimum distortion register", however, another criterion may be made to be "whether the accumulated output from the accumulator exceeds or is equal to the value of the minimum distortion register".

A description of a second preferred embodiment of the invention will now be made.

Figure 22:
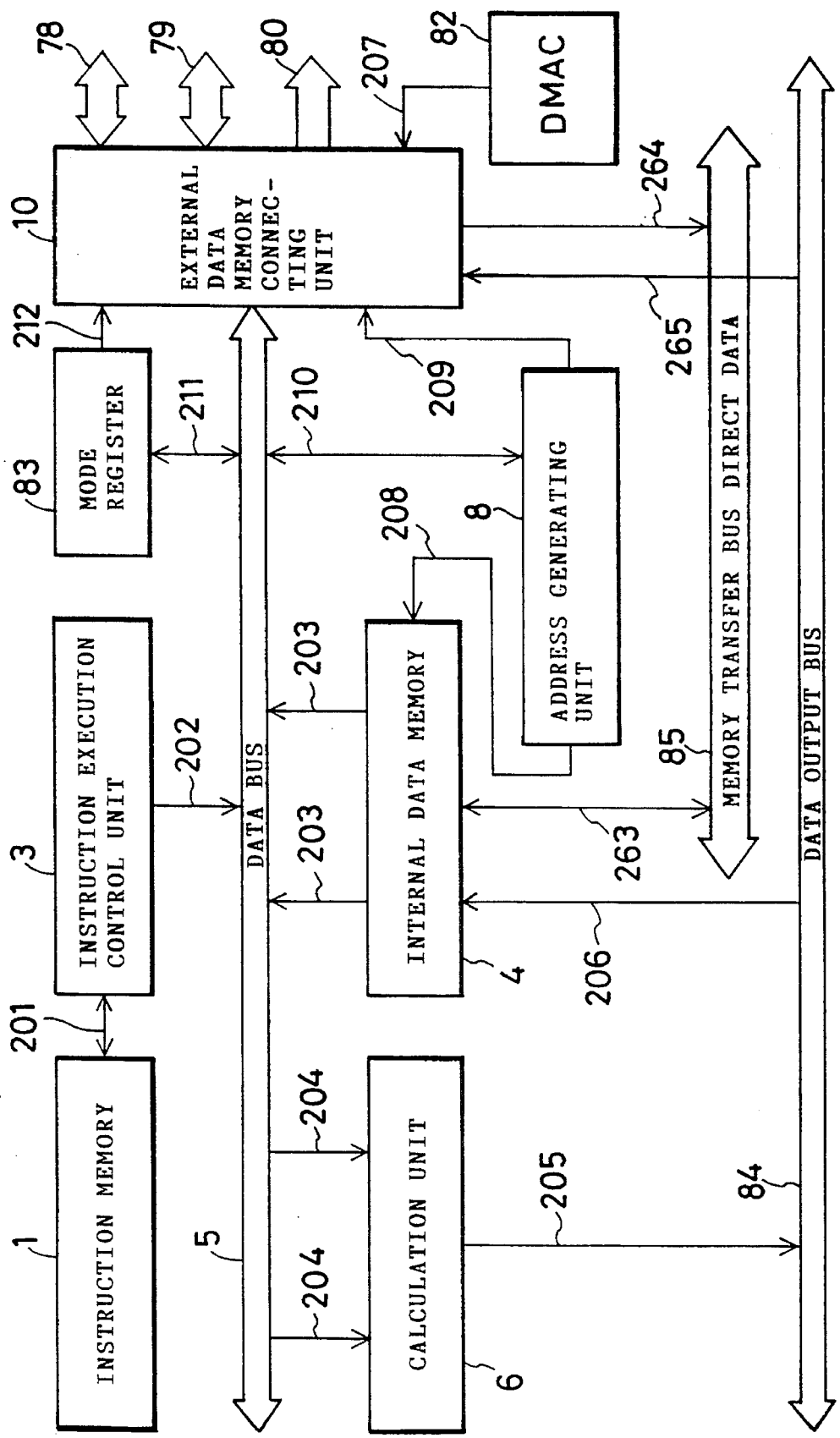
FIG. 22 is a schematic block diagram for showing a digital signal processor according to a second preferred embodiment of the invention.

FIG. 22 is a schematic block diagram of a digital signal processor according to the present invention. It should be noted that the same reference numerals will be employed for denoting the same or similar circuit elements shown in FIG. 5 and no further explanation thereof will be made.

In the processor shown in FIG. 22, reference numeral 83 indicates a mode register for setting the access method of the external data memory; 84 indicates an output bus for outputting the calculation result; and 85 is a direct data transfer bus.

Furthermore, reference numeral 211 is an input/output path of the data from the data bus 5 to the mode register 83; 212 is an output path of the control signal from the mode register 83 to the external data memory connecting unit 10; 263 indicates an input/output path of the data from the direct data memory transfer bus 85 to the data memory 4; 264 indicates an input/output path of the data between the direct data memory transfer bus 85 and external data memory connecting unit 10; and reference numeral 265 indicates an output path of the data from the data output bus 84 to the external data memory connecting unit 10.

Figure 23:
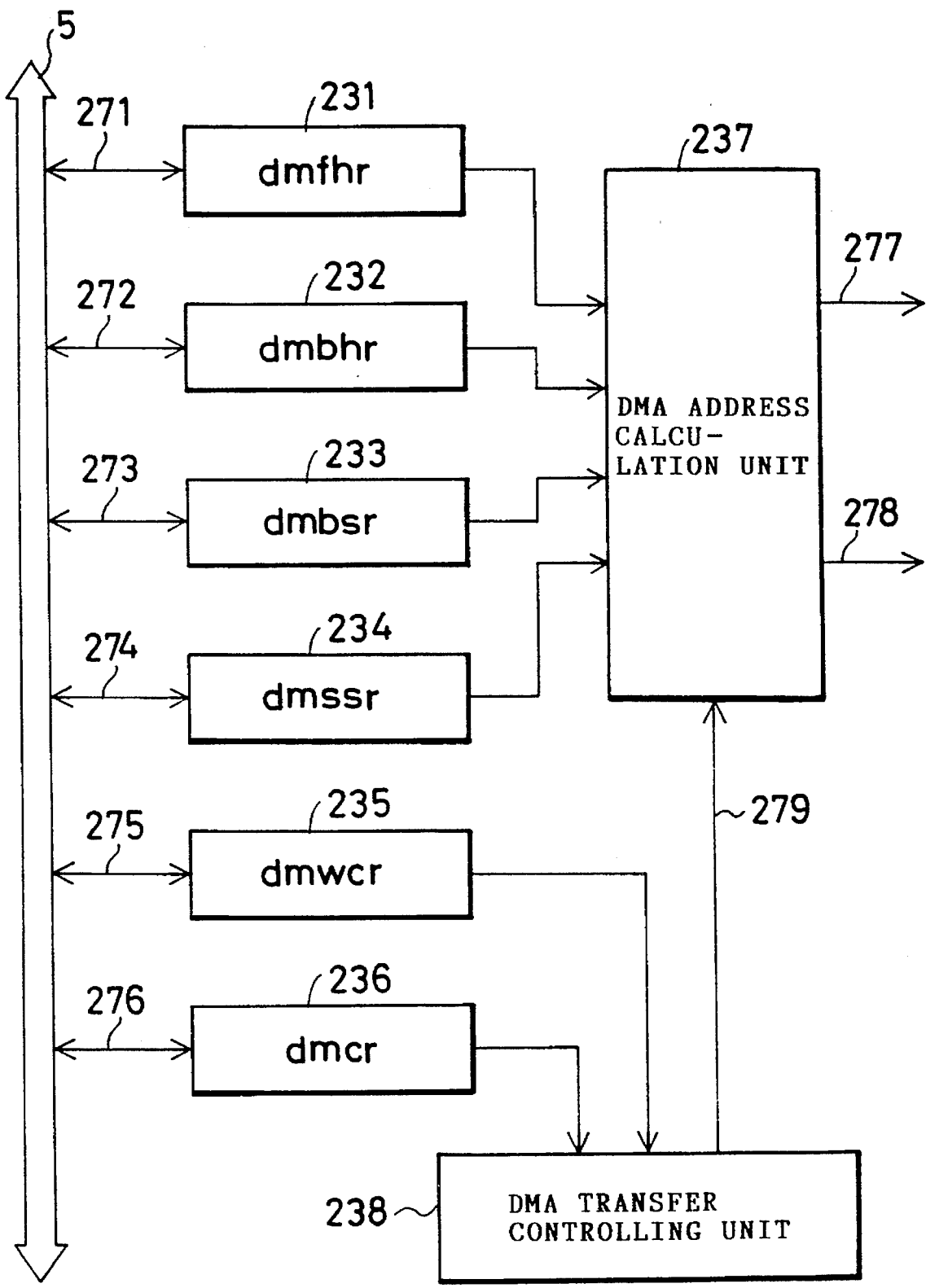
FIG. 23 is a block diagram for representing an arrangement of a direct data transfer controlling unit shown in FIG. 22.

FIG. 23 is a schematic block diagram of an arrangement of DMAC 82 employed in FIG. 22. In FIG. 23, reference numeral 231 indicates a frame horizontal size register (dmfhr) for representing a horizontal size of a two-dimensional address space (domain); 232 denotes a block horizontal size register (dmbhr) for representing a horizontal size of a rectangular portion within the two-dimensional address space; 233 denotes a block start address register (dmbsr) for indicating a head address of the external data memory to execute a DMA transfer; 234 represents an internal memory start address register (dmssr) for indicating a head address of the internal data memory to execute the DMA transfer; 235 represents a word register (dmwcr) to indicate the number of words of the DMA transfer; 236 indicates a DMAC register (dmcr) for selecting an external address output mode at the DMA transfer, and the external memory; 237 is a DMA address calculation unit; and reference numeral 238 is a DMA transfer controlling unit to control the DMA transfer.

Furthermore, reference numeral 271 is an input/output path of the frame horizontal size register 231; 272 is an input/output path of the block horizontal size register 232; 273 indicates an input/output path of the block start address register 233; 274 is an input/output path of the internal memory start address register 234; 275 is an input/output path of the word register 235; and reference numeral 276 is an input/output path of the DMAC register 236.

In addition, reference numeral 277 indicates an output path for the internal data memory address of the DMA transfer from the DMA address calculation unit 237; 278 is an output path for the external data memory address of the DMA transfer from the DMA address calculation unit 237; and 279 denotes an output path for outputting the control signal such as a DMA transfer word number from the DMA transfer controlling unit 238 to the DMA address calculating unit 237.

FIG. 24 illustrates an example of a transfer region of the DMA transfer performed between the internal data memory 4 and external data memory 241 by DMAC 82 shown in FIG. 23.

Figure 25:
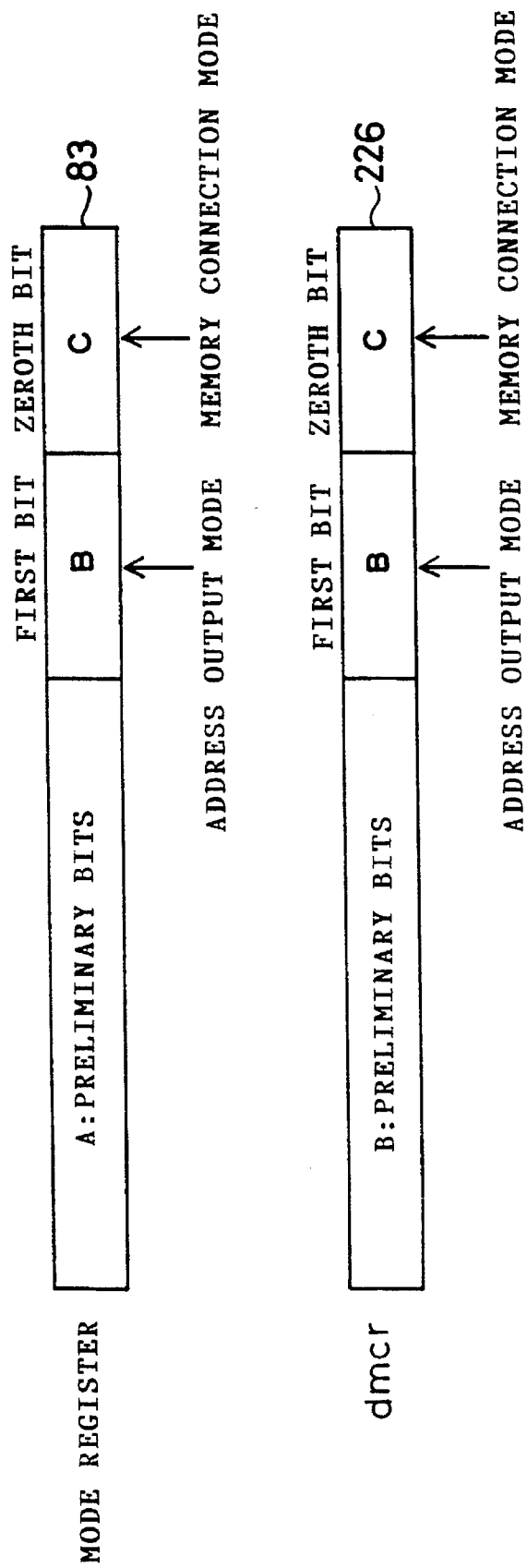
FIG. 25 is a diagram for representing a register arrangement example for setting external data memory access methods of a programmed transfer and a DMA transfer.

FIG. 25 is a diagram for illustrating bit arrangements of the DMCA register 236 shown in FIG. 23 and the mode register 83 shown in FIG. 22. In FIG. 25, symbol "A" denotes preliminary bits, symbol "B" indicates a first bit of an address output mode, and symbol "C" indicates a zeroth bit of a memory connection mode.

Figure 26:
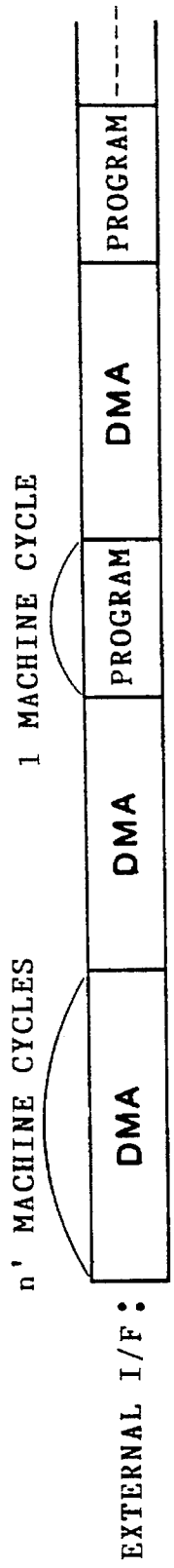
FIG. 26 is a timing chart in case that the external data memory is accessed by the programmed and DMA transfer.

FIG. 26 illustrates a timing example where the external data memory is accessed by the programs and DMA's.

An operation of the digital signal processor will now be described. The instruction word read from the instruction memory 1 is inputted to the instruction execution controlling unit 3 via the input/output path 201. In response to the control signal decoded by this instruction execution controlling unit 30 the calculation data from the internal data memory 4 to the data bus 5 is read via the output path 203, whereas the data from the data bus 5 is inputted to the calculation unit 6 via the output path 204. The calculation processing result at the calculating unit 6 is outputted to the data output bus 84 via the output path 205, the data from the data output path 206 is written into the internal data memory 4, and also the data from the data output bus 84 is written into the external data memory connecting unit 10 via the output path 265.

Both the address of the input data which has been input from the internal data memory 4 via the output path 204 and a write destination address of the internal data memory 4 of the output data which has been outputted from the calculation unit 6 via the output path 205 to the data output bus 84, are controlled by the address generating unit 8 having three-line address generators.

The address generating unit 8 generates addresses by using readable/writable data which has supplied from the data bus 5 via the input/output path 210, and controls of the internal data memory 4 and external data memory connecting unit 10 are performed by using the data output via the output path 208 and 209, respectively, so as to determine the write destinations of the input data and output data to the calculating unit 6.

The access mode of the external data memory 241 by means of the external data memory connecting unit 10 is determined by a value which has been set via the data bus 5 into the mode register 83 in accordance with the instruction word read from the instruction memory 1.

When, on the other hand, the data is set into the specific register of DMAC 82 via the data bus 5 based upon the above-described instruction word, the DMA transfer is initialized. The external data memory connecting unit 10 is controlled by DMAC 82 independently to carry out the data transfer between the internal data memory 4 and external data memory 241 via the input/output paths 263 and 264, and direct data transfer bus 85.

The DMA transfer controlling unit 238 performs an initialization of the DMA transfer by means of the data which has been set in the DMA address calculating unit 237 via the data bus 5. The DMA address calculating unit 237 generates a two-dimensional block address 278 with respect to the address of the external data memory 241, and also an ascending one-dimensional address 277 with respect to the internal data memory 4 based upon the values of the frame horizontal size register 231, block horizontal size register 232, block start address register 233 and internal memory start address register 234.

In the DMA transfer controlling unit 238, when the DMA transfer word number which has been set in the word register 235 is ended, a termination signal is sent to the DMA address calculating unit 237.

As shown in FIG. 24, the above-described DMA transfer can De performed between arbitrarily rectangular regions (k-line ×l-column in FIG. 24) of the external data memory 241 from the arbitrary address (address "t" in FIG. 24) and of the internal data memory 4 from the arbitrary address (address "S" in FIG. 24).

As shown in FIG. 25, when both the zeroth bits of the mode register 83 and DMAC register 236, which indicate the memory connecting mode, are "0", it is in a waiting mode waiting until the read/write completion signal from the external device is detected during the use of the low-speed memory. To the contrary, when the zeroth bit indicating the memory connecting mode is in "1", it is such a mode that after the lower bits of the address are outputted, the read and write operations are accomplished in one machine cycle.

When the first bit, which indicates the address output mode, is "0", both the upper and lower bits of the address are output in two machine cycles, whereas when this bit is "1", only the lower bits of the address are outputted in one machine cycle.

By independently setting the mode register 83 and DMAC register 236, the external memory access from the program and DMA can be independently carried out.

In FIG. 26, there is shown an access timing example of the external data memory 241 in the case where "1" is set as the address output mode and as the memory connecting mode in the mode register 83 shown in FIG. 25, and "0" is set as the address output mode and as the memory connecting mode in DMAC register 236.

The access to the external data memory 241 from DMAC 82 is accomplished by detecting the read/write completion signal from the external device in case of the low speed memory (n' machine cycles in FIG. 26), whereas the external data memory access from the program is completed in 1 machine cycle in case of the high speed memory.

The external data memory access by DMA is continuously performed unless the external data memory access is effected by the program. Then, when the external data memory access is executed by the program, the access operation by DMAC 82 is interrupted and after the access operation by the program is accomplished, the process is restarted.

Figure 27:
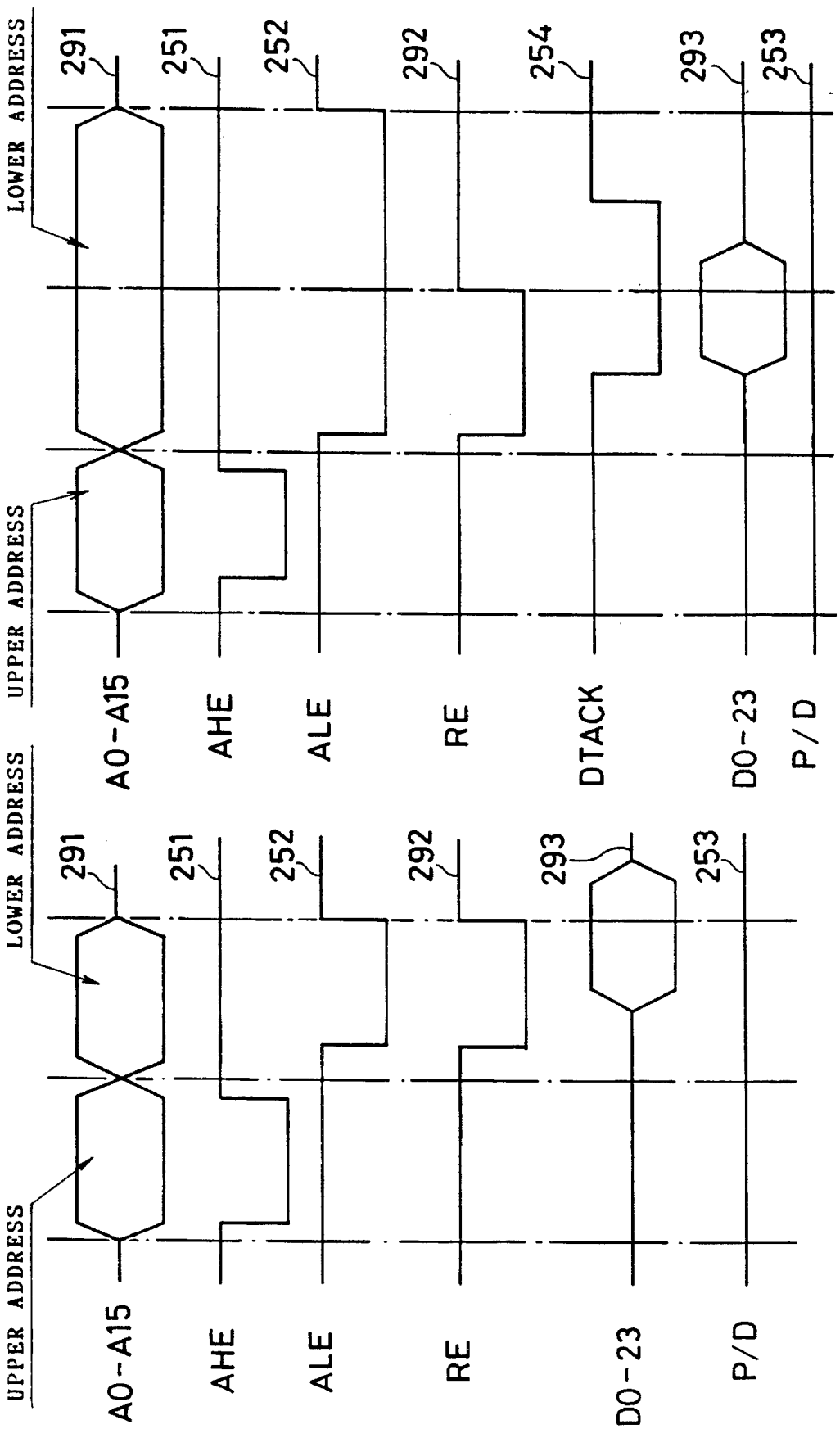
FIGS. 27a and 27b a timing chart of the external data memory access in an external data memory connecting unit shown in FIG. 22.

FIG. 27 is a timing chart of the external data memory access (read out) in the external data memory connecting unit 10 shown in FIG. 22. It should be noted that same reference numerals will be employed for denoting the same or similar circuit elements shown FIG. 6, and no further explanation thereof is made.

In FIG. 27, reference numeral 251 is a signal for controlling upper address timings when the address is outputted (referred to as an "AHE"); 252 is a signal for controlling lower address timings when the address is outputted (referred to as an "ALE"); 253 indicates a signal for announcing to the external device whether or not the external data memory access is executed by the processor or DMA (referred to as a "P/D"); and reference numeral 254 is a read/write completion signal from the external device (referred to as a "DTACK").

When the high speed memory shown in FIG. 27(a) is used, AHE 251 is asserted in the first machine cycle and also the upper address is outputted from an external address terminal 291 of the address bus 78, both ALE 252 and RE 292 are asserted in the second machine cycle, and the data from an external data terminal 293 of an external data memory 241 is fetched at the trailing edge of the second machine cycle.

When the low speed memory as shown in FIG. 27(b) is used, AHE 251 is asserted in the first machine cycle and also the upper address is outputted from the external address terminal 291 of the address bus 78, both ALE 252 and RE 292 are asserted in the second machine cycle, RE 292 is negated and the data from the external data terminal 292 of the external data memory 241 is fetched at the trailing edge of a cycle where the external device asserts DTACK 254. Furthermore, ALE 252 is negated at the trailing edge of the cycle where DTACK 254 negated.

As above-described, the external data memory connecting unit 10 has the following features.

(a). The connecting unit 10 includes two address output modes to the external data memory. In one address output mode, both the upper and lower addresses are outputted in two machine cycles, so that all of external data memory regions can be accessed. In the other address outputted mode, the lower address is output only in one machine cycle, so that the specific region of the external data memory 241 can be accessed at a high speed. These two modes are changed by the value of the mode register set by an instruction.

(b). It is possible to connect two types of external data memory 241. One is the high speed memory where after the lower address is outputted, the read/write operation is accomplished in one machine cycle. The other is the low speed memory where it waits until the read/write completion signal from the external device is detected. These two types are changed by the value of the above-described mode register.

The direct data memory transfer unit has the following features.

(c). In accordance with the direct memory control register set by an instruction, the above-described two address output modes and two types of external data memory connections are available independent from the external data memory access by an internal instruction based upon the value of the mode register.

(d). The address designation with respect to the external data memory connecting unit is so arranged in a manner that the rectangular portion of k-lines by l-columns (k, l are integers) in the two-dimensional address space of m-lines by n-columns (m, n are positive integers) are sequentially designated. The address with respect to the internal data memory is designated from an arbitrary starting address in an ascending order, and the two-dimensional data transfer is performed between the external data memory and internal data memory. Further, when the data transfer is commenced, the transfer direction and transfer data number are designated by an instruction, so that the data input/output and internal calculation process with the external data memory are executed in parallel in units of rectangular block of k-lines by l-columns.

It should be noted that in the above-described preferred embodiment, a description was made that the number of the external address terminals was 16 bits, however other terminal numbers may be utilized.

It should also be noted that since there is no limiting relationship between the essential points of the invention and detailed specifications of the above-described preferred embodiments, the contents of the invention are not restricted thereto.

Figure 28:
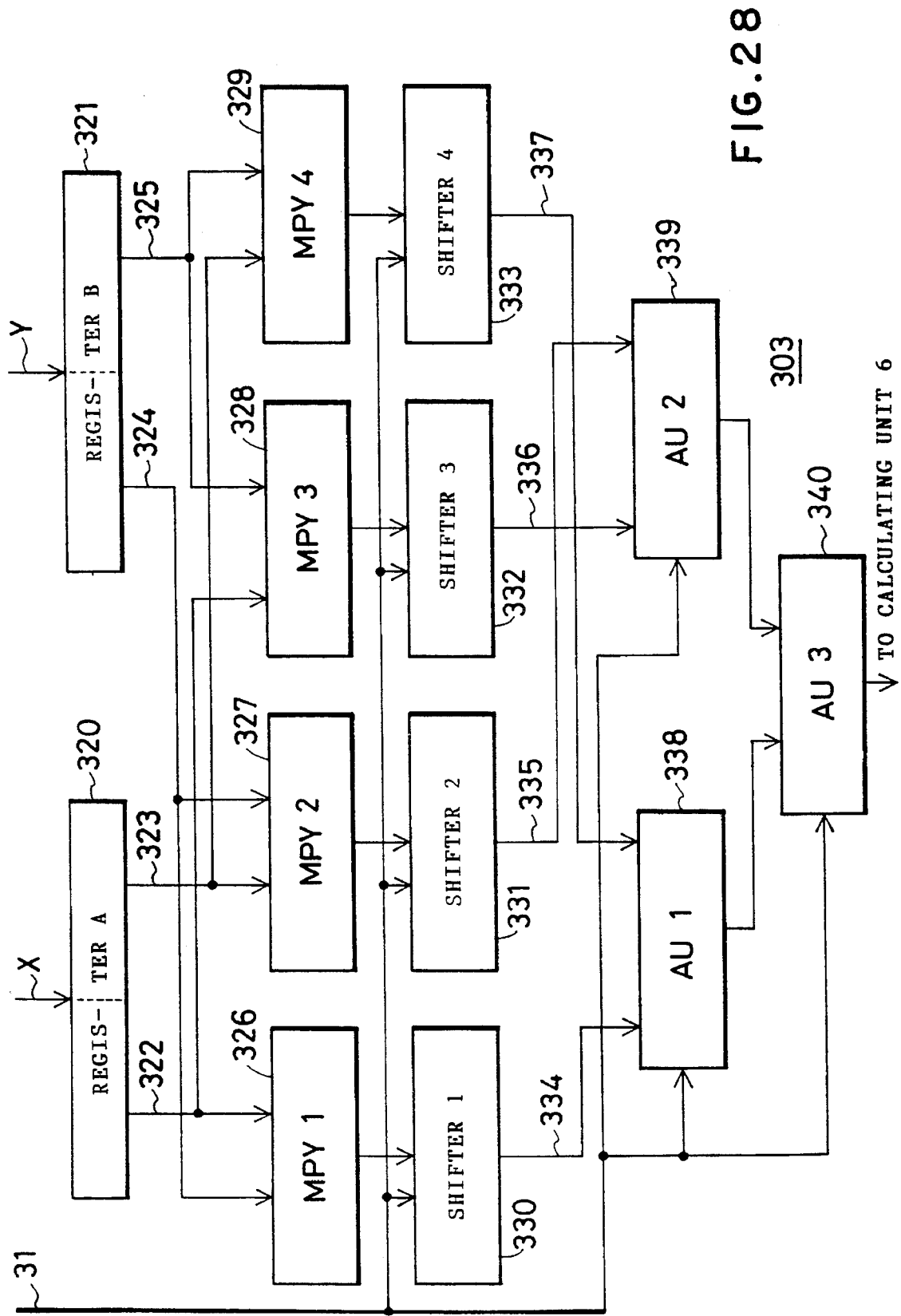
FIG. 28 is a detailed circuit diagram of a multiplier circuit of a digital signal processor according to a third preferred embodiment of the invention.

A third preferred embodiment of the invention will now be described with reference to the drawings. FIG. 28 is a specific arrangement of a multiplier circuit 303 according to the third preferred embodiment of the invention. In principle, the circuit arrangement of DSP according to the invention is the same as that of the conventional one described in FIG. 7. However, the arrangement of the multiplier circuit 303 is mainly different.

In FIG. 28, reference numeral 320 indicates a register A as a first 2n-bit sized register, for inputting data X among two pieces of data X and Y which are simultaneously read out from the data memory 4; 321 is a register B as a second 2n-bit sized register, for inputting the data Y; reference numerals 322 and 323 represent upper n-bits of the data X (referred to as "data A1") set in the register A and lower n-bits thereof (referred to as "data A0") respectively; 324 and 325 denote upper n-bits (referred to as "data B1") of the data Y set in the register B, and lower n-bits thereof (referred to as "data B0"); 326, 327, 328 and 329 represent a first multiplier (referred to as an "MPY1"), a second multiplier (referred to as an "MPY2"), a third multiplier (referred to as an "MPY3") and a fourth multiplier (referred to as an "MPY4") for multiplying the data A1 and B1; the data A0 and B1; the data A1 and B0; and the data A0 and B0 in parallel, respectively; reference numerals 330, 331, 332 and 333 represent a first shifter (referred to as a "shifter 1"), a second shifter (referred to as a "shifter 2"), a third shifter (referred to as a "shifter 3") and a fourth shifter (referred to as a "shifter 4") for performing a shift process or zero set in accordance with a microprogram in the program memory 1 with respect to the outputs from MPY1, MPY2, MPY3 and MPY4, respectively; 334, 335, 336 and 337 are output data from the first to fourth shifters 30 to 33, respectively; 338 and 339 denote a first arithmetic calculator (referred to as an "AU1") and a second arithmetic calculator (referred to as an "AU2") for inputting therein the outputs from the shifters 1 and 4 or the shifters 2 and 3, respectively, and for summing or subtracting these outputs in accordance with the microprogram; and reference numeral 340 indicates a third arithmetic calculator for inputting therein the outputs from AU1 and AU2 and for summing or subtracting these outputs in accordance with the microprogram so as to output the final calculation resultant data of 4n-bits to the calculating unit 6.

An operation will now be described. The data input/output in the data memory 4, and various calculation processes at the multiplier circuit 303 and calculating circuit 6 as shown in FIG. 7 in detail, are executed in such a manner that the control circuit 3 reads the microprogram in the program memory 1, the instructions thereof are decoded, and the pipeline process is carried out in response to the control signal based on the decoded instructions. Where, the data size is 2n-bits at a maximum size, the resultant n-bit data will be referred to as single precision data, and 2n-bit data will be referred to as double precision data.

The multiplication system instructions based upon the microprogram include various instructions, such as a double precision multiplication (2n-bits ×2n-bits) for multiplying 2n-bit data with each other, a single precision multiplication (n-bits×n-bits) for multiplying n-bit data with each other, a single precision sum-of-products, a single precision complex number multiplication, and a binary tree vector quantizing multiplication.

However, in this case, in the multiplier circuit 303 shown in FIG. 28, each part thereof will be operated in response to the control signal corresponding to the sorts of the above instructions, as follows. That is, two pieces of data simultaneously read from the data memory 4 are supplied to the multiplier circuit 303 via the selectors 301 and 302, the data X is set into the register A and the data Y is set into the register B. It should be noted that both the data X and Y are 2-bit sized data at the maximum value.

The upper n-bit data A1 of the data X and lower n-bit data A0 thereof which have been set into the register A are supplied to MPY 1, MPY 3 or MPY 2, MPY 4 respectively. Also, the upper n-bit data B1 and lower n-bit data B0 of the data Y which have been set into the register B are supplied to MPY 1, MPY 2 or MPY 3, MPY 4 respectively. As a consequence, MPY 1 multiplies the data A1 by B1, MPY 2 multiplies the data A0 by B1, MPY 3 multiplies the data A1 by B0, and MPY 4 multiplies the data A0 by B0 in parallel, and the respective 2n-bit sized resultant data are supplied to the shifter 1, shifter 2, shifter 3, and shifter 4. As to the resultant data input into the respective shifter 1 to shifter 4, the shift process or zero set process is carried out in accordance with sorts of the instruction. Thus, the output data 334 to 337 of 4n-bits derived from the respective shifters 1 to 4 are input into AU1 and AU2.

AU1 performs the summation or subtraction on the data from the shifters 1 and 4, and the resultant data is supplied to AU3. AU2 performs the summation or subtraction on the data from the shifters 2 and 3, and supplies the resultant data to AU3 AU3 furthermore executes the summation or subtraction on the data derived from AU1, AU2, and thereafter sends the resultant data as the 4n-bit final calculation resultant data to the calculation unit 6.

A description of a required amount of calculation on the various calculating modes will now be made.

(1). A double precision multiplication.

Figure 29:
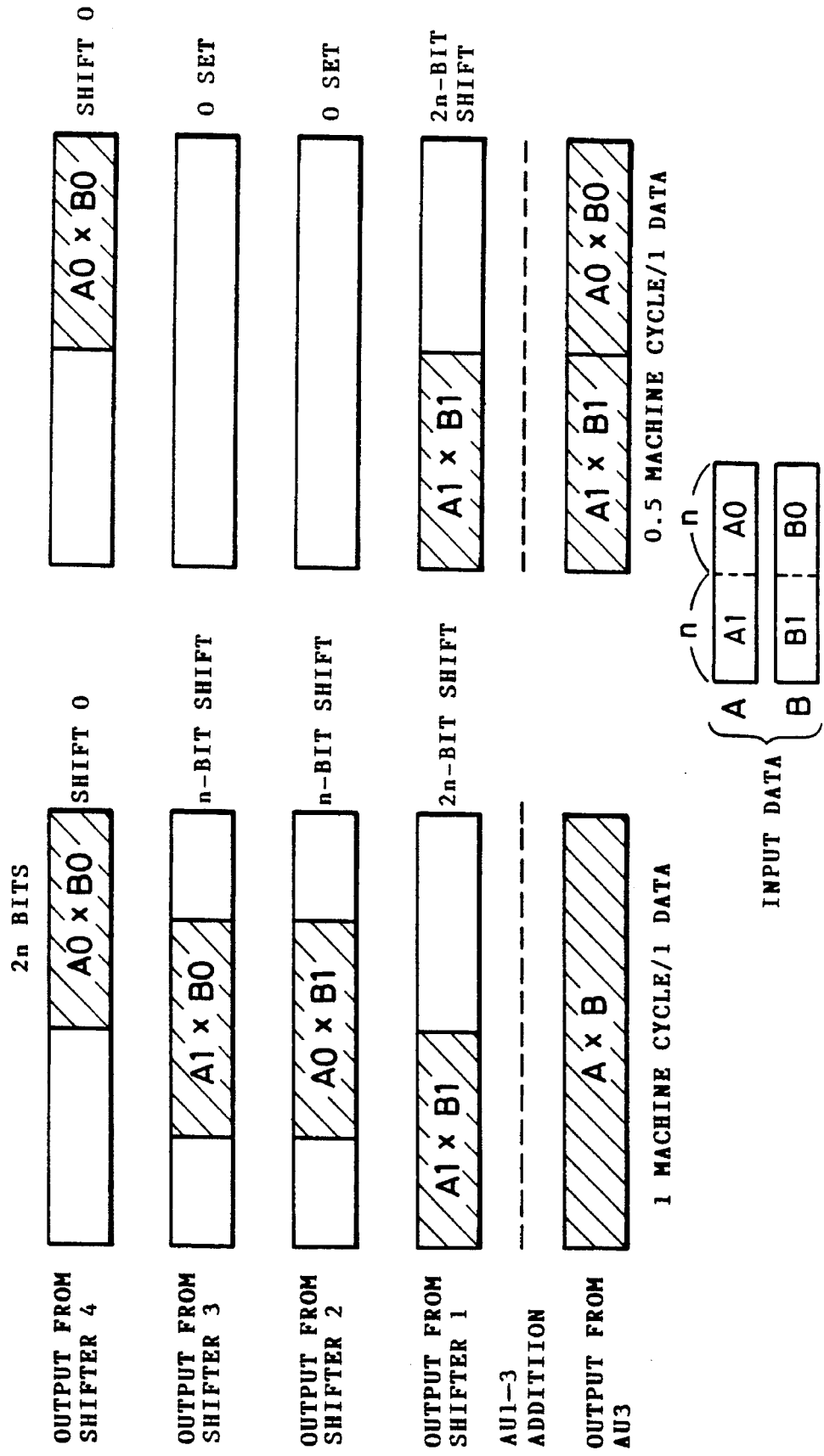
FIGS. 29a, 29b are state diagrams of shifters and outputs for representing operation contents of a double precision multiplication and a single precision parallel multiplication.

FIG. 29(a) represents a diagram for showing operation contents of the shifters 1 to 4 and AU1 to AU3 in this case. That is, in the shifter 4, the shift value 0 is processed, and the n-bit left shift process is performed in the shifters 2 and 3, further 2n-bit left shift process is performed in the shifter 1. In AU2, the summation is carried out, the summation is executed in AU1, and the summation is performed in AU3, whereby the double precision multiplication is performed. In this case, a required amount of calculation is 1 machine cycle per 1 data, which is the same as that of the conventional apparatus.

(2). A single precision parallel multiplication.

Figure 36:
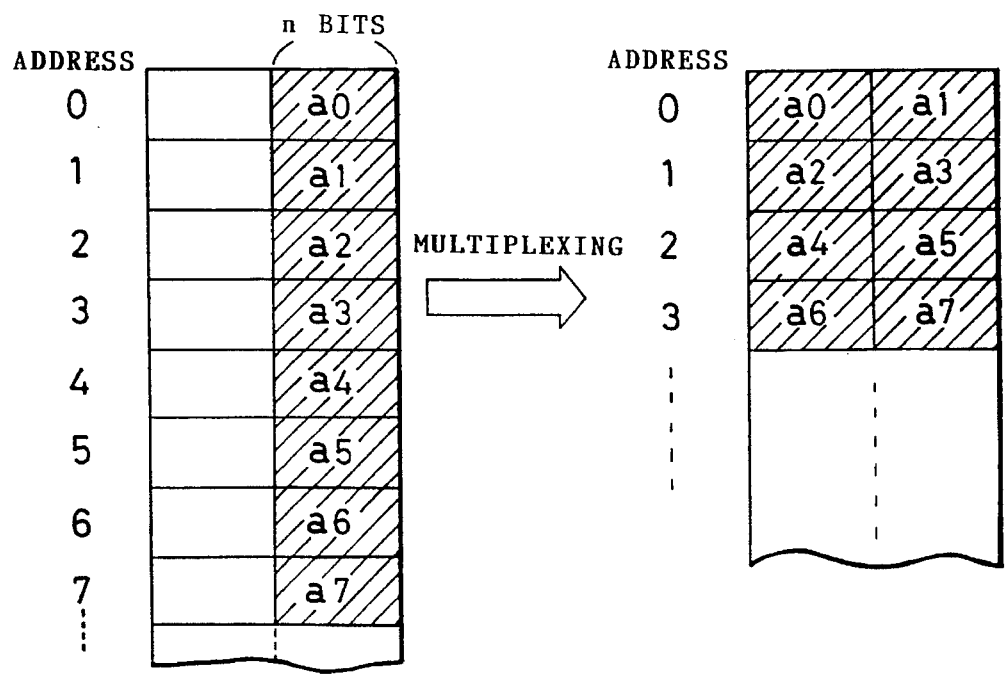
FIG. 36 is a diagram for explaining a data multiplexing format in the data memory.

In FIG. 29(b), there are shown the operation contents of the shifters 1 to 4 and AU1 to AU3 in this case. In this case, it should be noted that as the single precision data, two pieces of data have been previously stored in the data memory 4 having 2n-bit data sizes, by way of the multiplex as shown in FIG. 36. Then, both the multiplication result (A1 ×B1) on the upper n-bit input data, and multiplication result (A0 ×B0) on the lower n-bit input data are obtained with the respective MPY 1 and MPY 4. Thereafter, the shift value 0 is processed in the shifter 4, the 0-set is performed in the shifters 3 and 2, and the 2n-bit shift is carried out in the shifter 1. Then, additions on the data are performed in AU1, AU2, and AU3, so that the single precision multiplication results are multiplexed into a resultant 4n-bit data as an upper 2n-bit and lower 2n-bit data. In this case, the required calculation amount becomes 0.5 machine cycles per 1 data, which is at a speed of two times higher than that of the conventional apparatus.

(3). A single precision parallel sum-of-product calculation.

Figure 30:
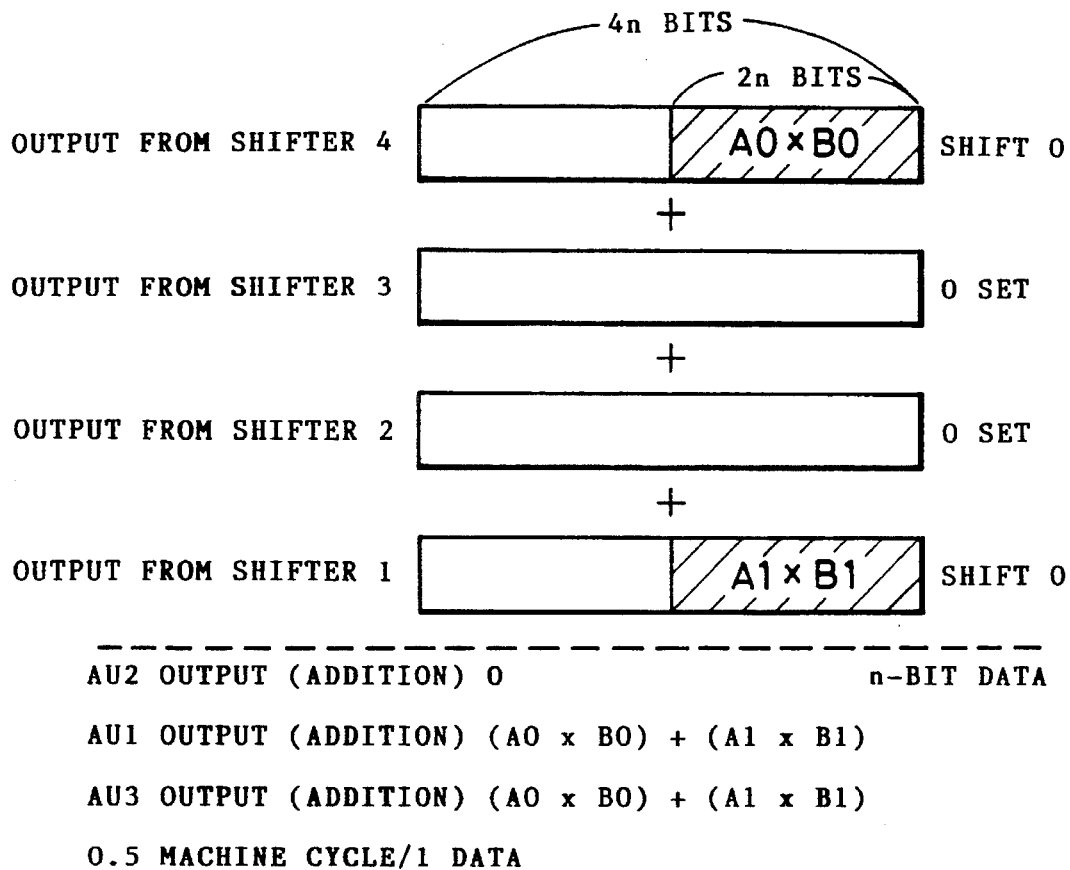
FIG. 30 is a state diagram of shifters and outputs for representing operation contents of an n-bit data parallel sum-of-product calculation.
Figure 31:
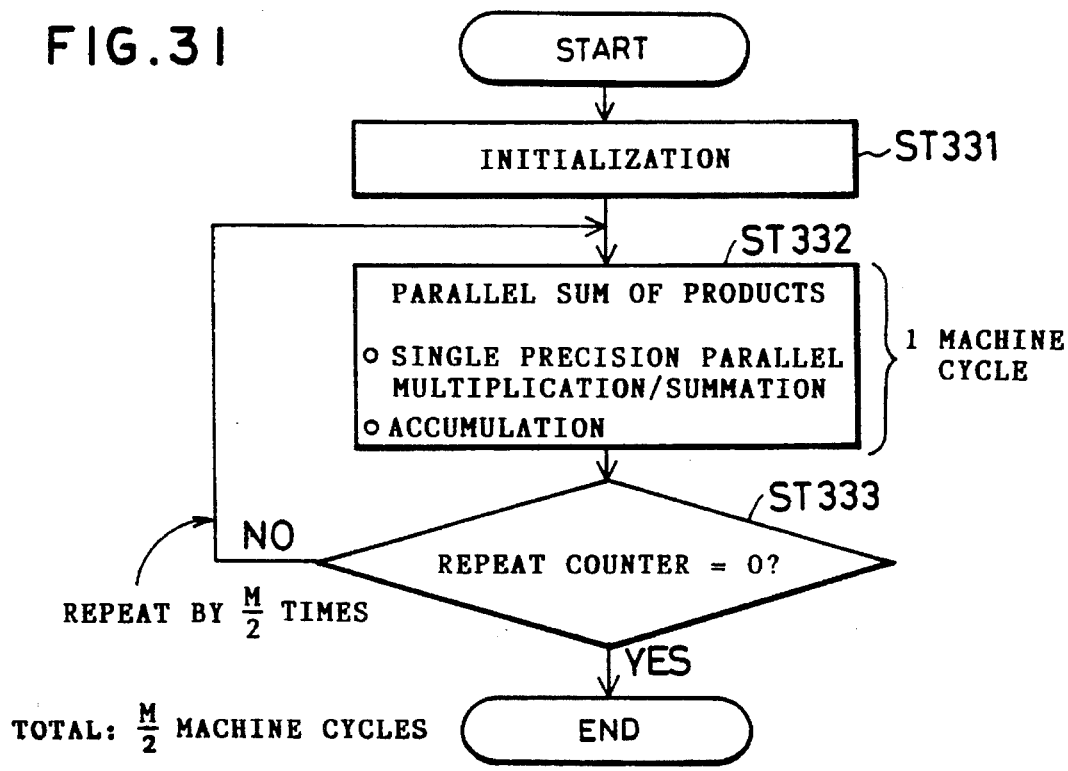
FIG. 31 is a flowchart of representing the calculation flow in FIG. 30.

FIG. 30 illustrates the operation contents of this calculation. FIG. 31 shows a calculation flow. Also, in this case, the single precision data has been multiplexed as shown in FIG. 36. After the initialization is set at the step ST 331; in the parallel sum-of-product calculation process of step ST 332, the following processes are executed. That is, the shift value 0 is processed for the multiplication result (A0×B0) of the lower n-bit data of two pieces of input data in the shifter 4; "0" set is performed in the shifters 3 and 2; the shift process of the shift value "0" is performed with respect to the multiplication result (A1 ×B1) of the upper n-bit in the shifter 1. In AU1, a addition of (A0 ×B0) +(A1 ×B1) is carried out. In AU1, an addition of (0+0) is effected, and further another addition of (A0 ×B0)+(A1 ×B1)+0 is performed in AU3. As a result, an accumulation value of two single-multiplication-resultant-data is obtained. Then, this accumulation value is furthermore accumulated in the post-staged calculating unit 6 by M/2 times repeatedly by way of the process defined by the step ST 333. Thus, the sum of products containing M pieces of data are executed. In this case, a required calculation amount becomes 0.5 machine cycles per 1 output data, which is at a speed of two times higher than that of the conventional calculation.

(4). A single precision complex number calculation.

Figure 32:
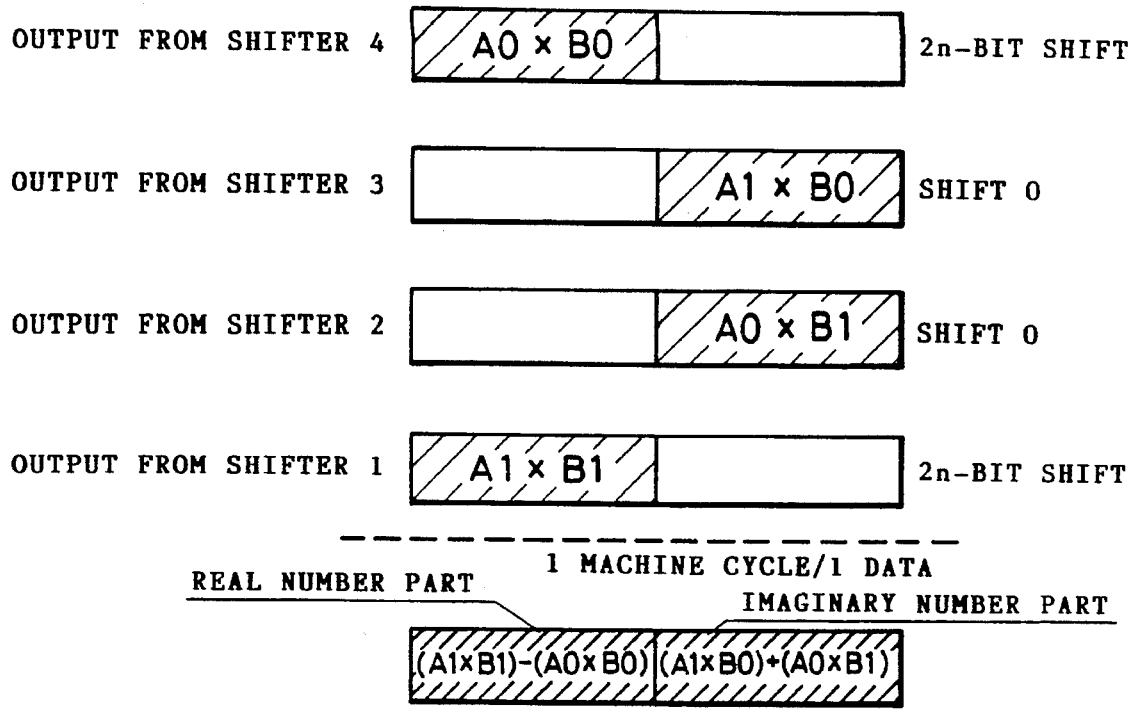
FIG. 32 is a state diagram of shifters and outputs for illustrating operation contents of a single precision complex number calculation.
Figure 33:
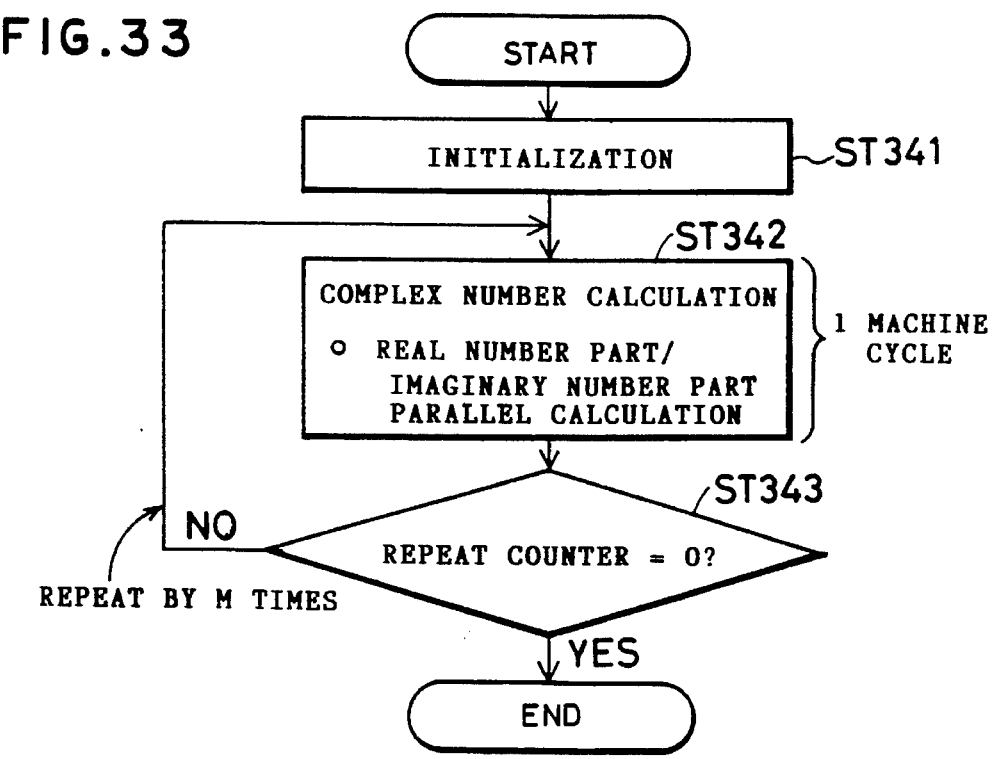
FIG. 33 is a flowchart for explaining the calculation flow in FIG. 32.

In FIG. 32, there are shown the operation contents of this calculation. In FIG. 33, there is shown a calculation flow thereof. In this case, it is assumed that a real number part multiplexed into the upper n-bits and an imaginary number part multiplexed into the lower n-bits of data have been stored in the data memory 4. Thus, after the initialization defined by the step ST 341 has been effected, the complex number calculating process of step ST 342 is performed as follows. As shown in FIG. 32, a 2n-bit left shift operation is performed in the shifter 4 for the multiplication result (A0 ×B0); a shift value "0" is processed for (A1×B0) in the shifter 3; a shift value "0" is processed for (A0×B1) in the shifter 2; a 2n-bit left shift operation is performed for (A1×B1) in the shifter 1. Then, a subtraction of (A1×B1−A0×B0) is performed in AU1, an addition of (A1×B0+A0×B0) is effected in AU2, and another addition of (A1 ×B1−A0×B0)+(A1×B0+A0×B1) is carried out in AU3. As a result, the resultant data is obtained in such a form that the real number part of the complex number multiplication result is multiplexed into an upper 2n-bits, and the imaginary number part thereof is multiplexed into a lower 2n-bits. In this case, a required calculation amount becomes 1 machine cycle per 1 data, which is five times higher than the conventional calculation speed.

(5). A binary tree retreive vector quantization calculation.

Figure 34:
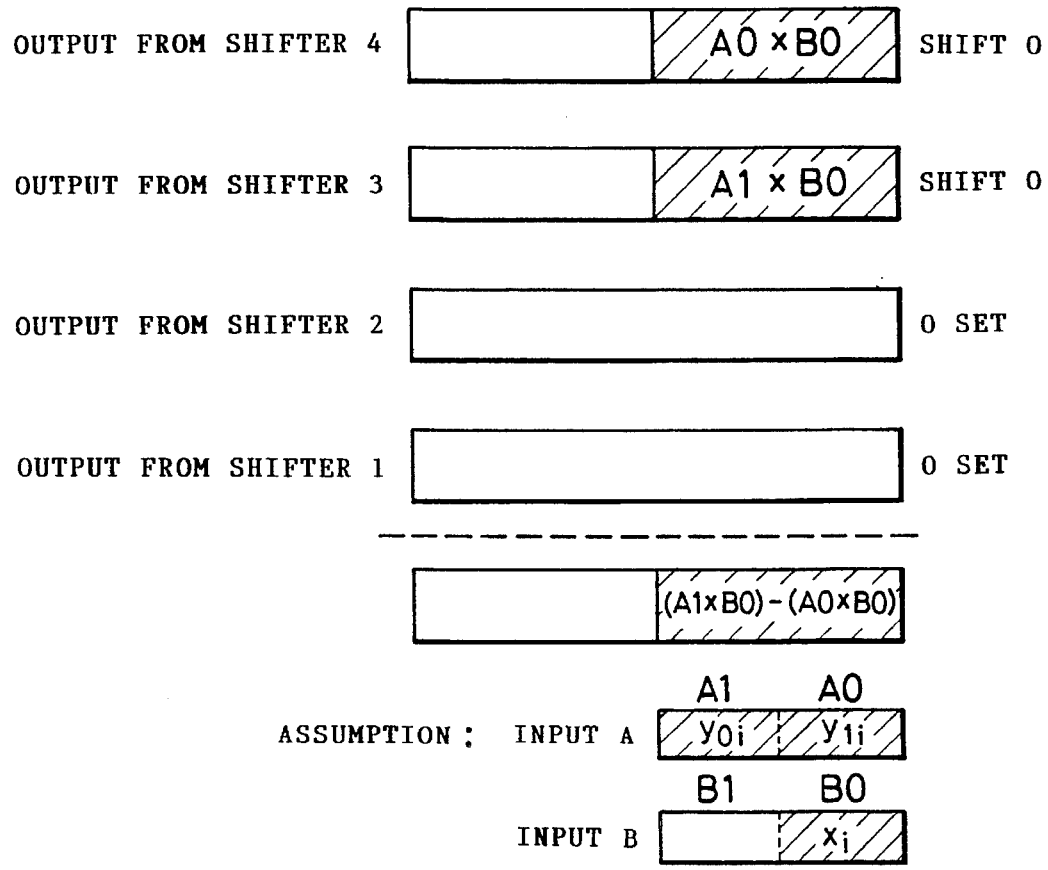
FIG. 34 is a state diagram of shifters and others for representing operation contents of the binary tree search vector quantizing calculation.
Figure 35:
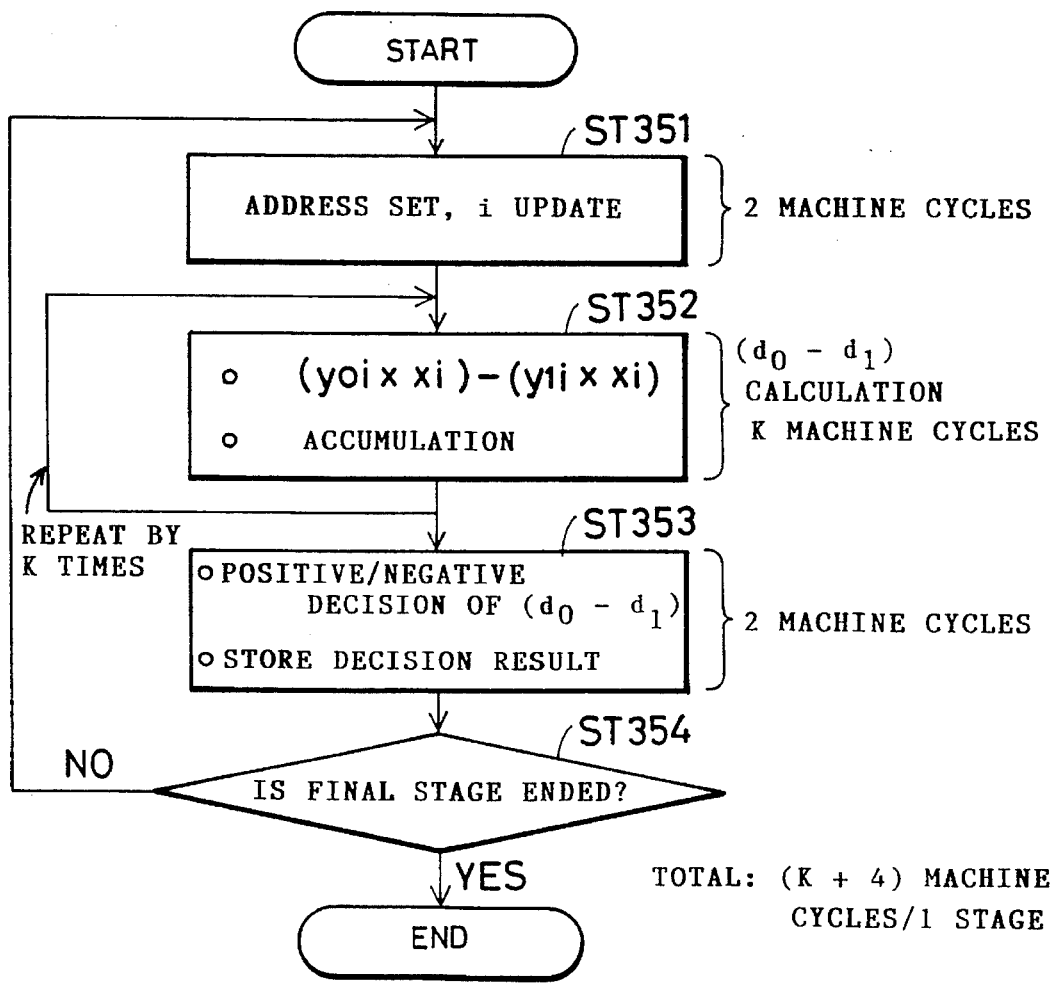
FIG. 35 is a flowchart for showing the calculation flow in FIG. 34.

FIG. 34 shows an operation contents of this calculation, and FIG. 35 represents an operation flow thereof. In this case, it is assumed that one of two pieces of input data has been stored in the data memory 4 by a multiplexed format every element of the binary tree search vectors.

An element of vector "$y_0$" is stored in the upper n-bits of one input data "A", an element of vector "$y_1$" is stored in the lower n-bits thereof; and an element of vector "x" is stored in the lower n-bits of the other input data "B". Thus, in a step ST 352, a "0" shift is performed for the multiplication result (A0×B0) in the shifter 4; a "0" shift is performed for the multiplication result (A1×B0) in the shifter 3; a "0" set is done in the shifters 2 and 1. Also, an output from the shifter 4 is subtracted from an output from the shifter 3 in AU1; the output from the shifter 3 is added to an output from the shifter 2 in AU2; and an output from AU1 is added to an output from AU2 in AU3. As a result, the resultant data $(y_{01} \times x_1) - (y_{11} \times x_1)$ of the multiplier circuit 303 is obtained, an accumulation is performed in the post-staged calculating unit 6, and this accumulation is repeated by k times corresponding to the element number, so that the following resultant data are obtained:

$$\sum_{i=1}^{k} \{(y_{0i} \times x_i) - (y_{1i} \times x_i)\} = \sum_{i=1}^{k} (y_{0i} \times x_i) - \sum_{i=1}^{k} (y_{1i} \times x_i) = d_0 - d_i \quad (13)$$

where $d_0$: an inner product between the reference vector "$y_0$" and input vector "x"

$d_i$: an inner product between the reference vector "$y_i$" and input vector "x".

Then, in step ST 353, a matching decision is made by judging whether or not the above-described accumulated value $(d_0-d_1)$ is positive or negative. Thus, a required calculation amount per one stage becomes (k+4) machine cycles, which are approximately at a speed of two times higher than that of the conventional apparatus.

It should be noted that in the above-described preferred embodiment, AU1 to AU3 are employed as the arithmetic calculators, and a mere adder may be utilized for AU2 and AU3.

Figure 37:
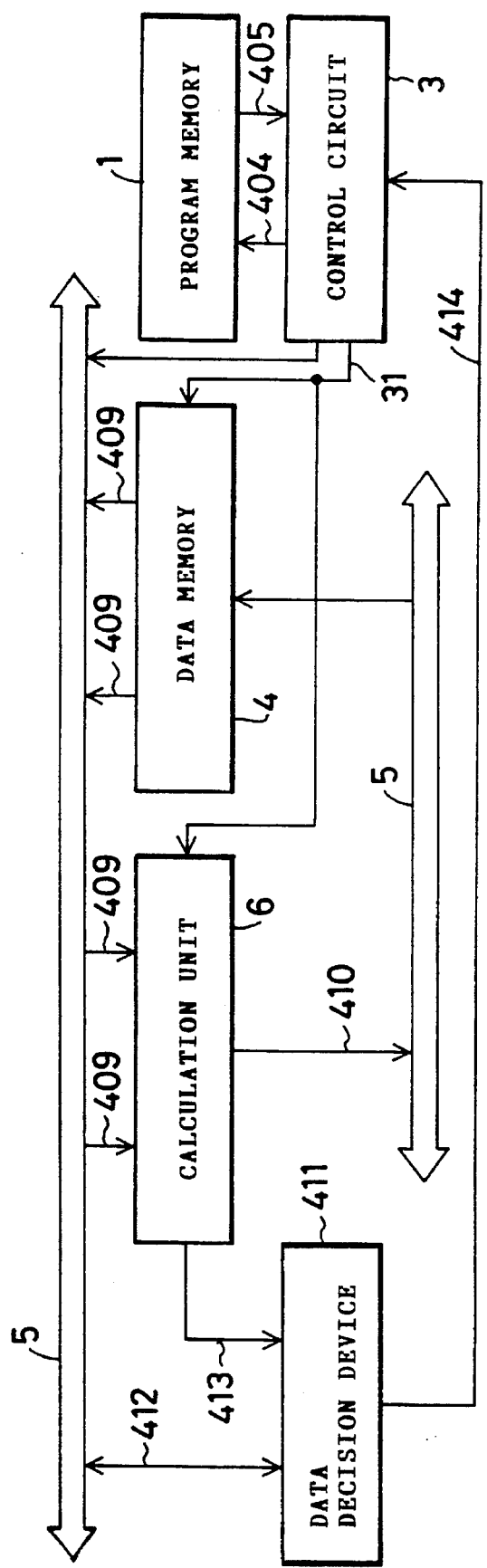
FIG. 37 is a schematic block diagram of a digital signal processor as a whole according to a fourth preferred embodiment of the invention.

A description of a fourth preferred embodiment according to the invention will now be made. In FIG. 37, it should be noted that same reference numerals will be employed for denoting the same or similar circuit elements shown in FIG. 11, and a further explanation thereof is omitted.

In FIG. 37, reference numeral 411 indicates a data decision device; 412 denotes an input/output path for connecting the data bus 5 and data decision device 411; and 413 denotes an output path from the calculating unit 6 to the data decision device 411.

Figure 38:
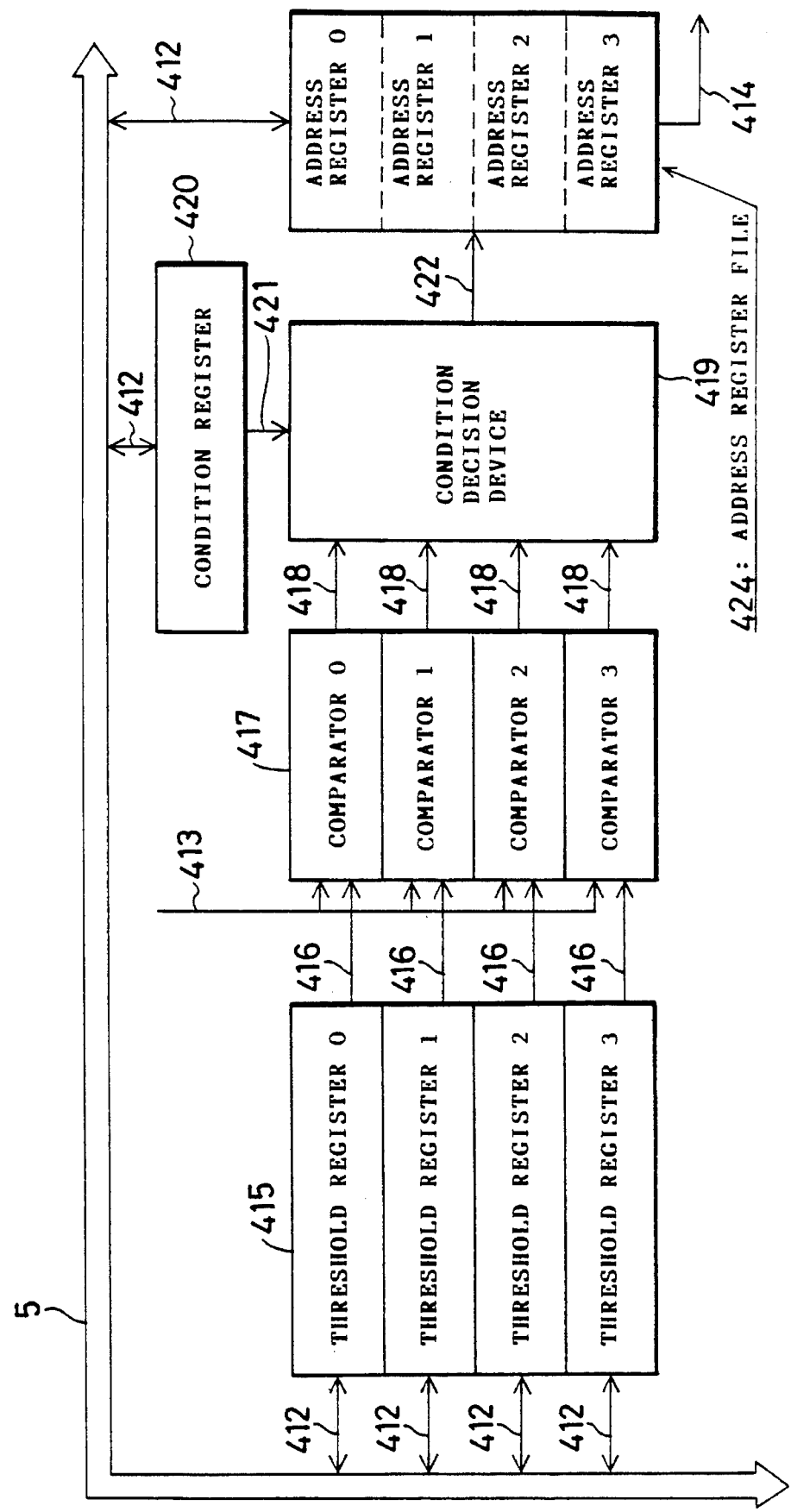
FIG. 38 is a block diagram of an internal arrangement of a data decision unit.

FIG. 38 is a block diagram of an internal arrangement of the above-described data decision device 411. In FIG. 38, reference numeral 415 is a threshold register group; 417 is a comparator group for comparing the calculation data with the threshold values; 419 represents a condition decision device for judging the region of the calculation data based upon the comparator output so as to compare a branch condition with the decision result; 420 represents a condition register for holding the branch condition and address index information indicating a destination; 424 indicates an address register file for holding a plurality of destinated branch addresses corresponding to the conditions of the condition register; 412 represents an input/output path and reference numerals 413, 414, 416, 418, 421 and 422 are output paths.

Figure 39:
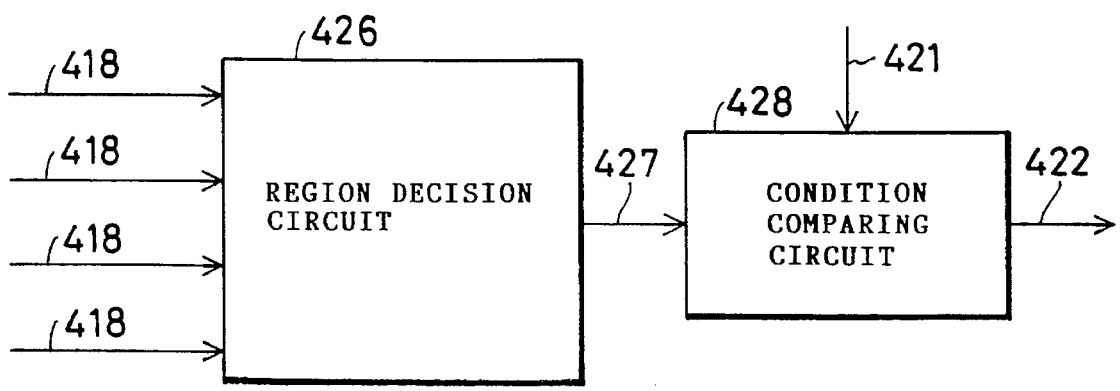
FIG. 39 is a block diagram for showing an internal arrangement of a condition decision unit.

FIG. 39 is a block diagram of an internal arrangement of the condition decision device 419. In FIG. 39, reference numeral 426 indicates a region decision circuit; 428 is a condition comparing circuit; and reference numerals 418, 421, 422 and 427 are output paths.

An operation will now be described. In FIG. 37, the data decision device 411 compares the data to be compared which is input from the calculating unit 6 via the output path 413, with "n" pieces of threshold values which are supplied from the previously set threshold value register group 415 via the output paths 416 in the comparator 417, and judges the data region of the data in question in the condition decision device 419 based upon "n" pieces of comparison results (comparison result is represented by one bit data of "0" or "1") supplied via the output path 418.

Figure 40:
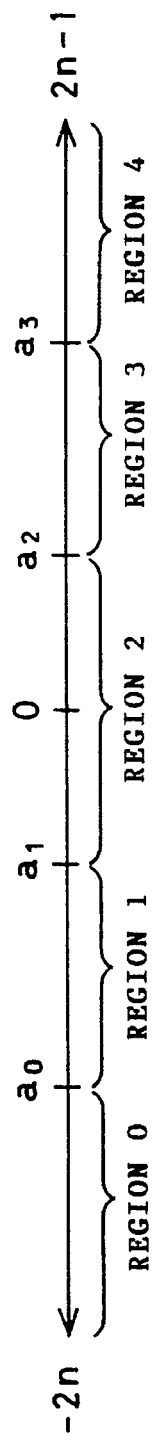
FIG. 40 is a diagram for explaining one example of data region decision.

FIG. 40 represents an example where (n+1) pieces of regions $0, \ldots, 4$ into which the threshold values $a0, \ldots, a9$ divides, the comparator outputs and region decision are shown. In this case, a specific bit is set to "1" in accordance with the region number.

The region decision circuit 426 of the condition decision device 419 judges the region of the data based upon the comparator outputs which are supplied from the comparator group 417 via the output paths 418, and outputs to the output path 422 an index signal indicating the region. The condition comparing circuit 428 outputs to the output path 422 an address index indicating a branching address when the condition is satisfied by comparing this region index signal with the condition signal which has been supplied from the condition register 420 via the output path 421.

Figure 41:
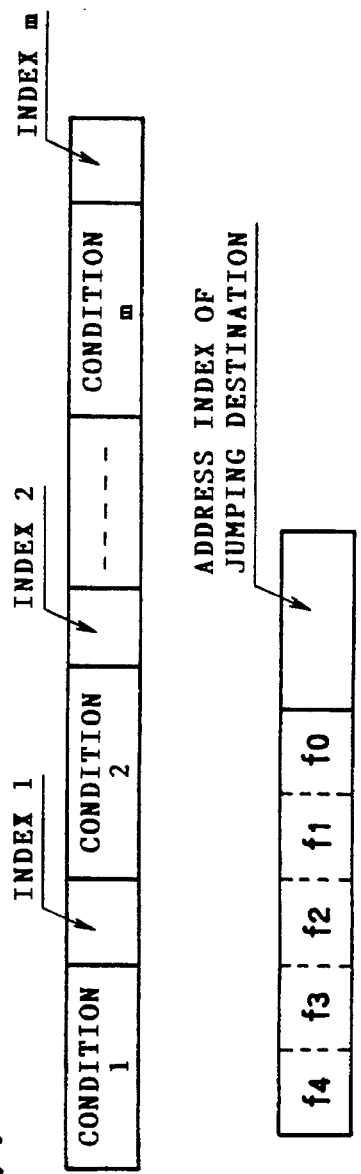
FIG. 41 is a diagram for explaining conditional data representative of a branch condition.

FIG. 41 illustrates one example of a format of the condition signal stored in the condition register 420. In FIG. 41, symbols $f_0$ to $f_4$ denote a region "0" designation flag to a region 4 designation flag, each of which becomes "1" at the designation, and "0" at the non-designation. A plurality of conditions 1 to m can be designated, a priority order of the conditions to be compared is set, and these conditions are sequentially compared. Once a condition is satisfied, an address index signal is outputted from the condition decision device 419 via the output path 422.

Into the address register file 424, a plurality of branch addresses corresponding to the respective conditions have been stored, and the branch address signal is outputted to the output path 414 based upon the address index signal supplied from the condition decision device 419 via the output path 422. As a consequence, based upon the output address value, the control circuit 3 performs the branch operation by setting a count value of the program counter built therein to this address value.

In case that all of conditions are not satisfied, the above-described address index signal is "OFF", and also the address signal output from the address register files 424 is "OFF", and the count value of the program counter points a next instruction address.

As to the data supplied from the calculating unit 6 via the output path 413, which is to be checked by this data decision device 411, one of outputs from the arithmetic calculator, multiplier, accumulator within the calculating unit 6 is defined by the instruction such as the mode setting operation, and a check is made by the data decision device 411 every machine cycle, so that a loss of the processing time required for comparing the data with the data regions can be prevented.

Figure 42:
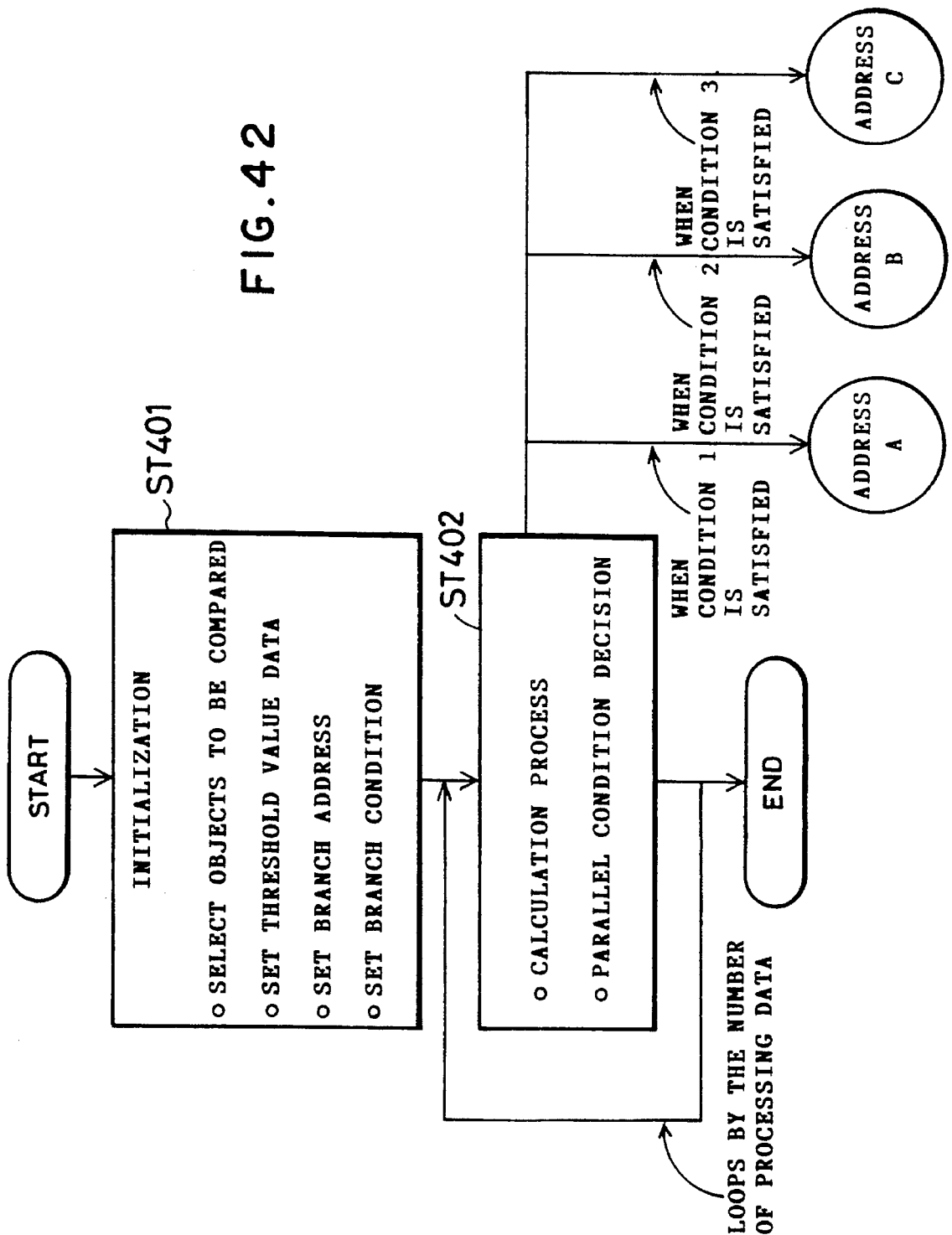
FIG. 42 is a flowchart of the continuous calculation process containing the data decision.

FIG. 42 represents a continuous processing flow containing an intermediate check. First, initializations such as a selection of objects to be compared, a threshold value data set, a branch address set, and a branch condition set, are performed (step ST 401). Then, both calculation process and condition decision process are repeatedly performed in parallel via the process data loop by the number of processing data, and the addresses A to C are output when the conditions 1 to 3 are satisfied.

Referring now to drawings, a fifth preferred embodiment of the present invention will be described.

Figure 13:
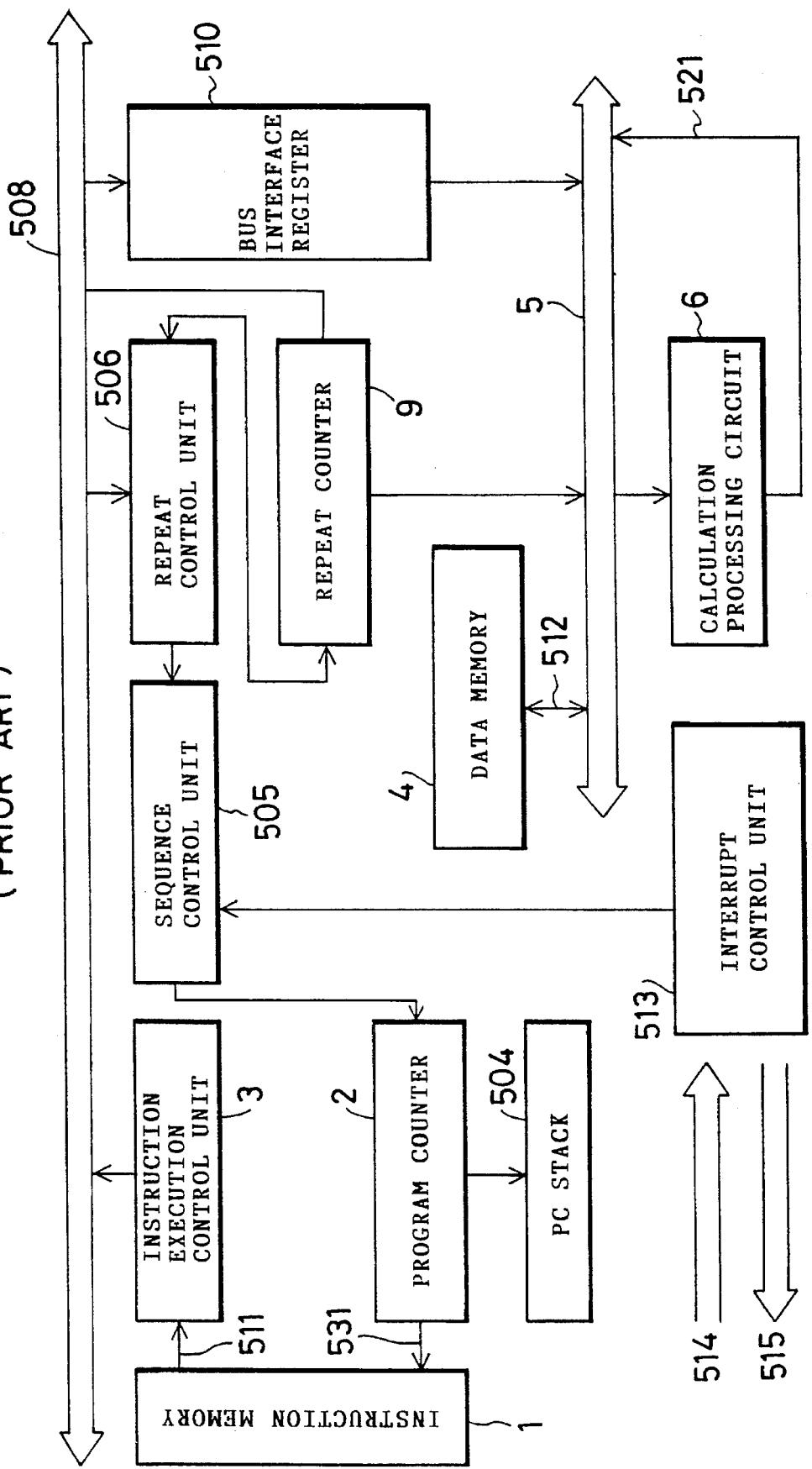
FIG. 13 is a block diagram of a fifth conventional digital signal processor.
Figure 14:
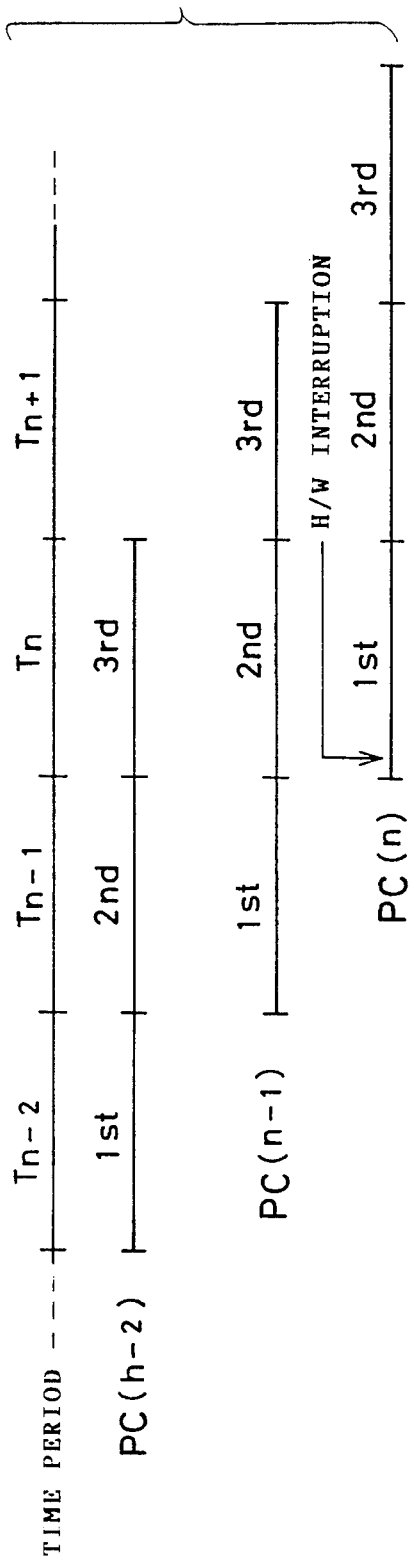
FIG. 14 is a timing chart for explaining the normal interrupting operation effected by the fifth conventional digital signal processor.
Figure 43:
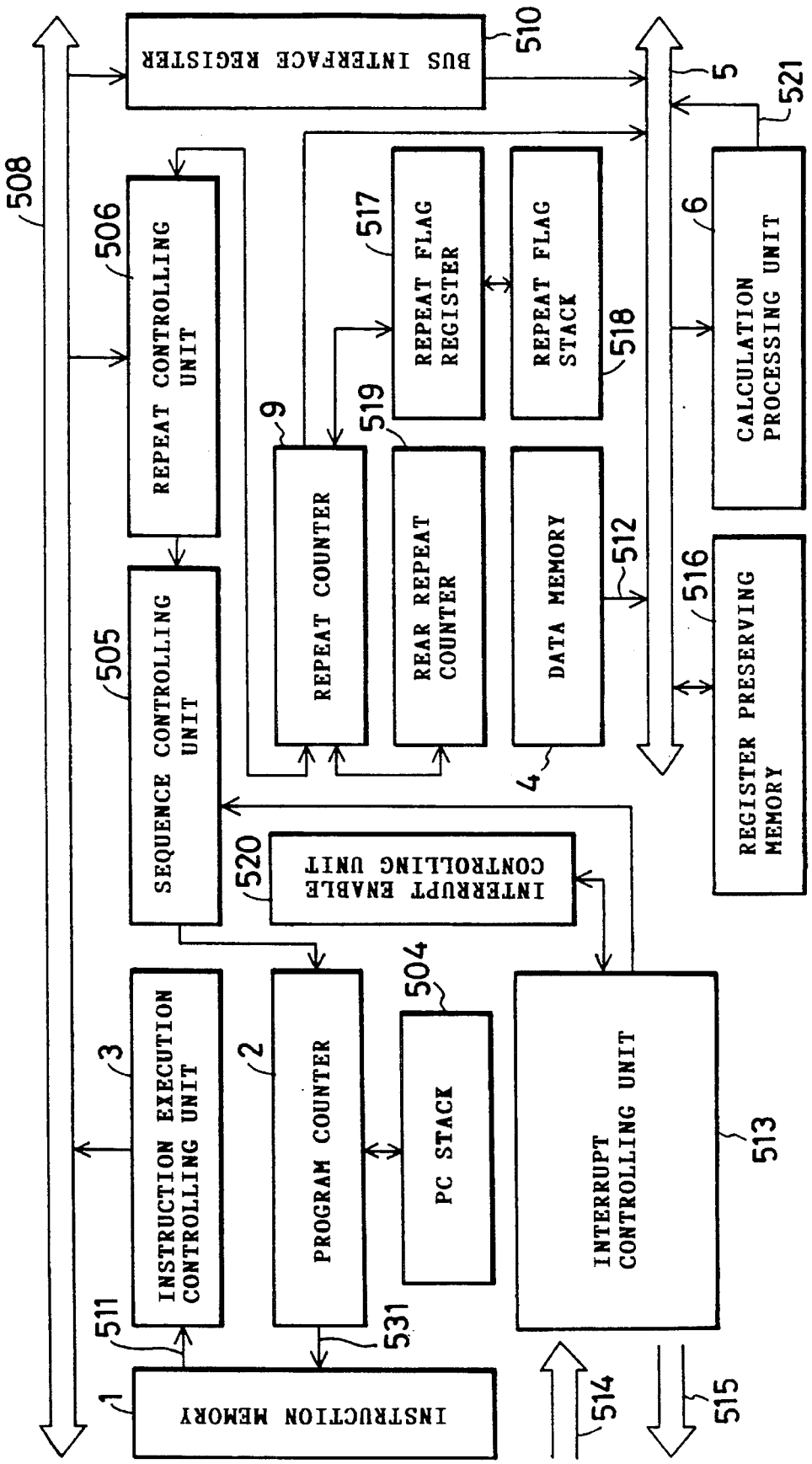
FIG. 43 is a block diagram of a digital signal processor according to a fifth preferred embodiment of the invention.

FIG. 43 is a block diagram of the digital signal processor according to the fifth preferred embodiment of the invention. It should be noted that in FIG. 43, same reference numerals will be employed for denoting the same or similar circuit elements shown in FIG. 13, and therefore, no further explanation is made. In FIG. 43, reference numeral 516 represents a register preserving memory for preserving the data stored in the respective registers during the execution of the interruption; 517 is a repeat flag register (rfr) for representing that the repeat instruction is under execution; 518 represents a repeat flag stack (rfsk) functioning as a memory for preserving data when the interruption is accepted, 519 denotes a rear repeat counter (rch) for holding a number of an initial value of repeating; and 520 indicates an interrupt enable controlling unit for performing an automatic disable process of interruptions when the interruption is initialized.

The register preserving memory 516 holds properly the register values of registers needed to be preserve for an interrupt processing routine. And the interrupt enable controlling unit 520 inhibits automatically a H/W interrupt during an access to the external data memory and during executions of a branch instruction, return instruction, and S/W interrupt instruction.

Referring now to FIG. 43, a H/W interruption process operation will be described. When the interruption is demanded in an external device, the external device announces an occurrence of the interruption request to the interruption controlling unit 513 in response to the interruption request signal 514.

Upon accepting the interruption, the interruption request is outputted from the interruption controlling unit 513 to the sequence controlling unit 505. Upon receipt of this interruption request, a non-operation instruction is set to the instruction execution controlling unit 3, and the update operation of the program counter 2 is prohibited.

Thereafter, an interruption acknowledgement signal 515 is sent from the interruption controlling unit 513 to the external device, and in principle, the H/W interruption is prohibited during the interrupt operation.

It should be understood that it is substituted by an instruction that no operation is made in the sequence controlling unit 505. Other interruptions than the interruption under processing, e.g., executions on the memory wait cycle during access of the external data memory, and also decoding of branch instructions, return instructions, and S/W interrupt, are automatically disabled by the interrupt enable controlling unit 520.

Upon receipt of the interruption instruction, the non-operation instruction is set to the instruction execution controlling unit 3, the count value of the program counter 2 is automatically pushed in the PC stack 504 and also an interrupt address is set to this program counter.

In case of the interrupt operation during the repeat operation, it is furthermore required to store a condition of a repeat flag register 517. The register value of the repeat flag register 517 is automatically preserved into the repeat flag stack 518 in order to accept the interruption instruction even during the execution of the repeat instruction.

The preserving operation of the register values of the registers used in the interrupt processing routine, is carried out at the designated interrupt address by a register preserving instruction (push). The return operation from the interrupt operation is effected in response to a return instruction (rti). Before the execution of this return instruction the register values obtained before the interrupt process routine are set into the respective registers in response to a register value return instruction (pop) at the designated interrupt address.

Thereafter, the return instruction is executed to return from the interrupt operation. In this case, the count value of the program counter 2 is popped from the PC stack 504, the non-operation instruction is set to the instruction execution controlling unit 3, and thereafter, the register value of the repeat flag register 517 is restored from the repeat flag stack 518.

FIG. 44 is a timing chart for explaining the normal interrupt operation. FIG. 45 is another timing chart for explaining the interrupt operation during the repeat instruction execution. At the second stage of the repeat instruction, a register value "1" is set in the repeat flag register 517, and "1" is subtracted from the counter value of the rear repeat counter 519 so as to perform the repeat setting operation At this time, at the first stage of the instruction word designated by the instruction address PC (n+1), the program counter 2 is not updated. Also, at the second stage, when "1" has been set in the repeat flag register 517, "1" is subtracted from the count value of the rear repeat counter 519 so as to test whether or not it is equal to "0". If it is zero, this instruction is performed.

Once the interrupt request is accepted, the non-operation instruction is set to the instruction execution controlling unit 3, the register value of the repeat flag register 517 is preserved to the repeat flag stack 518 and also PC (n+1) is preserved to the PC stack 504. Then, after the interruption, the count value of the repeat counter 9 is preserved to the register preserving memory 516 in response to the register preserving instruction.

Before the interrupt process routine is accomplished, both the preserved count value of the repeal: counter 9 and the respective register values are set into the respective registers in response to the register value return instruction. In case of return from the interrupting operation, the instruction address PC (n+1) is poped from the program counter stack 504 to the program counter 2 in response to the S/W return instruction, and also the non-operation instruction is set as a subsequent instruction to the instruction execution controlling unit 3. Thereafter, the data before the interruption is poped from the repeat flag stack 518 to the repeat flag register 517.

As a result, since "1" has been set in the repeat flag register 517, the count value of the repeat counter 9 is subtracted by "1" to become "1" and the repeat instruction is again executed.

In the external H/W interrupt operation, the processor can be completely returned by processing the interruption instructions as explained above in the preferred embodiment even when the normal interruption and repeat instructions are executed. As a result, it prevents the processor processing efficiency from being lowered.

It should be noted that the repeat operation number was four in the above-described preferred embodiment while the interrupt operation was executed during the repeat operation. However, according to the invention, since the system can be completely returned from the interrupt operation even just after the execution of the repeat instruction and just before the execution thereof, the interrupt operation may be arbitrarily performed in any operations other than the inhibit period of the interruption.

Also, since there is no limiting relationship between the essential feature of the present invention and the detailed specifications of the above-described preferred embodiment, the above-described descriptions do not limit the contents of the invention.

Figure 47:
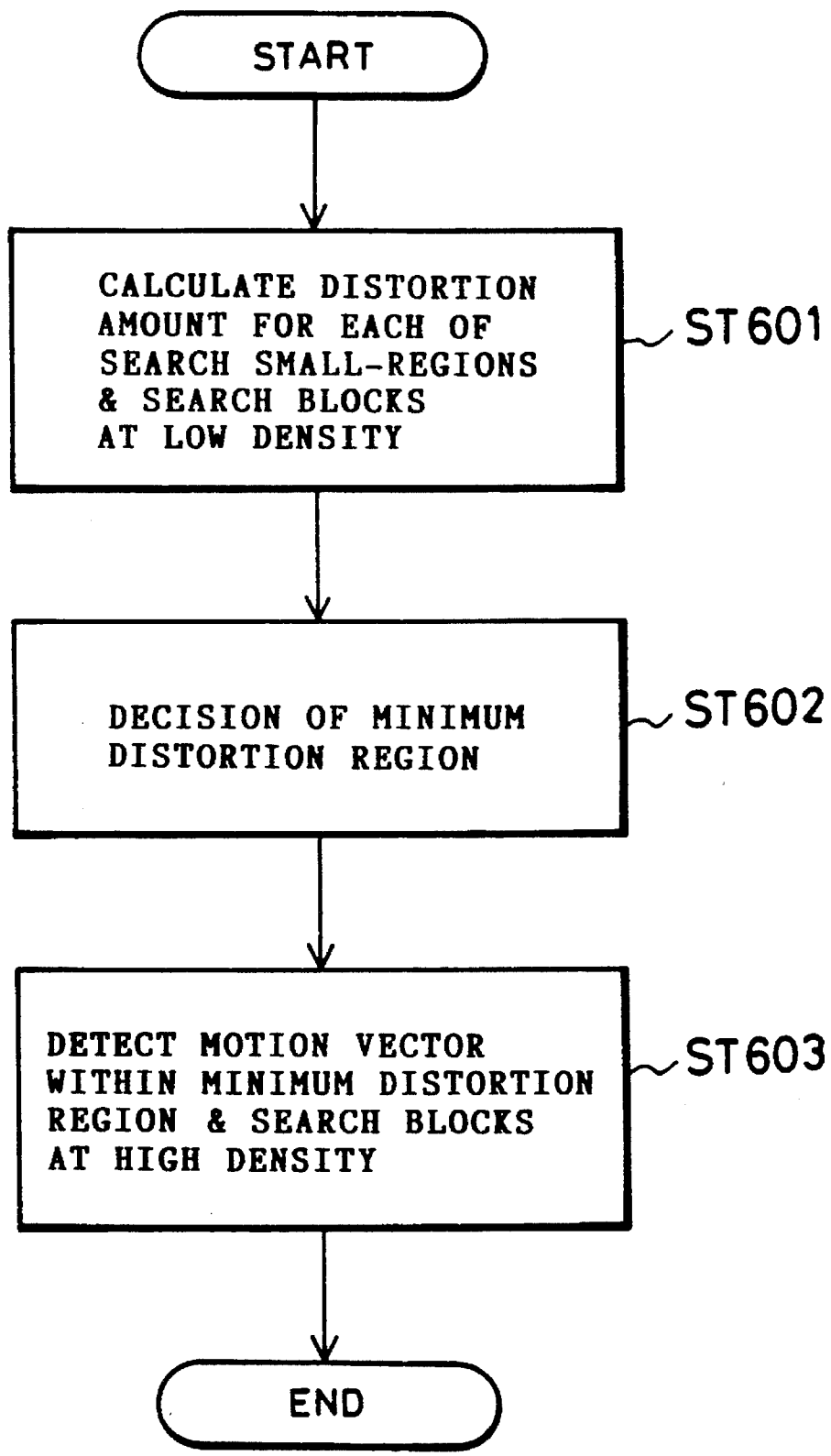

Referring now to the figures, another preferred embodiment of the invention will be described. FIG. 46 is an explanatory diagram on a motion compensation calculating method according to a preferred embodiment of the invention, and FIG. 47 is a flowchart for explaining a detecting process of motion vector. In FIG. 46, reference numeral 610 is a search small-regions into which a motion vector search range 604 is equally divided; 611 represents motion vectors whose distortion amounts are to be calculated and which are arranged ill an equidistance within the search small-region 610; 612 denotes a minimum distortion region where a summation of the inter-block distortion amounts of the motion vectors 611 which have been positioned in the search small-region 610; and 613 represents a limited search range having the moving vectors whose distortions are to be calculated disposed at a higher density.

FIG. 46a illustrates a region decision step. As illustrated, the complete motion vector search range 604 is equally subdivided into a plurality of search small-regions 610. It is assumed that a total number of these search small-regions 610 is "R". In the respective search small-regions 610, there are equally arranged the motion vectors 611 whose distortions are to be calculated at a coarse density. At this time, it is assumed that a total number of these motion vectors 611 to be distortion-calculated is "e". An amount of inter-block distortion "$d_q$" (q=1 to e) between the block of the position of this motion vector 611 and the presently input block 603 is calculated (step ST 601) and a total thereof is assumed as an intra-region distortion amount "$D_j$" (j=1 to R) of this search small-region 610.

In this case, since the following equation (14) is satisfied, i.e., $$Dj = \sum_{q=1}^{e} dq = \sum_{q=1}^{e} \sum_{P=1}^{L} |xp - yiP| \tag{14}$$

a calculation amount per one search small-region 610 is expressed in units of machine cycle as follows:

$$(e \times L \times a) \tag{15}$$

The above-defined calculation is carried out over all the search small-regions 610 so as to detect a minimum distortion region 612 having a minimum intra-region distortion amount "D min" (step ST 602). At this time, a calculation amount is equal to:

$$((e \times L \times a) \times R + R \times b) \tag{16}$$

Then, as illustrated on the moving vector detecting step in FIG. 46(b), the limited search range 613 having a size of K1×K2 with the minimum distortion region 612 obtained in the region decision step as a center is set, and the motion vectors to be searched at the higher density are positioned within this search range 613 (step ST 603). A calculation amount within this limited search range 613 is obtained by summing the following items (17) and (18).

$$((k1 \times k2) \times L \times a) \tag{17}$$

$$(k1 \times k2) \times b \tag{18}$$

The item (18) is obtained by the comparison process.

Assuming that the total number "R" of the search small-regions 610 is equal to nine (9), the number "e" of the motion vectors 611 to be calculated within the search small-region 610 is equal to four (4); and the values of k1 and also k2 in the limited search range 613 are equal to six (6), total calculation amount is defined in units of machine cycle as follows:

$$S = [(e \times L \times a) \times R + R \times b] + (k1 \times k2) \times L \times a + (k1 \times K2) \times b \approx 4,800 \quad (19)$$

As a consequence, the resultant calculation amount is reduced to approximately ¼ of a calculation amount of full searching.

It should be noted that although the range limitation by the searching operation at a low density was one stage in the above-described preferred embodiment, a plurality of stages may be utilized for limiting the search ranges.

Also, although the difference absolute value summation was utilized for the distortion calculation in the above-described preferred embodiment, a difference square summation may be utilized.

What is claimed is:

1. A digital signal processor comprising:

an instruction memory for previously storing an instruction word to define various internal operations;

an instruction execution control unit connected to said instruction memory and a data bus of said signal processor for controlling operations such as a decoding and calculation of said internal instruction word read from said instruction memory in a predetermined order;

a calculation unit connected to said data bus for performing calculations on input data transferred from said data bus and from an internal data memory storing calculation data;

a data output bus connected to said calculation unit and said internal memory for transferring calculation results derived from said calculation unit to said internal memory;

an address generating unit connected to said data bus for generating 2-input and 1-output data in parallel to said calculation unit;

an external data memory connecting unit connected to said data bus and connectible to an external data memory for reading and writing the data between an external data memory and said data bus in response to values output from said address generating unit;

a mode register connected between said external data memory connecting unit and said data bus for setting an access mode of said external data memory;

a direct memory transfer bus connecting one of ports of said internal data memory to said external data memory connecting unit; and a direct data memory transfer control unit connected to said external data memory connecting unit for inputting and outputting data in block units between said external data memory connecting unit and said internal data memory via said direct memory bus, said direct data memory transfer control unit being set independently of said mode register whereby said inputting and outputting of said data in block units is carried out independently of the internal operation controlled by said instruction execution control unit and without interruption of said internal operation, wherein said mode register includes an address output mode unit for holding information to select one of first and second modes, said first mode outputting both an upper address and a lower address to said external data memory, and said second mode outputting only the lower address thereto; and, a memory connecting unit for holding selection information whether or not a read/write completion signal is handled between said external data memory and itself, and said direct data memory transfer control unit includes;

a frame horizontal size register connected to said data bus for representing a horizontal size of a two-dimensional address space;

a block horizontal size register for representing a horizontal size of a rectangular portion in the two-dimensional address space;

a block start address register for indicating a head address of said external data memory;

an internal memory start address register for representing a head address of said internal data memory;

a word register for indicating a transfer word number;

a DMAC register for selecting an external address output mode and an external memory connection mode;

a DMA address calculation unit for performing an address calculation of said external data memory; and a DMA control unit for performing a direct memory access transfer.

2. A digital signal procesor as claimed in claim 1, wherein said DMA address calculation unit includes:

means for generating a two-dimensional block address supplying to said external data memory and a one-dimensional address supplying to said internal data memory, based upon the respective values which have been set in said frame horizontal size register, block horizontal size register, block start address register, and internal memory address register.

3. A digital signal processing processor as claimed in claim 2, wherein said DMAC register includes:

an address output mode unit for holding selection information to select one of first and second modes in response to data supplied frown said data bus, said first mode outputting both an upper address and a lower address to said external data memory, and said second mode outputting only the lower address thereto; and, a memory connecting unit for holding selection information whether or not a read/write completion signal is handled between said external data memory and itself.

4. A digital signal processor as claimed in claim 3, wherein said external data memory connecting unit includes:

changing means for inputting/outputting data between said direct data transfer bus and said external data memory in case that the address of said external data memory is designated by said direct data memory transfer control unit, and for inputting/outputting data between said external data memory and one of both the data bus and the data output bus when the address of said external data memory is designated by said address generating unit.

5. A digital signal processor as claimed in claim 4, wherein said external data memory connecting unit further includes:

mode setting means for changing an address mode output to said external data memory in accordance with a set value of said mode register or said address output mode unit of the DMAC register, and for changing such a condition that the read/write completion signal is input or not in response to said set value of said mode register or said memory connecting unit of the DMAC register.

6. A digital signal processor as claimed in claim 5, wherein said external data memory connecting unit includes:

means for interrupting data input/output operations between said direct data transfer bus and itself in case that a request to access to said external data memory is generated by said calculation unit during inputting/outputting data between said external data memory and said direct data transfer bus, and for executing input-ting/outputting data between said external data memory and one of both said data bus and said data output bus.

* * * * *